US006196615B1

(12) United States Patent
Yada

(10) Patent No.: US 6,196,615 B1
(45) Date of Patent: Mar. 6, 2001

(54) AUTOMOBILE WINDSHIELD MOLDING AND THE METHOD OF PRODUCING THE SAME

(75) Inventor: Yukihiko Yada, Nagoya (JP)

(73) Assignee: Tokai Kogyo Kabushiki Kaisha, Ohbu (JP)

( * ) Notice: Subject to any disclaimer, the term of this patent is extended or adjusted under 35 U.S.C. 154(b) by 0 days.

(21) Appl. No.: 09/020,390

(22) Filed: Feb. 9, 1998

Related U.S. Application Data

(63) Continuation-in-part of application No. 08/660,925, filed on Jun. 10, 1996, now abandoned, which is a continuation of application No. 08/579,806, filed on Dec. 28, 1995, now abandoned, which is a continuation-in-part of application No. 08/475,618, filed on Jun. 7, 1995, now Pat. No. 5,567,449, which is a division of application No. 08/291,088, filed on Aug. 18, 1994, now Pat. No. 5,474,729, which is a division of application No. 08/192,623, filed on Feb. 7, 1994, now Pat. No. 5,374,096, which is a continuation of application No. 07/781,371, filed on Oct. 23, 1991, now abandoned, said application No. 08/660,925, is a continuation-in-part of application No. 08/803,861, filed on Feb. 21, 1997, now Pat. No. 5,718,470, which is a division of application No. 08/477,268, filed on Jun. 7, 1995, now Pat. No. 5,656,223, which is a division of application No. 08/582,598, filed on Jan. 3, 1996, now Pat. No. 5,588,691, which is a continuation of application No. 08/168,192, filed on Dec. 17, 1993, now abandoned, which is a continuation-in-part of application No. 08/215,018, filed on Mar. 17, 1994, now Pat. No. 5,454,614, which is a continuation of application No. 08/030,066, filed on Mar. 24, 1993, now abandoned.

(30) Foreign Application Priority Data

Oct. 23, 1990 (JP) .................................................. 2-283344
Jul. 25, 1991 (JP) .................................................. 3-208600
Dec. 28, 1994 (JP) .................................................. 6-338728
Dec. 28, 1994 (JP) .................................................. 6-338729

(51) Int. Cl.$^7$ .................................................. B60J 10/02
(52) U.S. Cl. .................................................. 296/93
(58) Field of Search .................................................. 296/93

(56) References Cited

U.S. PATENT DOCUMENTS 3,583,757   6/1971   Wilfert et al. .
4,256,685 * 3/1981   Vassar .................................... 264/167

(List continued on next page.)

FOREIGN PATENT DOCUMENTS 310262   4/1989   (EP) .
319262   6/1989   (EP) .

(List continued on next page.)

OTHER PUBLICATIONS

Patent Abstracts of Japan, JP5–24433, Feb. 2, 1993.
Patent Abstracts of Japan, JP4–365621, Dec. 17, 1992.

Primary Examiner—Dennis H. Pedder
(74) Attorney, Agent, or Firm—Oblon, Spivak, McClelland, Maier & Neustadt, P.C.

(57) ABSTRACT

A windshield molding which is installable in the space between a windshield and a periphery of a window opening of a vehicle body panel. The windshield molding includes a pair of extruded side molding parts, a pair of extruded corner molding parts, and an extruded upper molding part integral with and extending between the side and corner molding parts. Each of the side molding parts associated with each side edge of the windshield is greater in thickness as compared with the upper end corner molding parts, where a water drain channel is formed. A windshield molding is also provided which drains rainwater smoothly through the rainwater groove provided at necessary sections and having a different depth in the longitudinal direction for better drainage which can be produced simply and continuously as a single molding without the addition of cutting or other processes.

6 Claims, 45 Drawing Sheets

U.S. PATENT DOCUMENTS

| | | | |
|---|---|---|---|
| 4,534,724 | 8/1985 | Fischer et al. . | |
| 4,576,773 * | 3/1986 | Azzola et al. | 425/465 |
| 4,584,150 * | 4/1986 | Ballocca | 425/135 |
| 4,757,659 | 7/1988 | Miyakawa et al. . | |
| 4,757,660 | 7/1988 | Miyakawa et al. . | |
| 4,865,796 | 9/1989 | Tamura et al. . | |
| 4,867,667 * | 9/1989 | Moriyama | 425/465 |
| 4,884,380 | 12/1989 | Yada et al. . | |
| 4,960,375 * | 10/1990 | Saito et al. | 425/465 |
| 4,968,543 * | 11/1990 | Fujioka et al. | 296/93 X |
| 4,984,839 | 1/1991 | Miyakawa et al. . | |
| 5,035,459 | 7/1991 | Yada . | |
| 5,039,157 | 8/1991 | Yada . | |
| 5,044,684 | 9/1991 | Yada . | |
| 5,049,346 | 9/1991 | Yada et al. . | |
| 5,061,335 * | 10/1991 | Tamura et al. . | |
| 5,070,590 | 12/1991 | Fujioka et al. . | |
| 5,074,610 | 12/1991 | Iamura et al. . | |
| 5,078,444 | 1/1992 | Shirchata et al. . | |
| 5,094,498 | 3/1992 | Yada . | |
| 5,104,173 | 4/1992 | Tamura et al. . | |
| 5,107,646 | 4/1992 | Tamura et al. . | |
| 5,112,547 | 5/1992 | Nakashima et al. . | |
| 5,114,206 | 5/1992 | Yada . | |
| 5,133,537 | 7/1992 | Shirahata et al. . | |
| 5,149,168 | 9/1992 | Yada et al. . | |
| 5,167,893 | 12/1992 | Yada et al. . | |
| 5,174,623 | 12/1992 | Yada et al. . | |
| 5,174,624 | 12/1992 | Yada et al. . | |
| 5,190,338 | 3/1993 | Yada . | |
| 5,193,875 | 3/1993 | Iamura . | |
| 5,193,876 | 3/1993 | Yada et al. . | |
| 5,203,946 | 4/1993 | Tamura et al. . | |
| 5,222,336 | 6/1993 | Yada et al. . | |
| 5,228,738 | 7/1993 | Kato . | |
| 5,229,054 | 7/1993 | Yada et al. . | |
| 5,233,805 | 8/1993 | Hirai et al. . | |
| 5,297,843 | 3/1994 | Yada et al. . | |
| 5,332,541 | 7/1994 | Tamura . | |
| 5,348,364 | 9/1994 | Yada . | |
| 5,374,096 | 12/1994 | Yada . | |
| 5,443,299 | 8/1995 | Yada et al. . | |
| 5,445,780 | 8/1995 | Yada et al. . | |
| 5,454,614 | 10/1995 | Yada et al. . | |
| 5,468,438 | 11/1995 | Yada et al. . | |
| 5,474,729 | 12/1995 | Yada et al. . | |
| 5,474,817 | 12/1995 | Yada et al. . | |
| 5,507,992 | 4/1996 | Yada et al. . | |
| 5,523,041 | 6/1996 | Yada . | |
| 5,534,316 | 7/1996 | Yada et al. . | |
| 5,553,423 * | 9/1996 | Kato | 296/93 X |
| 5,567,449 * | 10/1996 | Yada | 425/381 |
| 5,588,691 | 12/1996 | Yada et al. . | |
| 5,607,197 | 3/1997 | Yada . | |
| 5,628,948 | 5/1997 | Yada et al. . | |
| 5,656,223 | 8/1997 | Yada et al. . | |
| 5,718,470 | 2/1998 | Yada et al. . | |
| 5,795,597 | 8/1998 | Yada . | |
| 5,804,118 | 9/1998 | Yada et al. . | |
| 5,833,297 | 11/1998 | Yada et al. . | |
| 5,837,297 | 11/1998 | Yada et al. . | |

FOREIGN PATENT DOCUMENTS

| | | | |
|---|---|---|---|
| 59-31513 | 2/1984 | (JP) . | |
| 59-137213 | 8/1984 | (JP) . | |
| 59-52060 | 12/1984 | (JP) . | |
| 62-15044 | 1/1987 | (JP) . | |
| 62-15044 | 4/1987 | (JP) . | |
| 62-283017 | 12/1987 | (JP) . | |
| 62-289427 | 12/1987 | (JP) . | |
| 63-4712 | 1/1988 | (JP) . | |
| 63-8019 | 1/1988 | (JP) . | |
| 63-8021 | 1/1988 | (JP) . | |
| 63-291721 | 11/1988 | (JP) . | |
| 64-9811 | 1/1989 | (JP) . | |
| 64-28374 | 2/1989 | (JP) . | |
| 1-195032 | 8/1989 | (JP) . | |
| 1-128411 | 9/1989 | (JP) . | |
| 1-242225 | 9/1989 | (JP) . | |
| 1-242226 | 9/1989 | (JP) . | |
| 1-244820 | 9/1989 | (JP) . | |
| 1-269611 | 10/1989 | (JP) . | |
| 1-269612 | 10/1989 | (JP) . | |
| 1-269613 | 10/1989 | (JP) . | |
| 3-128721 | 5/1991 | (JP) . | |
| 3-112720 * | 5/1991 | (JP) | 296/93 |
| 3-75387 | 11/1991 | (JP) . | |
| 57-54416 | 11/1992 | (JP) . | |
| 5-154890 | 6/1993 | (JP) . | |

* cited by examiner

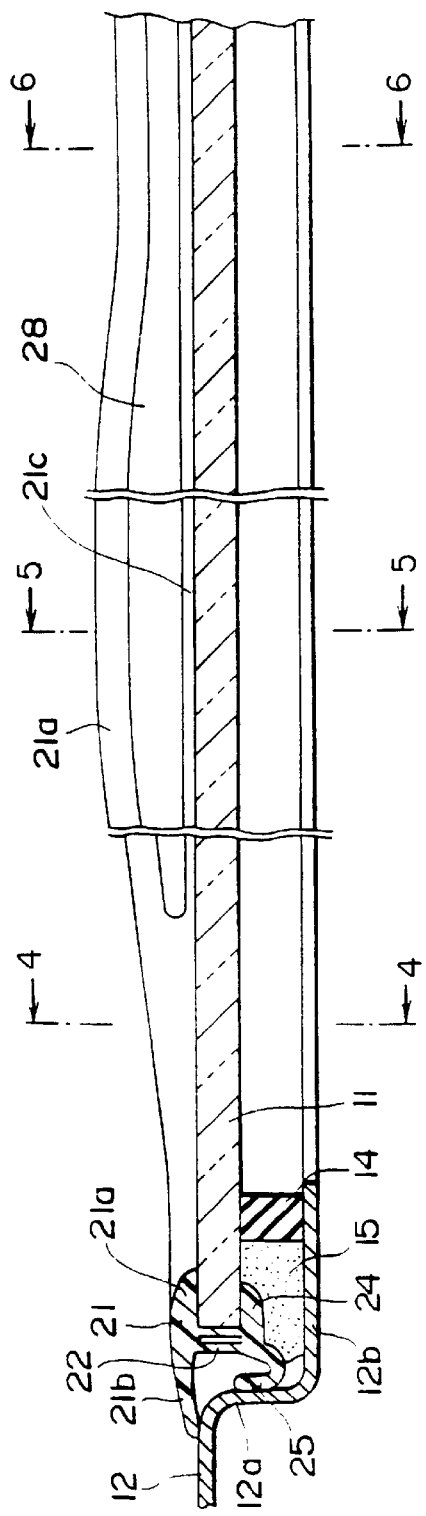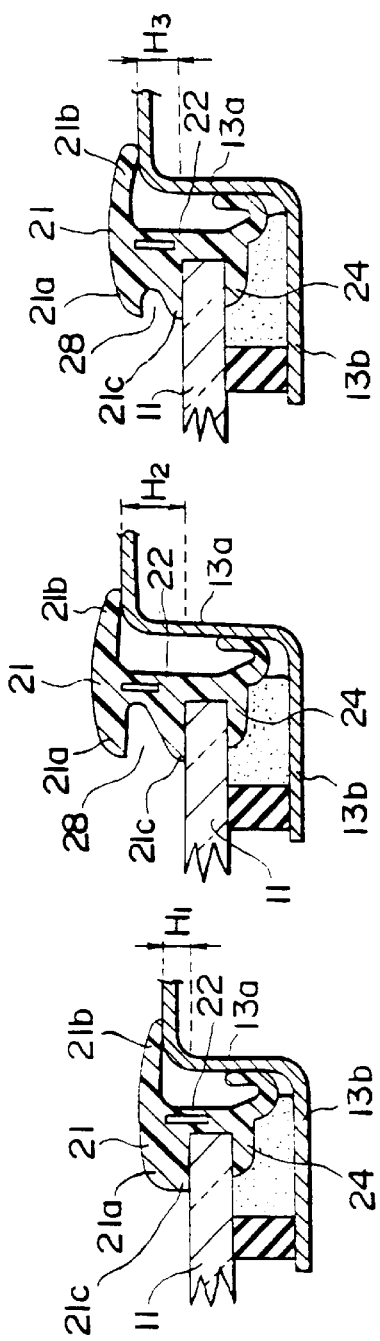

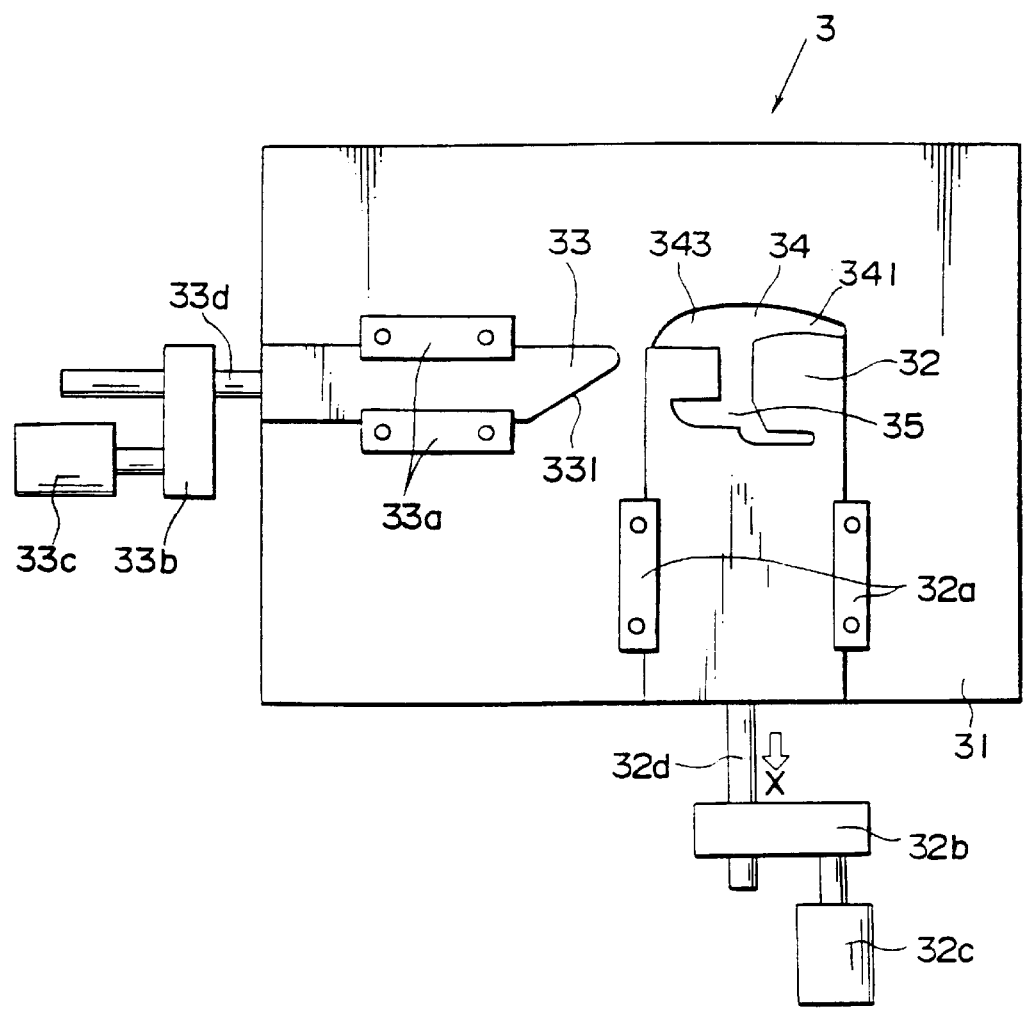

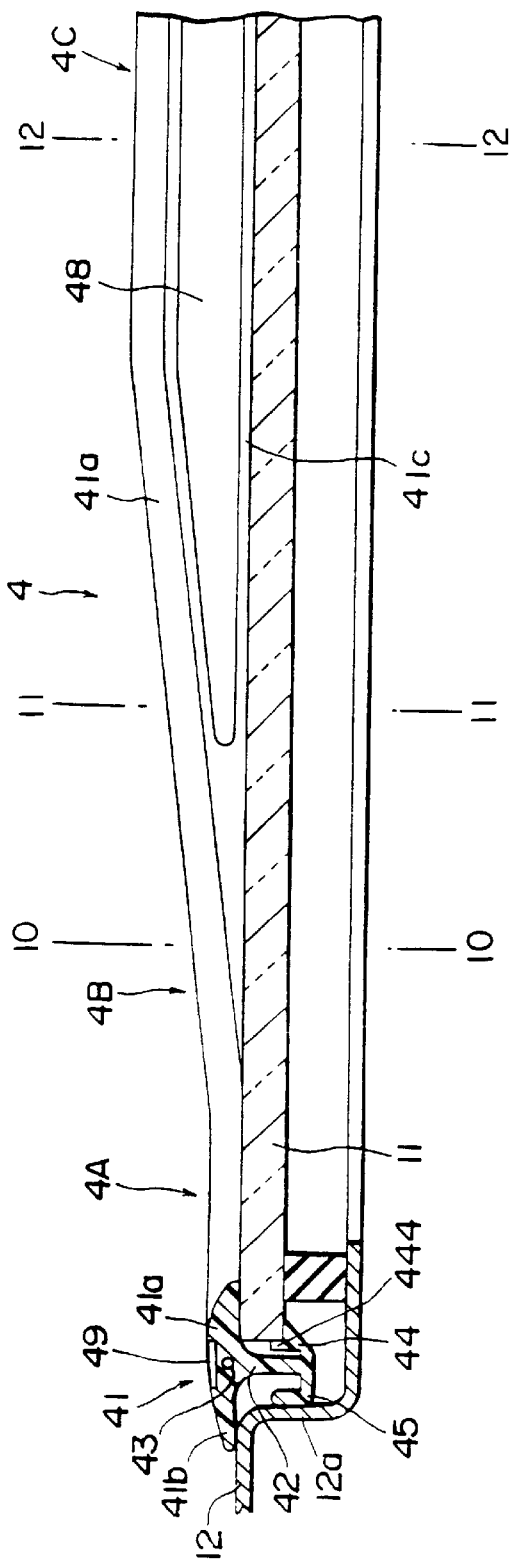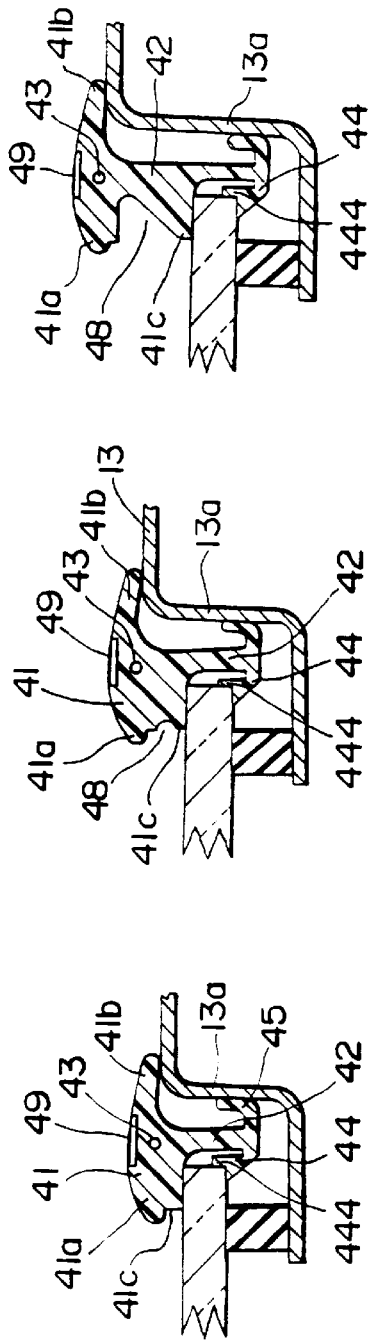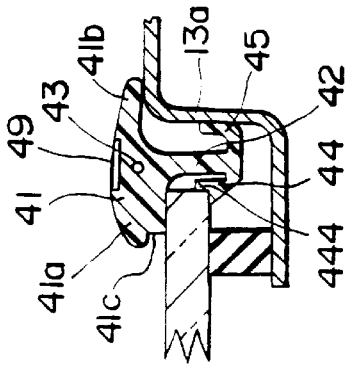

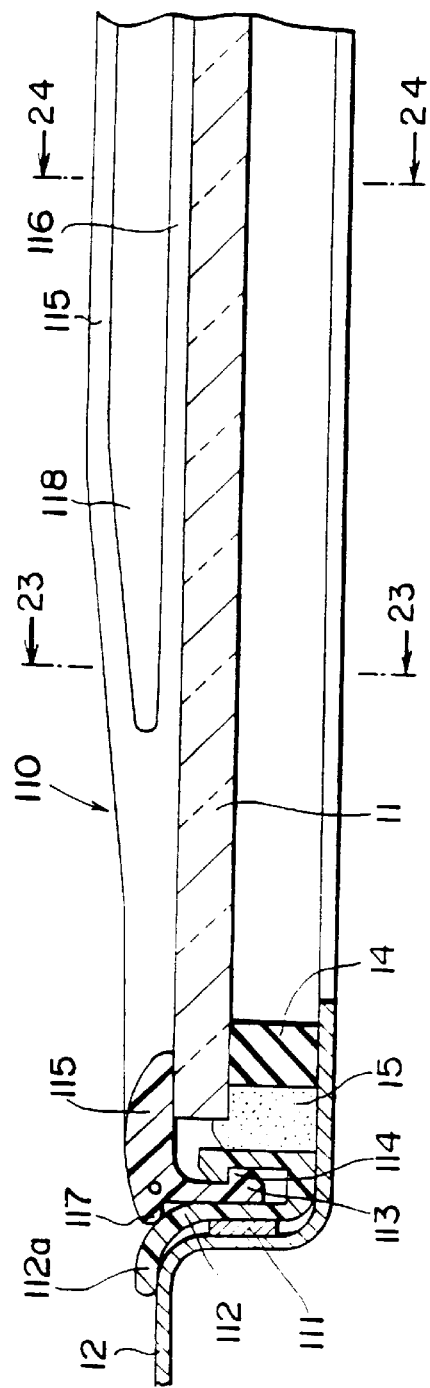
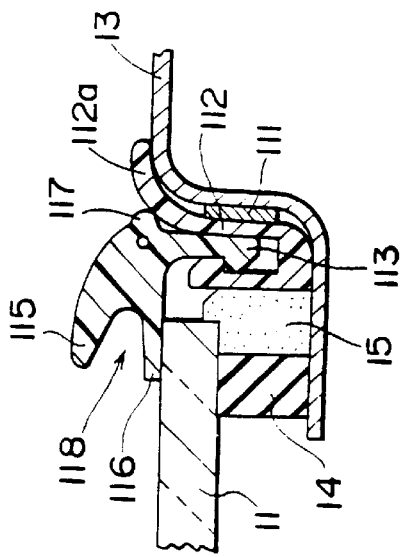
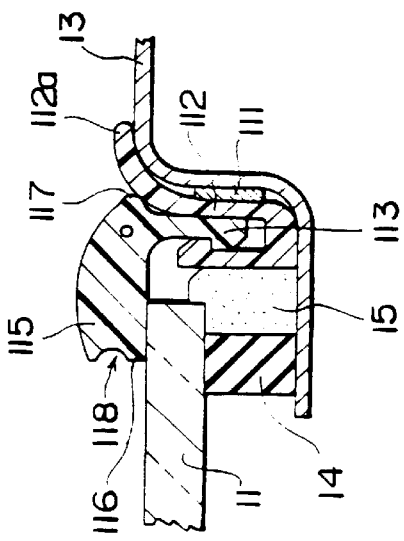

FIG. 42
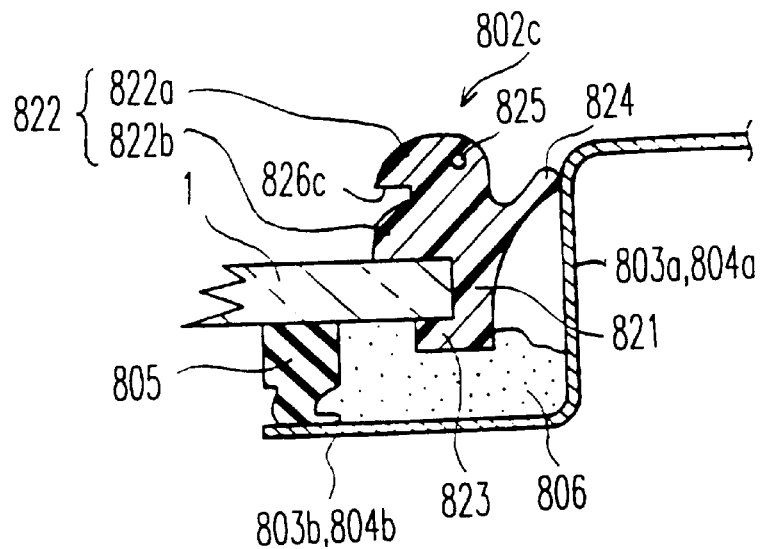
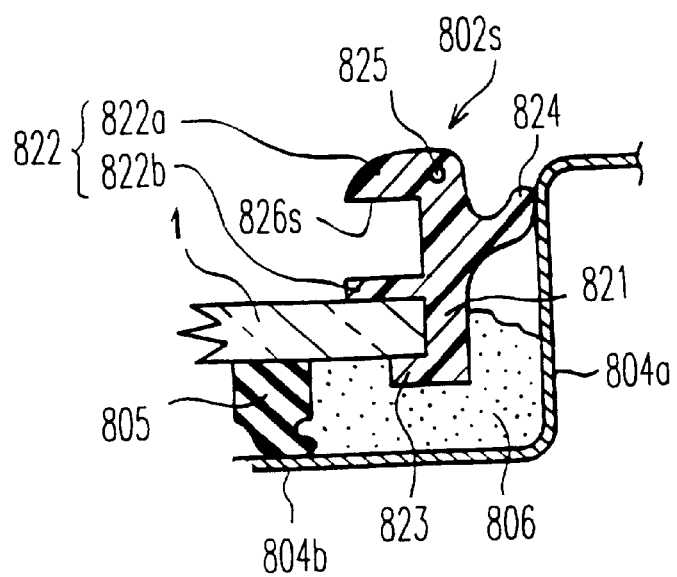
FIG. 43

AUTOMOBILE WINDSHIELD MOLDING AND THE METHOD OF PRODUCING THE SAME

CROSS REFERENCE TO RELATED APPLICATIONS

The present application is a continuation-in-part of application Ser. No. 08/660,925, filed Jun. 10, 1996, now abandoned, which is a continuation application of Ser. No. 08/579,806, filed Dec. 28, 1995, now abandoned, which is a continuation-in-part application of Ser. No. 08/475,618 filed Jun. 7, 1995, now U.S. Pat. No. 5,567,449, which is a divisional application of application Ser. No. 08/291,088, filed Aug. 18, 1994, now U.S. Pat. No. 5,474,729, which is a divisional application of application Ser. No. 08/192,623, filed Feb. 7, 1994, now U.S. Pat. No. 5,374,096, which is a continuation of application Ser. No. 07/781,371, filed Oct. 23, 1991 now abandoned.

This is also a continuation-in-part application of application Ser. No. 08/660,925 and application Ser. No. 08/803,861, filed Feb. 21, 1997, now U.S. Pat. No. 5,718,470, which is a divisional application of application Ser. No. 08/477,268, filed Jun. 7, 1995, now U.S. Pat. No. 5,656,223 which is a divisional application of application Ser. No. 08/582,598, filed Jan. 3, 1996, now U.S. Pat. No. 5,588,691, which is a continuation of application Ser. No. 08/168,192, filed Dec. 17, 1993, now abandoned, which is a continuation-in-part of application Ser. No. 08/215,018, filed Mar. 17, 1994, now U.S. Pat. No. 5,454,614, which is a continuation application of application Ser. No. 08/030,066, filed Mar. 24, 1993 now abandoned.

FIELD OF THE INVENTION

This invention relates to an automobile windshield molding for a motor vehicle body to seal the space between a windshield and a periphery of a window opening of a vehicle body panel, and a method of producing such automobile windshield molding.

DESCRIPTION OF THE RELATED ART

An automobile windshield molding is usually attached around an edge of a windshield to seal the space between a windshield and a window opening of a vehicle body panel. The automobile windshield molding is directly attached to the vehicle body panel or is supported by a fastener fixedly mounted on the body panel.

Examples of such molding are disclosed in Japanese Utility Model Publication No. 54416/1982 and Japanese Utility Model Laid-Open Publication No. 9811/1989. These citations disclose windshield moldings which have water drain channels for receiving water flowing on the surface of the windshield.

Japanese Patent Laid-Open Publication 289427/1987 and Japanese Utility Model Laid-Open Publication No. 28374/1989 describe windshield moldings in which the size of the water drain channels is varied in the longitudinal direction of the molding.

In the latter two cases, the molding is divided into a portion without a water drain channel, a portion with a water drain channel of one size, and a portion with a water drain channel of a different size. These molding portions are separately produced, and are then arranged to be coupled as one unit by an injection molder. When they are coupled, there may be lines between joined areas of the molding parts, which would deteriorate the decorativeness of the molding.

To overcome the foregoing inconvenience, a variety of proposals have been made in Japanese Patent Laid-Open Publications 8019/1988, 269612/1989, 195032/1989. 291721/1988, 244820/1989, 269611/19899, 269613/1989, and 283017/1987, and Japanese Utility Model Laid-Open Publication 128411/1989.

With Japanese Patent Laid-Open Publications 8019/1988 and 283017/1987, the molding has a specified constant cross-sectional shape in the longitudinal direction. The molding is deformed to serve an article at a portion where a water drain channel is to be formed.

In the citation 269612/1989, the molding has a specified constant cross-sectional shape in the longitudinal direction. The molding has a leg portion cut at one side, which is used to receive a windshield and to form a space for a water drain channel.

In 195032/1989, the molding has a specified constant cross-sectional shape, and a portion for a water drain channel is removed at portions where no water drain channel is necessary.

In 291721/1988 and 244820/1989, the molding has two extending portions to form a pair of grooves, and one of the extending portions is cut off at a portion where no water drain channel is necessary.

The citation 128411/1989 discloses a molding which is a modification of the moldings of the two last mentioned citations. In this citation, a corner joint is used to connect upper and side molding parts.

With 269611/1989 and 269613/1989, an upper decorative portion of the molding has a specified configuration, but the shape of a portion for receiving the windshield is changed.

In 269613/1989, the molding has a specified cross-sectional shape longitudinally, and the portion for receiving the windshield is changed in position by cutting to obtain a space for a water drain channel.

The foregoing moldings have drawbacks as described hereinafter.

The moldings of 8019/1988 and 269612/1989 have grooves for water drain channel, which are somewhat insufficient to guide water. In 195032/1989, the molding has a sharp edge on its decorative portion. Such sharp edge should be removed later. The depth of the groove in the side molding part cannot be changed in the longitudinal direction. With 291721/1988 and 244820/1989, the depth of the grooves of the molding cannot be changed in the longitudinal direction. The molding is difficult to attach in the windshield of the automobile since a portion of the molding is cut off to serve as a water drain channel. With 244820/1989, a die should be modified to make a molding.

With the citations 269611/1989, 269913/1989, and 283017/1988, the depth of the grooves can be changed in the longitudinal direction. However, at the upper molding part where no water drain channel is formed, portions of the molding in contact with the surface of the windshield should be housed inside the decorative portion. Therefore, the decorative portion should be made large, which would adversely affect the external appearance of the upper molding, and reduce the field of view from the driver's position. Such large upper molding part might be contrary to a demand for a flush surface between the windshield and the vehicle body panel. At the corner molding part, the molding might be wrinkled since the thin decorative portion is curved abruptly.

A windshield molding is generally installed along the periphery of the windshield glass mounted to the window frame opening of a body panel. To be more precise, a long belt-shaped space is formed between the periphery of the windshield glass and the edge of the window opening of the body panel, and a windshield molding of a long belt-shaped extruded material is inserted into said space for sealing. The windshield molding consists of a support leg, which is inserted in the above-noted space, and a decorative portion, which covers the space on the outside.

Japanese Utility Model Gazette No. 54416/1982 and other background art have been proposed wherein a windshield molding for vehicles has grooves to drain rainwater from the windshield glass. In this case, it is desirable to provide grooves only at the places where they are actually required so as to avoid the creation of whistling sounds during vehicle motion and to avoid the use of a more rigid material. Also, because such rainwater is forced to flow upward on the windshield glass when the vehicle is traveling, the lower end section area of the side molding is able to be comparably small. Therefore, Japanese Utility Model Gazette 15044/1987 and Japanese Utility Model Laid-Open Publication No. 31513/1984 stipulate that such windshield molding should have a groove only in either the upper area or the lower area of the side molding section.

Grooves for the above-noted utility models are formed so as to have constant cross-sections in their longitudinal direction. Therefore, they cannot convey and drain rainwater effectively. Windshield moldings with such grooves cannot be formed in one piece with current extrusion molding technology. Namely, the groove must be formed by injection molding but, in this case, the windshield molding should be composed of more than one connecting member. This requires larger injection molds and increased man hours, resulting in lower productivity. The above publications have not disclosed how to form the groove.

SUMMARY OF THE INVENTION

The present invention therefore intends to provide a vehicle windshield molding with good draining function and the production method thereof with the use of a simple device.

It is therefore an object of this invention to provide an automobile windshield molding, in which a water drain channel is formed along the vehicle body side panel.

According to a first aspect of the present invention, there is provided an automobile windshield molding for sealing a space between a windshield and a periphery of a window opening of a vehicle body panel. The molding comprises an extruded side molding part and an extruded specific molding part integral with and extending from the side molding part. The side and specific molding parts comprise an exterior wing adapted to cover the space, on an exterior side of the vehicle.

The exterior wing comprises an inward wing portion having a uniform exterior contour appearance from the side molding part to the specific molding part; a sub-inward wing portion having an interior surface at the side molding part which continues in succession to an interior surface of the inward wing portion at the specific molding part; and a water drain channel extending in and along the inward wing portion and the sub-inward wing portion and opening inwardly at the side molding part.

At a specified point of the molding, the inward wing portion and the sub-inward wing portion close and merge toward each other such that the water drain channel is gradually reduced in size until the water drain channel is removed.

According to a second aspect of this invention, there is provided a method of producing a strip of an automobile windshield molding: extruding molding material through an opening formed by the dies to form a pair of side molding parts, a pair of corner molding parts and an upper molding part in succession: changing the position of each part in said opening by moving the dies according to the cross-sectional shape of side, corner and upper molding parts to be made; widening part of said opening of the dies to increase the distance between each part of the molding material at a portion corresponding to the cross-sectional shape of a side molding part; projecting one of the dies into the widened part of said opening of the dies at a specified timing to form a water drain channel on the large thickness portion of the side molding part, and reducing part of said opening of the dies to decrease the distance between each part of the molding material and making said each parts of the molding in one body.

The windshield molding of this invention can be manufactured in the shape of strip. The water drain channel can be formed as desired according to a position of each molding part. The molding having a good decorativity can be made as one unit.

To attain the above purpose, the windshield molding for vehicles of the present invention comprises an upper molding part and a pair of side molding parts to be fitted along the periphery from the upper side to both sides of the windshield glass fitted into the window frame opening of the body panel, said windshield molding comprising; a connecting portion to be inserted into a space between the periphery of said windshield glass and an inner edge of the window frame opening of the body panel, a portion or exterior wing to be provided on the outside edge of the support leg to cover said space from the outside, an enlarged thickened portion to be provided in said exterior wing and a water drain channel opening to the inner periphery of the windshield molding, wherein said exterior wing has a constant cross-sectional form throughout the entire length of the windshield molding and is projected outwards apart from the windshield glass surface at least along the side molding section, said enlarged thickened portion is formed in the exterior wing projected from the windshield glass, and said water drain channel opening is provided in the enlarged thickened portion of said exterior wing, the groove depth being changed in the longitudinal direction of the windshield molding.

The production method of the windshield molding for vehicles of the present invention is to produce the upper molding part and the side molding parts which are installed along the periphery of the windshield glass from the upper side to both sides by extrusion molding, wherein said molding is extruded by using dies having an opening for extrusion molding of the exterior wing which covers the above-noted space from the outside, wherein the molding is extruded by keeping the area of the extrusion opening on said die for the exterior wing constant at certain times, wherein at least at the time of producing these side molding parts, the area of the extrusion opening on said die for the exterior wing is increased to provide the enlarged thickened portion in the exterior wing, wherein another die is inserted into the extended area section of the extruded opening on aid die for the exterior wing with specified timing to form the water drain channel on the side wall of said enlarged thickened portion by partly shielding it, and wherein the water drain channel depth is changed by changing the moving distance of said other die during extrusion.

The above production method enables water drain channel to be provided only at the places where they are required, to change groove depth in the longitudinal direction to drain rainwater smoothly and to form the whole windshield molding as a single product.

Therefore, since the present invention is effective in providing water drain channel only at the places where they are required, in changing the water drain channel depth in the longitudinal direction to improve the drainage of rainwater and in forming the whole windshield molding as a single product by molding without adding other processes, it also enables the forming of windshield moldings with rainwater draining grooves of sufficient retaining function easily, satisfactorily and continuously.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 3 is a cross sectional view taken along line 3—3 of FIG. 1;

FIG. 4 is a cross sectional view taken along line 4—4 of FIG. 3;

FIG. 5 is a cross-sectional view taken along line 5—5 of FIG. 3;

FIG. 6 is a cross-sectional view taken along line 6—6 of FIG. 3;

FIG. 7 is a front elevational view of an injection molding machine for making the molding of FIGS. 1 to 6;

FIG. 9 is a front elevational view of the molding according to a second embodiment of the invention;

FIG. 10 is a cross-sectional view taken along line 10—10 of FIG. 9;

FIG. 11 is a cross-sectional view taken along 11—11 of FIG. 9;

FIG. 12 is a cross-sectional view taken along 12—12 of FIG. 9;

FIG. 22 is an enlarged sectional view showing a windshield molding according to a fourth embodiment;

FIG. 23 is a cross-sectional view taken along line 23—23 of FIG. 22;

FIG. 24 is a cross-sectional view taken along line 24—24 of FIG. 22;

FIG. 42, is a cross-sectional view taken along line 42—42 of FIG. 41;

FIG. 43 is a cross-sectional view taken along line 43—43 of FIG. 41;

DESCRIPTION OF THE PREFERRED EMBODIMENTS

The disclosure of each of the above-identified applications to which the present application is cross referenced is hereby incorporated by reference.

An automobile windshield molding according to a first embodiment of the invention is shown in FIGS. 1 to 6.

Figure 1:
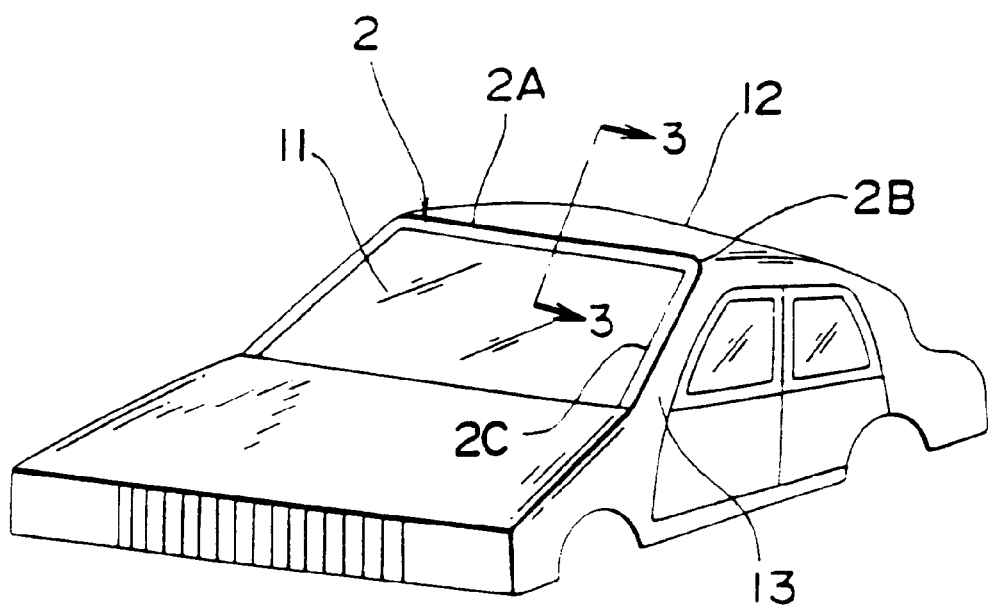
FIG. 1 is a front perspective view of a vehicle body having a windshield molding.

As shown in FIG. 1, a molding 2 is installed to seal the space between a windshield 11 and a periphery of a window opening of a vehicle body panel.

The molding 2 is a long plastic strip in the shape of a T, and an upper molding part 2A to be mounted between the upper edge of the windshield and the roof panel 12, side molding parts 2C between side edges of the windshield 11 and pillar panels 13 of the vehicle body, and corner molding parts 2B for connecting the upper and side molding parts 2A and 2B. All of these molding parts 2A and 2B are extruded as one unit.

Each of the side, corner and upper molding parts 2A to 2C comprises an exterior wing 21 adapted to cover a space, on the exterior side of the vehicle, between the window-opening periphery of the vehicle body panel and each of the side, corner and upper edges of the windshield.

The exterior wing 21 includes an inward wing portion 21a for covering the peripheral edge of the windshield 11, an outward wing portion 21b for covering the periphery of the vehicle body panels 12, 13, and a connecting portion 22 extending from an interior side of the exterior wing 21.

The outward wing portion 21b is a lip-shaped member having a uniform thickness in its longitudinal direction. The inward wing portion 21a is a lip-shaped member, being uniformly thick on the upper molding part 2A, but gradually thickening from the corner molding part 2B to the side molding part 2C. Specifically, the inward wing portion 21a is thickest at the central portion of the side molding part 2C. Then the inward wing portion 21a gradually becomes thinner toward the end of the side molding part 2C. The windshield 11 is received in a U-shaped space between the inward wing portion 21a and a foot 24 of the connecting portion 22 from the upper molding part 2A to the corner molding part corner molding part 2B.

Figure 2:
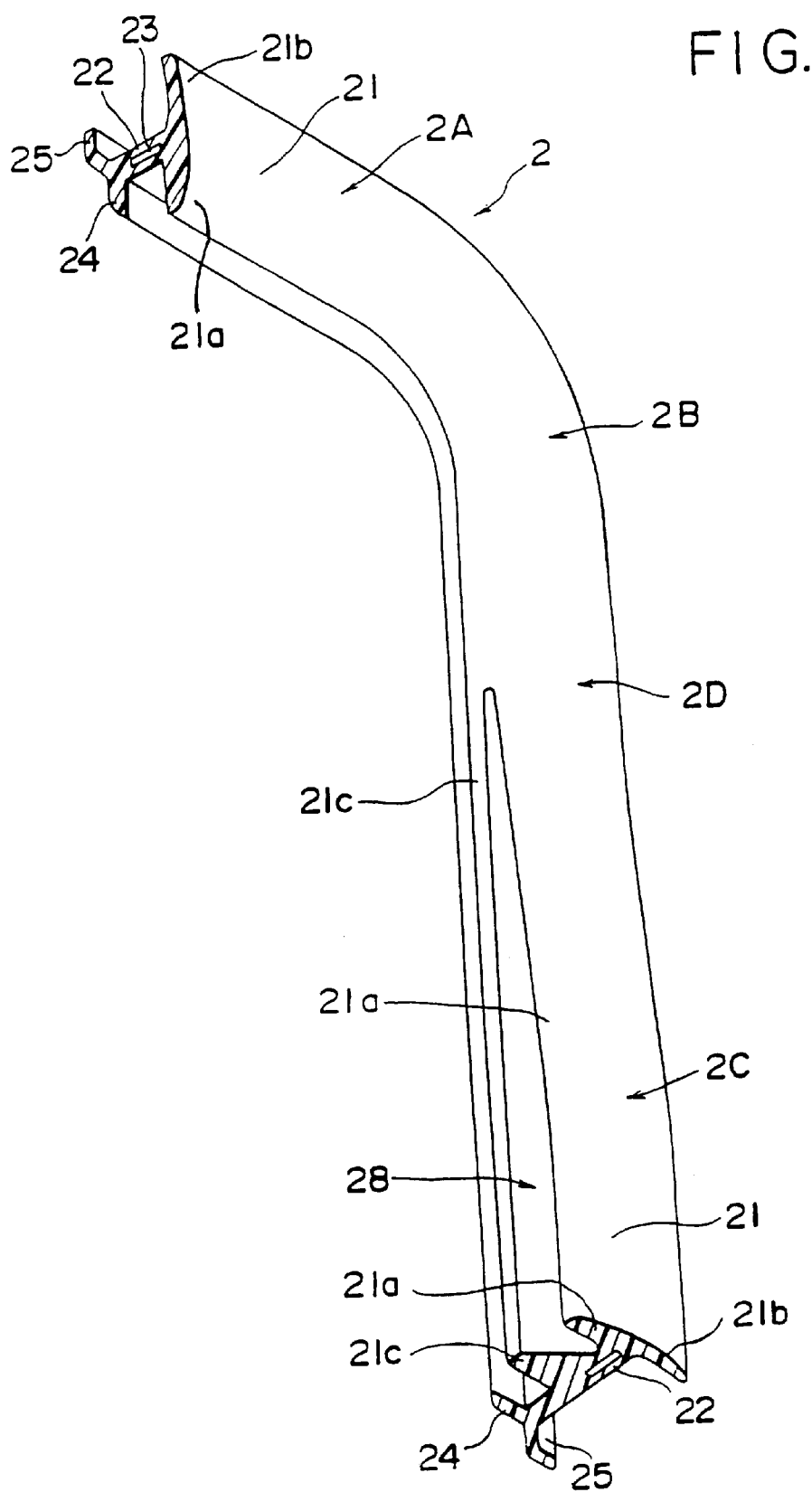
FIG. 2 is a perspective view of a windshield molding according a first embodiment of the invention.

The connecting portion 22 has the foot 24 extending inwardly along the end thereof as shown in FIG. 2. The foot 24 serves to assist in supporting the windshield 11. The connecting portion 22 also has a flexible lip 25 extends outwardly along the end thereof.

The connecting portion 22 divides the interior side of the exterior wing 21 into inward and outward surfaces. There is a varying difference in height between the inward and outward surfaces. The height of the exterior wing 21 including connecting portion 22 is shortest on the upper molding part 2A (shown in FIG. 3), and gradually increases on the side molding parts 2C (shown in FIGS. 4 to 6), because the distance between the surface of the windshield 11 and the surface of the front pillars 13 is increased compared with the distance between the surface of the windshield 11 and the surface of the roof panel 12. Specifically, the height of the exterior wing 21 including connecting portion 22 gradually increases from the corner molding part 2B toward the central portion of the side molding part 2C, and again becomes a little shorter at the end of the side molding part 2C.

A thin metallic foil 23 serving as a core metal is embedded lengthwise in the portion from the connecting portion 22 to the exterior wing 21.

At the majority of the side molding part 2C, the windshield 11 is received in the space formed between the foot 24 of the connecting portion 22 and a sub-inward wing portion 21c which is formed as the lower wall of the exterior wing 21 gradually becomes thicker. A water drain channel 28 is formed between the inward wing portion 21a and the sub-inward wing portion 21c (FIG. 2). The upper surface of the foot 24 and the interior side of the inward wing portion 21a are parallel with each other at the upper and corner molding parts. The upper surface of the foot 24 and the interior side of the sub-inward wing portion 21c are parallel with each other at the side molding parts. In other words, the distance between the foot 24 and the inward wing portion 21a (or the sub-inward wing portion 21c at the side molding parts) is equal to the thickness of the windshield 11.

The inward and outward wing portions 21a, 21b have a uniform exterior contour appearance along the entire molding and the sub-inward wing portion 21c has a uniform interior surface along the side molding parts 2C. The interior surface of the sub-inward wing portion 21c continues in succession from the side molding parts 2C to the interior surface of said inward wing portion 21a of the corner molding part 2B and the upper molding part 2A. The interior surface of the inward wing portion 21a breaks between the side molding parts 2C and the upper molding part 2A. However, the inward wing portion 21a and the sub-inward wing portion 21c are gradually separated from each other between the corner molding part and the side molding part since the exterior wing 21 becomes thicker and the water drain channel 28 is gradually widened and deepened according to a difference H in height between the upper surface of the windshield 11 and height of the roof panel 12. On the upper molding part 2A, the surface of the roof panel 12 and the upper surface of the windshield 11 are flush as shown in FIG. 3. FIG. 4 shows that there is a height difference $H_1$ between the roof panel 12 and the windshield 11 at the beginning of the side molding part 2C. FIG. 5 shows that the largest height difference $H_2$ is at the center of the side molding part 2C. The distance between the inward wing portion 21a and the sub-inward wing portion 21c is largest on the central side molding part 2C, and is formed with a water drain channel 28. Then the distance between the inward wing portion 21a and the sub-inward wing portion 21c is gradually reduced toward the end of the side molding part 2C. The thickness of the exterior wing 21 is also changed in its length according to the distance between the inward wing portion 21a and the sub-inward wing portion 21c.

The water drain channel 28 is defined between the inward wing portion 21a and the sub-inward wing portion 21c of each side molding part 2C. The water drain channel 28 has a triangular cross section and gradually changes its depth. The drain channel 28 is located between the end 2D of the corner molding part 2B and the end of the entire molding. Therefore, the inward wing portion 21a and the sub-inward wing portion 21c keep their shapes uniform throughout the entire molding by adjusting the depth and width of the water drain channel 28 at the side molding parts. At the end of the side molding part 2C, the inward wing portion 21a and the sub-inward wing portion 21c come near each other, finally merging. Then the water drain channel 28 disappears completely. The thickness of the merging body is gradually thinned toward the upper molding part 2A such that the exterior contour appearance of the merging body converges with that of the upper molding part 2A. The exterior contour appearance of the upper molding part 2A is the same as the inward wing portion 21a at the side molding part 2C.

In FIG. 2, the length of the channel 28 is in a direction parallel to the length of side molding part 2C while the depth is in a lateral direction thereto.

The molding 2 will be attached to the windshield 11 and the vehicle body as described below.

FIGS. 3 to 6 show the manner in which the molding 2 is attached between the corner and the side edges of the windshield 11.

A window opening of the roof panel 12 has a slanted wall 12a and a flange 13b for receiving the windshield 11. The front pillar 13 also has a slanted wall 13a and the flange 13b for receiving the windshield 11. The height of the slanted wall 13a gradually increases from the corner to the side of the vehicle body panel compared with the slanted wall 12a.

Firstly, the molding 2 is attached around the peripheral edge of the windshield 11. Between the upper and corner parts, the edge of the windshield 11 is sandwiched between the foot 24 and the interior side of the inward wing portion 21a. At the side molding parts 2C, each of the side edges of the windshield 11 is sandwiched between the foot 24 and the interior side of the wall of the sub-inward wing portion 21c. Since the inward wing portion 21a and the sub-inward wing portion 21c are relatively thin at the corner molding part 2B, the molding 2 curves without wrinkles according to the shape of the corner part of the window opening of the vehicle body panel.

A dam rubber 14 of a strip shape is applied around the edges of the flanges 12b and 13b. An adhesive 15 is applied to the outer edge of the dam rubber 14. Then the windshield 11 having the molding 2 mounted therearound is placed on the dam rubber 14. The windshield 11 is then pressed toward the vehicle body, so that the outward wing portion 21b of the molding 2 overlies the body panels 12, 13. Therefore, the foot 24 of the molding 2 is fastened by the adhesive 15, and the flexible lip 25 of the molding 2 flexibly contacts the slanted walls 12a, 13b, thereby fastening the windshield 11 to the body panel.

The difference of the height between the outer surface of the body panel and the windshield 11 is equal to the difference in height between the slanted walls 12a and 13a as shown in FIGS. 3 to 6. As shown in FIG. 3, the upper edge of the windshield 11 is nearly flush with the surface of the roof panel 12. The height difference $H_1$ is small between the windshield 11 and the corner part of the front pillar 13 (shown in FIG. 4), while the difference $H_2$ is large at the central side edges of the windshield 11 (shown in FIG. 5). The difference $H_3$ between the end of the side molding pat and the front pillar 13 is larger than $H_1$ but smaller than $H_2$ (shown in FIG. 6).

It is understood that the distance between the inward wing portion 21a and the sub-inward wing portion 21c of the molding 2 is changed according to the varying difference of the height between the windshield 11 and the body panel, and that the depth and width of the water drain channel 28 varies accordingly.

The edge of the outward wing portion 21b of the molding 2 is in close contact with the roof panel 12 between the upper and corner parts of the windshield 11. From the upper to corner molding parts, the inward wing portion 21a slightly extends upwardly, i.e. as shown in FIG. 4, the sub-inward wing portion 21c is formed under the inward wing portion 21a. Therefore water is guided on the surface of the windshield along the wall of the inward wing portion 21a.

Since the inward wing portion 21a accompanies the sub-inward wing portion 21c at the corner molding parts, the exterior wing 21 is free from wrinkles even if it is bent along the corner portions.

The molding 2 can be installed in the window opening of the vehicle after the windshield 11 has been attached thereto. Otherwise, the molding can be inserted into the space between the window opening and the windshield 11 attached therein.

A molding machine for producing the molding 2 will be described with reference to FIGS. 7 and 8.

A molding machine 3 comprises three dies having openings through which the plastic material is extruded. These dies are first, second and third dies 31, 32, 33, respectively, positioned parallel to the direction for extruding the plastic material, i.e. in the direction perpendicular to the plane of FIGS. 7 and 8.

The first die 31 is stationary, having an opening 34 shaped in the shape of a vertically long rectangle according to the cross-sectional shape of the molding 2. Specifically, the upper portion of the opening 34 corresponds to the cross-sectional shape of the exterior wing 21, and the lower portion of the opening 34 substantially corresponds to the cross-sectional shape of the connecting portion 22, foot 24 and flexible lip 25.

The opening 34 has an upper edge in the shape of an arc which defines portions 341 and 343 with the shield 342 corresponding to the shape of the upper side of the exterior wing 21, and a portion 345 corresponding to the shape of the sub-inward wing portion 21c. The lower edge of the portion 341 together with the shield 342 correspond to the shape of the lower part of the outward wing portion 21b. The section of the portions 343 and 345 substantially correspond to the cross-sectional shape of the inward wing portion 21a and the sub-inward wing portion 21c. The inward wing portion 21a and the sub-inward wing portion 21c are in succession when the water drain channel 28 is not formed.

The second and third dies 32, 33 are rectangular plates, which are respectively supported by a pair of guides 32a and a pair of guides 33a to be movable in parallel to the front side of the first die 31.

The second die 32 has an opening 35 which corresponds to the cross-sectional shape of the connecting portion 22, foot 24 and the flexible lip 25. The second die 32 is placed on the first die 31 so that the openings 34, 35 of the first and second dies 31, 32 are in the shape of the molding 2. The second die 32 has at its lower portion an operation lever 32d, which is connected to a motor 32c via a converter 32b for converting rotary motion of the motor 32c into rectilinear motion. When driven by the motor 32c, the second die 32 reciprocates between the positions for forming the upper and lower molding portions shown in FIGS. 7 and 8, respectively.

The third die 33 is a thin rectangular plate having a slanted edge 331 pointed with an acute angle corresponding to the water drain channel 28, reciprocating in the direction perpendicular to the second die 32. The third die 33 is connected to a motor 33c via an operation lever 33d and a converter 33b for converting the rotary motion to the rectilinear motion. The third die 33 is guided into and out of the opening 34 of the first die 31 so that the slanted edge 331 advances into the areas 343 and 345 to form the water drain channel 28 between the inward wing portion 21a and the sub-inward wing portion 21c of the molding 2. The third die 33 reciprocates according to the movement of the second die 32.

In operation, the molding machine 3 produces the molding 2 as described hereinbelow.

The molding 2 comprises a side molding part 2C, a corner molding part 2B, an upper molding part 2A, a corner molding part 2B and a side molding part 2C formed in the named order in succession.

Figure 8:
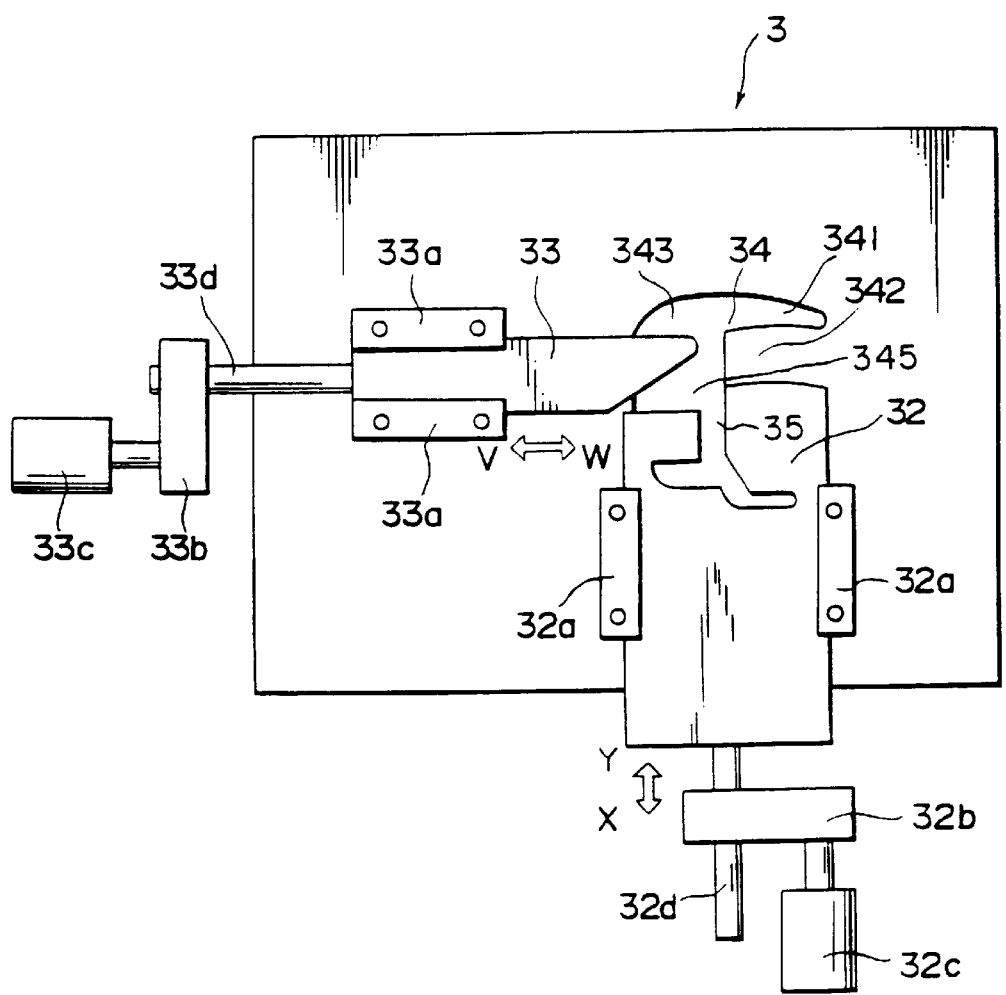
FIG. 8 shows how the molding machine operates.

Each of the side molding 2C and corner molding 2B will be extruded in order of 2C, 2B, 2A on one side and 2B, 2C on another side and shaped as described referring to FIG. 8. Firstly, the second die 32 is placed on the first die 31 so that the openings 34 and 35 of the first and second dies are in the cross-sectional shape of the side molding part 2C. The plastic material is extruded through the openings 34 and 35 together with a metallic foil strip 23 inserted at a position corresponding to the connecting portion 22 of the opening 34. In this case, the second die 32 is somewhat raised in the direction shown by an arrow Y, and the third die 33 is somewhat retracted in the direction shown by an arrow V.

The plastic material is extruded to a preset extent under this condition. Then the second die 32 is lowered in the direction X. The portions 343, 345 of the opening 34 of the first die 31 are gradually widened to increase the space which portion forms a groove. Then sub-inward wing portion 21c will be formed under the groove. The other portions of the side molding part 2C are shaped without any change.

The third die 33 is advanced in the direction W as the space between the inward wing portion 21a and the sub-inward wing portion 21c becomes larger to form the groove therein. Thus the third die 33 forms the groove as the water drain channel 28 between the inward wing portion 21a and the sub-inward wing portion 21c. Since the third die 33 is moved in synchronization with the moving speed of the second die 32, the depth and the width of the opening of the drain channel 28 are increased but the exterior contour appearance of the inward wing portion 21a and the sub-inward wing portion 21c respectively are the same through the entire molding. Under the condition shown in FIG. 8, the distance between the inward wing portion 21a and the sub-inward wing proportion 21c is largest, and the water drain channel 28 is the widest and deepest to the preset length of the side molding part 2C.

When the side molding part 2C is extruded to the specified length and a corner molding part 2B is to be formed, the second die 32 is raised again in the direction Y and the third die 33 is retracted to the direction V. Then, the distance between the portions 343 and 345 are reduced, thus the distance between the inward wing portion 21a and the sub-inward wing portion 21c are reduced and the size of the water drain channel 28 is reduced. Under this condition the inward wing portion 21a and the sub-inward wing portion 21c remain uniform in thickness through the entire molding 2. The other portions of the side molding part remain unchanged.

When the third die 33 is retracted completely from the portions 343, 345 of the opening 34, the second die 32 is moved in the direction Y until the top of the second die 32 is flush with the edge of the shield 342 of the first die 31. Under this condition, the molding extruded from the opening 34 is shaped so that the distance between the inward wing portion 21a and the sub-inward wing portion 21c is gradually reduced. When the portions 21a and 21c merge, the water drain channel 28 disappears. After that, the corner molding part 2B is extruded while the top of the shield 342 of the first die 31 and the upper edge of the second die 32 are closed with each other. After that, the shape of the openings 34 and 35 matched together corresponds to the cross-sectional shape of the upper molding part 2A. Under this condition, the motors are stopped, and the plastic material is extruded through the openings 34 and 35 for a predetermined period of time to produce the upper molding part 2A.

When the upper molding part 2A becomes long as specified, the motor 32c is driven again to produce the corner molding part 2B and the side molding part 2C on another side in the order named. Thus the molding 2 is produced in the shape of a strip.

A second embodiment of the invention will be described referring to FIGS. 9 to 12.

FIG. 9 is a cross-sectional view showing a windshield molding 4 according to the second embodiment. The molding 4 comprises a pair of extruded side molding parts 4C, a pair of extruded corner molding parts 4B, and an extruded upper molding part 4A integral with and extending between the side and corner molding parts.

Each of the molding parts 4A, 4B and 4C includes an exterior wing 41 and a connecting portion 42. The exterior wing 41 has an inward wing portion 41a and an outward wing portion 41b. The outward wing portion 41b has a uniform shape and thickness throughout the molding parts 4A to 4C.

The connecting portion 42 has a foot 44 extending inwardly along the lower end thereof. The foot 44 has a forked portion 444 at its end. One of the forked portion 444 contacts with the lower side of the windshield 11, and another of the forked portion 444 contacts with the side of the windshield 11. Namely, the forked portion 444 contacts with an interior edge of the windshield 11. A flexible lip 45 extends outwardly along the lower end of the connecting portion 42. A wire 43 serving as a core material is embedded along the joint between the connecting portion 42 and the exterior wing 41 of the molding 4.

A decorative metal film 49 is embedded along the central portion of the exterior wing 41 of the molding 4, i.e. along the corner between the inward wing portion 41a and the outward wing portion 41b. The outward wing portion 41b has a uniform thickness throughout the molding 4.

The distance between the inward wing portion 41a and the sub-inward wing portion 41c of the molding 4 is changed according to the varying difference in height between the body panels 12, 13 and the windshield 11. The depth and width of a water drain channel 48 are varied with the distance between the inward wing portion 41a and the sub-inward wing portion 41c.

FIG. 10 shows that the inward wing portion 41a and the sub-inward wing portion 41c are close each other at the beginning of the side molding part 4C, since the difference in height between the upper surface of the windshield 11 and the vehicle body panel is small.

FIG. 11 is a cross-sectional view taken along line VI—VI of FIG. 9, showing that a water drain channel 48 is very small.

As shown in FIG. 12, the water drain channel 48 is widest and deepest where the distance between the inward wing portion 41a and the sub-inward wing portion is largest. The water drain channel 48 is triangular in its cross section. The inward wing portion 41a and the sub-inward wing portion 41c are uniformly thick throughout the side molding part 4C.

The depth and width of the water drain channel 48 depends upon the distance between the inward wing portion 41a and the sub-inward wing portion 41c.

The molding 4 of the second embodiment is as effective as the molding of the first embodiment.

Figure 13:
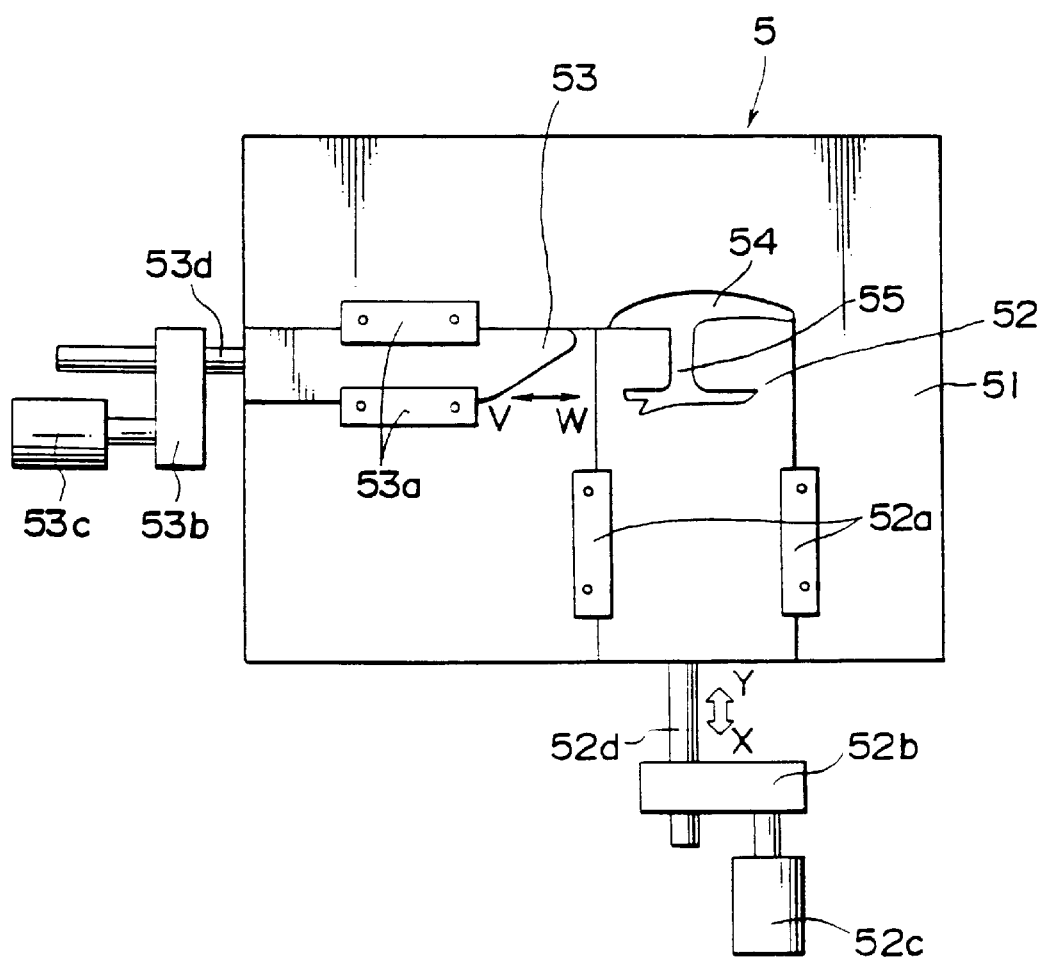
FIG. 13 is a front elevational view of an injection molding machine for making the molding of FIGS. 9 to 12.

A molding machine for producing the molding 4 will be described with reference to FIG. 13.

A molding machine 5 comprises three dies having openings through which the plastic material is extruded. These dies are first, second and third dies 51, 52, 53 positioned parallel to the direction for extruding the plastic material, i.e. in the direction perpendicular to the plane of FIG. 13.

The first die 51 is stationary, having an opening 54 in the shape of a vertically long rectangle according to the cross-sectional shape of the mold 4. Specifically, the upper portion of the opening 54 corresponds to the cross-sectional shape of the exterior wing 41, and the lower portion of the opening 54 substantially corresponds to the cross-sectional shape of the connecting portion 42, foot 44 and flexible lip 45.

The second and third dies 52, 53 are rectangular plates which are respectively supported by a pair of guides 52a and a pair of guides 53a to be movable in parallel to the front side of the first die 51.

The second die 52 has an opening 55 which corresponds to the cross-sectional shape of the connecting portion 42, foot 44 and the flexible lip 45. The second die 52 is placed on the first die 51 so that the openings 54, 55 of the first and second dies 51, 52 are in the shape of the molding 4. The second die 52 has at its lower portion an operation lever 52d, which is connected to a motor 52c via a converter 52b for converting rotary motion of the motor 52c into rectilinear motion. When driven by the motor 52c, the second die 52 reciprocates between the positions for forming the upper and lower molding portions.

The third die 53 is a thin rectangular plate having a slanted edge corresponding to the water drain channel 48, reciprocating in the direction perpendicular to the second die 52. The third die 53 is connected to a motor 53c via an operation lever 53d and a converter 53b for converting the rotary motion to the rectilinear motion. The third die 53 is guided into and out of the opening 54 of the first die 51 so that the slanted edge advances into the opening 54 of the first die 51. The third die 53 reciprocates according to the movement of the second die 52.

In operation, the molding machine 5 produces the molding 4 by moving the two dies 52, 53 as described with reference to the first embodiment.

Figure 14:
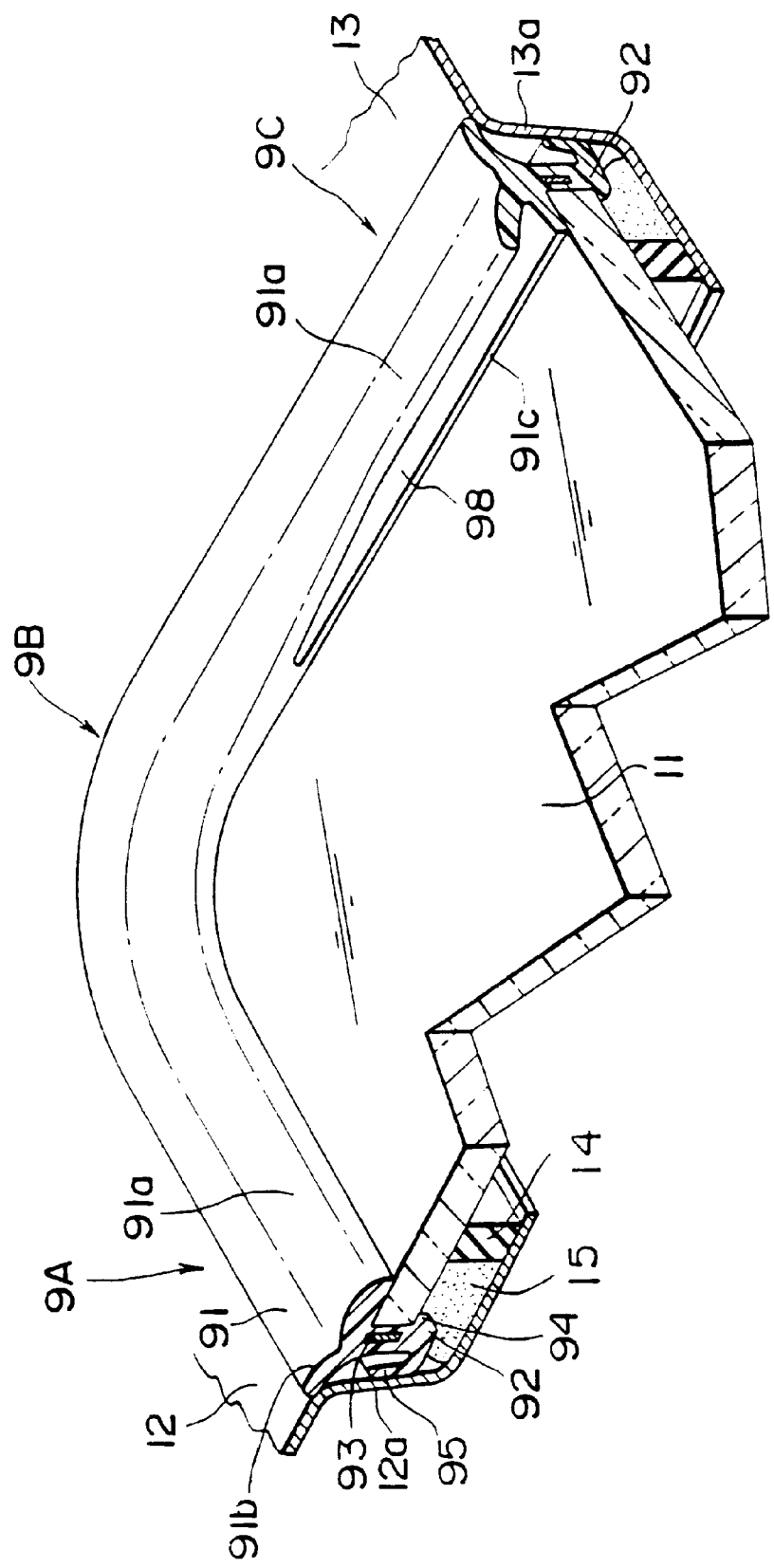
FIG. 14 is a partial cross-sectional view of a corner portion of a windshield molding according to a third embodiment of the invention.
Figure 15:
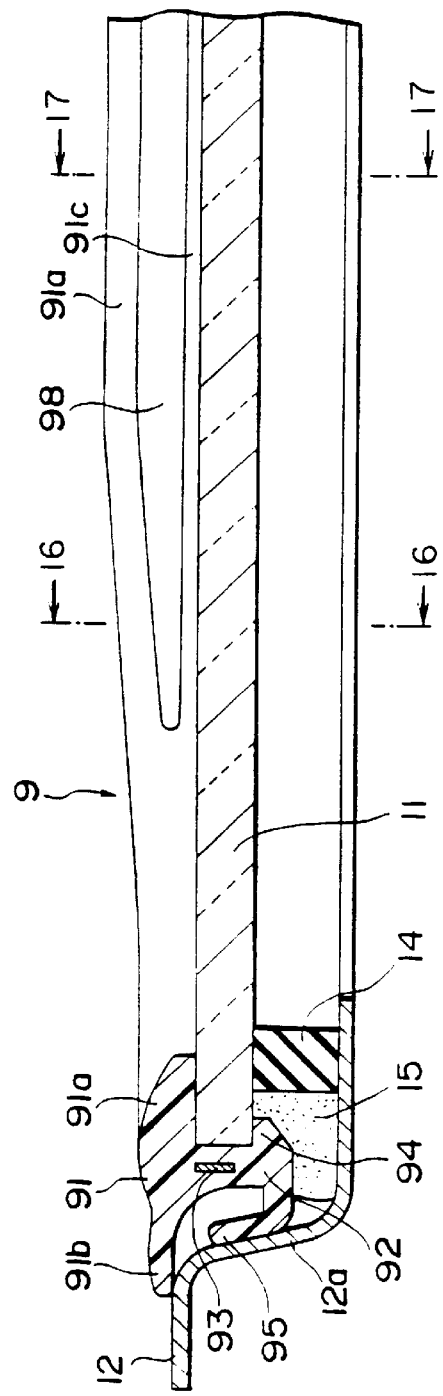
FIG. 15 is a cross-sectional view of the molding of FIG. 14.

FIGS. 14 to 17 show a third embodiment of the invention. As shown in FIG. 14, a molding 9 comprises a pair of extruded side molding parts 9C, a pair of extruded corner molding parts 9B, and an extruded upper molding part 9A integral with and extending between the side and corner molding parts.

Each of the molding parts 9A, 9B and 9C includes an exterior wing 91 and a connecting portion 92. The exterior wing 91 has an inward wing portion 91a and an outward wing portion 91b.

As shown in FIG. 14, the connecting portion 92 includes a foot 94 extending inwardly along the lower end thereof. At the upper molding part 9A, the upper edge of the windshield 11 is received in the space formed by the foot 94 and the inward wing portion 91a. At the majority of the side molding part 9C, the inward wing portion 91a is gradually projected to the exterior direction to form a sub-inward wing portion 91c thereunder. A water drain channel 98 is formed between the inward wing portion 91a and the sub-inward wing portion 91c. Therefore, the edge of the windshield 11 is received in the U-shaped space between the foot 94 and the sub-inward wing portion 91c. The U-shaped space for receiving the windshield 11 is uniform in the shape throughout the whole of the molding parts.

The connecting portion 92 has a flexible lip 95 extending from the lower end thereof toward the vehicle body panels 12, 13 throughout the molding parts. The flexible lip 95 is bent into an L-shape to contact with the slanted walls 12a, 13a. A core metal 93 is longitudinally embedded at the joint between the exterior wing 91 and the connecting portion 92.

In this embodiment, the body panels 12, 13 are equal in height, having a uniform cross-sectional shape. The molding 9 has a uniform cross-sectional shape except for the side molding part 9C where the inward wing portion 91a is gradually bulged to form the sub-inward wing portion 91c thereunder.

Figure 17:
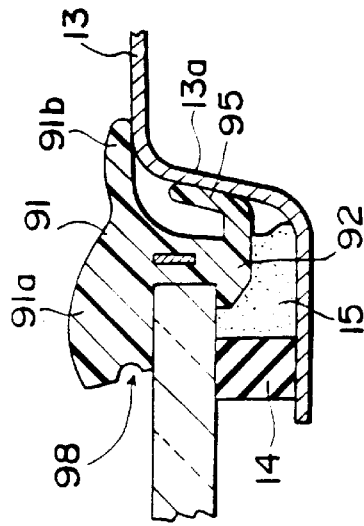
FIG. 17 is a cross-sectional view taken along line 17—17 of FIG. 15.

Near the end of the side molding part as shown in FIG. 17, the distance between the inward wing portion 91a and the sub-inward wing portion 91c is largest. The water drain channel 98 having a triangular cross-sectional shape is widest and deepest between the inward wing portion 91a and the sub-inward wing portion 91c.

Figure 16:
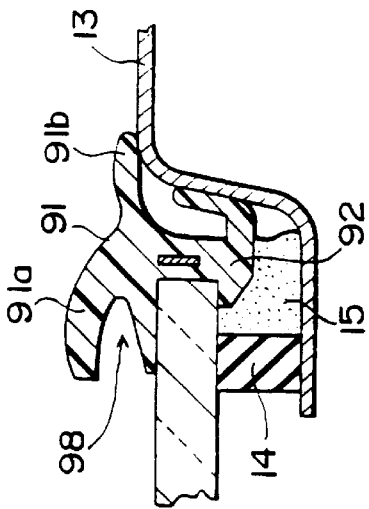
FIG. 16 is a cross-sectional view taken along line 16—16 of FIG. 15.

Toward the upper region of the side molding part 9C, the water drain channel 98 gradually becomes smaller in terms of depth and width as shown in FIG. 16. Therefore, the distance between the inward wing portion 91a and the sub-inward wing portion 91c also becomes smaller. Near the corner molding part 9B, the water drain channel 98 disappears completely, thereby making the inward wing portion 91a and the sub-inward wing portion 91c close each other. No water drain channel is formed on the upper molding part 9A.

The molding 9 thus formed can function as effectively as the molding of the first embodiment.

Figure 18:
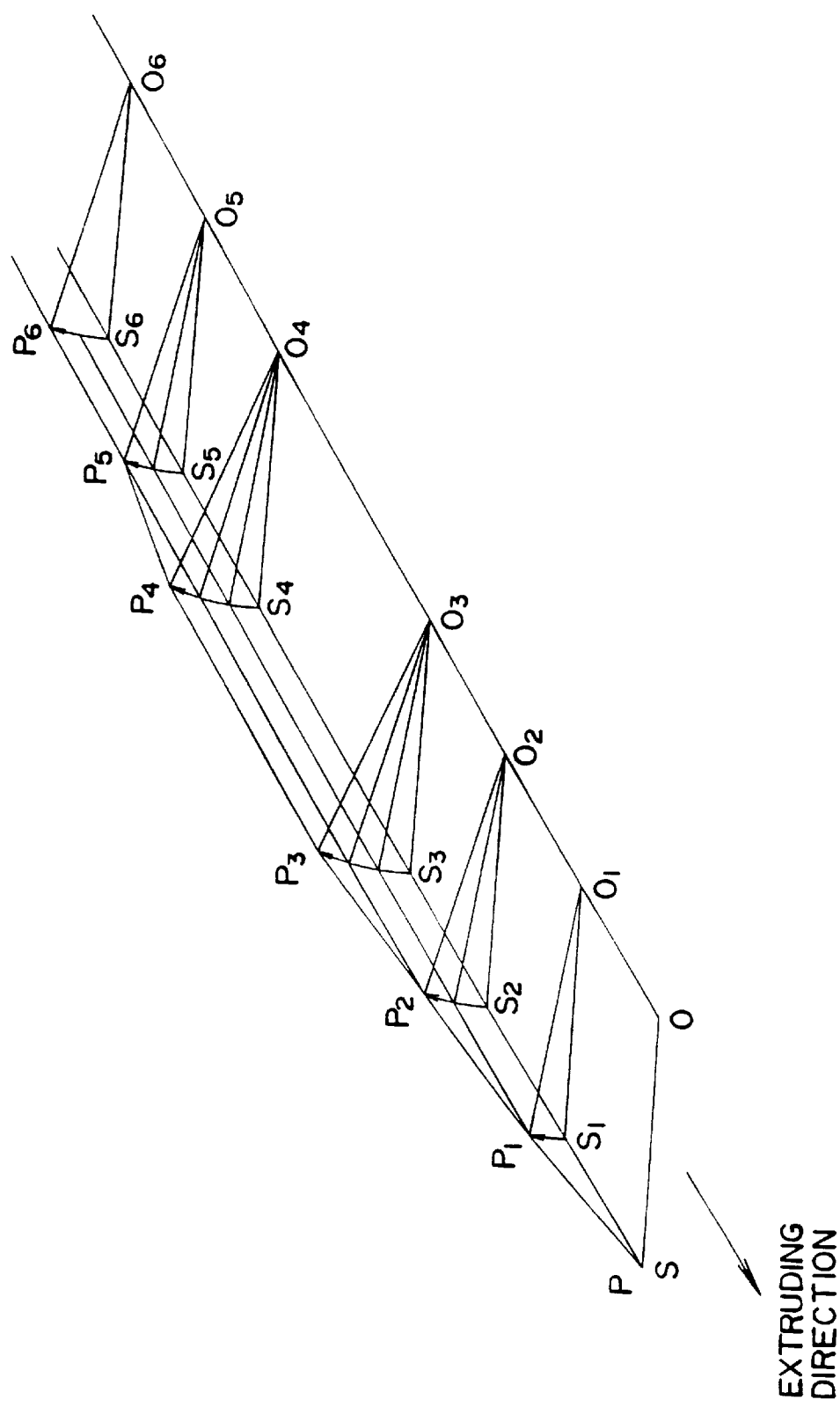
FIG. 18 is a schematic perspective view showing the surface of a side molding part.

The inward wing portion 91a gradually bulges at the majority of the side molding parts 9C. As shown in FIG. 14, the inward wing portion 91a bulges as if it rotates with a radius OP. The edge of the inward wing portion 91a is contoured as shown by $O_1P_1, O_2P_2, \ldots, O_5P_5, O_6P_6$, in FIG. 18.

In FIGS. 14 to 17, reference numeral 15 stands for a sealant for adhering the molding 9 and the windshield 11 to the body panels 12, 13, and 14 represents a dam rubber for preventing the sealant 15 from flowing.

The molding 9 will be attached to the wing opening of the vehicle as described with reference to the foregoing embodiments.

Figure 19:
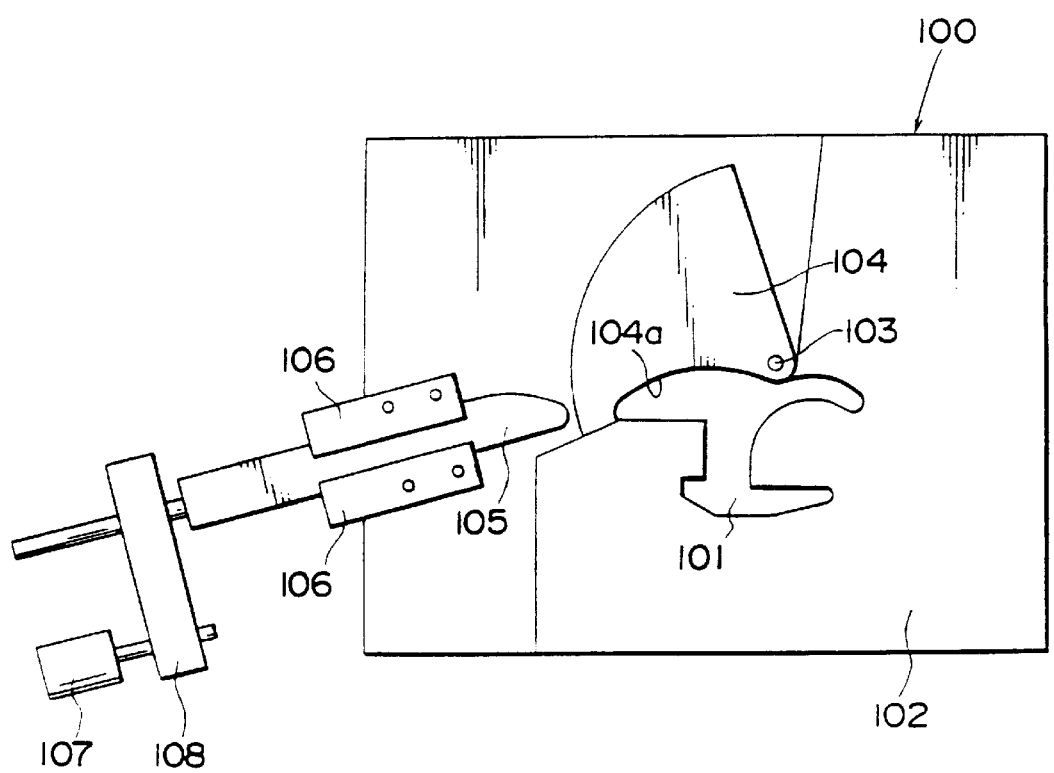
FIG. 19 is a front elevational view of an injection molding machine for making the molding of FIGS. 14 to 17.
Figure 20:
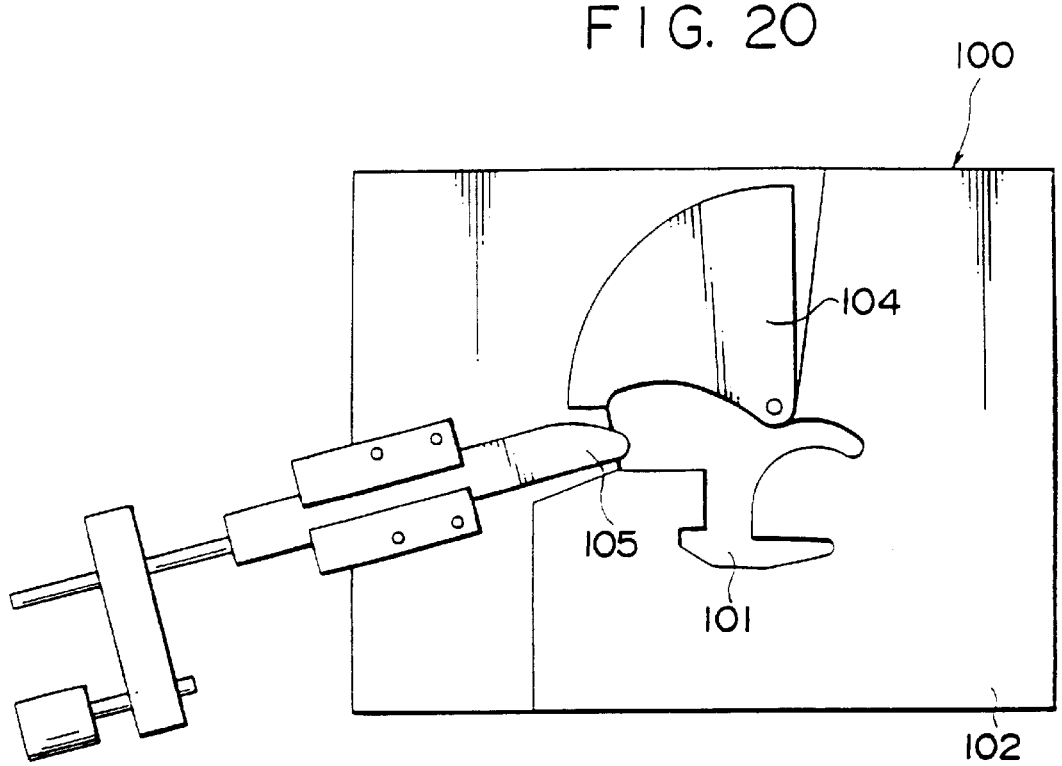
FIG. 20 is a front elevational view showing the operation of the molding machine of FIG. 19.
Figure 21:
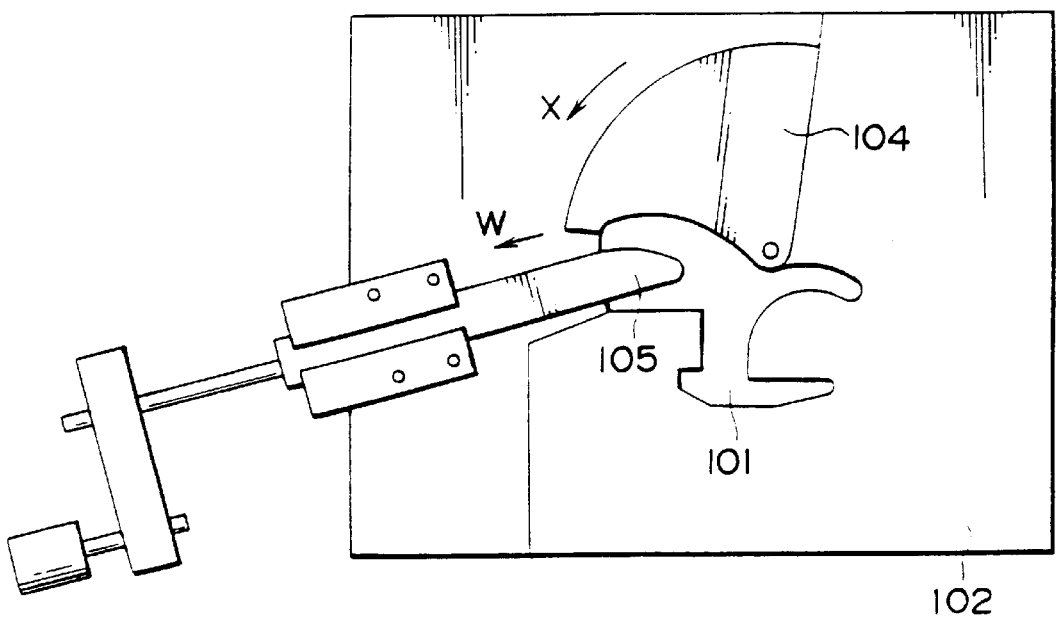
FIG. 21 is a view similar to FIG. 20 showing the operation of the molding machine of FIG. 19.
Figure 25:
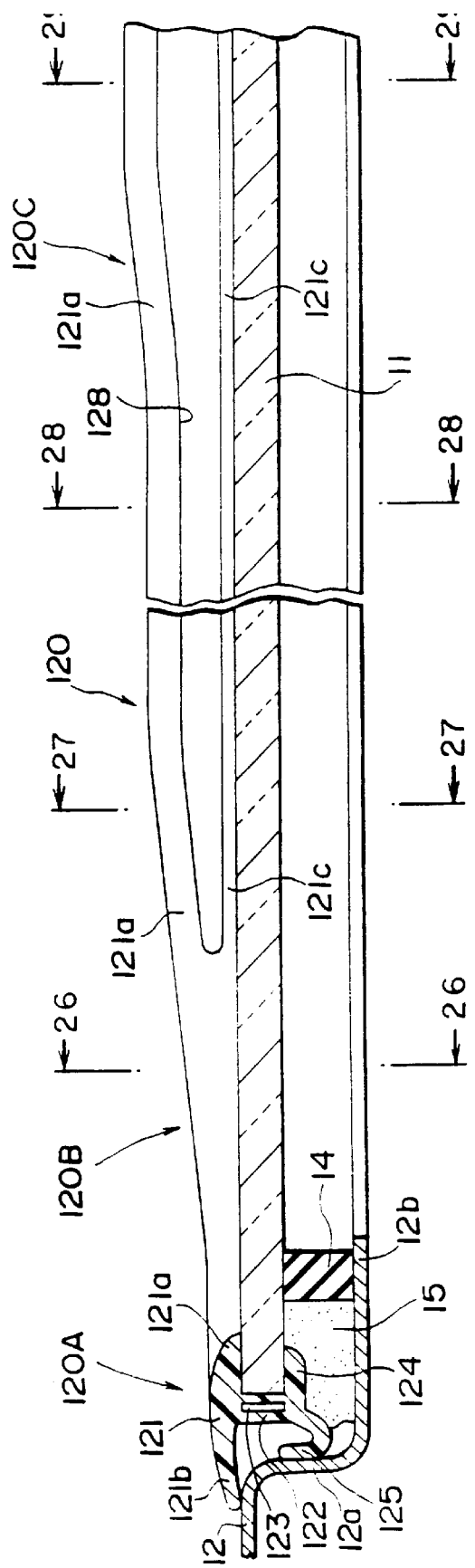
FIG. 25 is an enlarged sectional view showing a windshield molding according to a fifth embodiment.

A molding machine for producing the molding 9 will be described with reference to FIGS. 19 to 21. The molding machine 100 comprises first to third dies 102, 104, 105 which are positioned parallel to the direction (perpendicular to the plane of FIG. 19) in which the molding 9 is extruded, forming an opening through which plastic material is to be extruded. The first die 102 is stationary, having an opening 101 which is shaped according to the cross-sectional shape of the molding 9. The shape of the opening 101 is changed as shown in FIGS. 19 to 21 to form the inward wing portion 91a and the sub-inward wing portion 91c and the water drain channel 98 at the side molding part 9C.

The second and third dies 104, 105 are made of plate members, and are supported so to be movable on the front surface of a first die 102. The second die 104 is in the shape of a sector, being positioned over the opening 101. A side 104a of the sector-shaped second die 104 is shaped according to the upper contour of the inward wing portion 91a. The second die 104 is rotatable centrally of the fulcrum 103. The fulcrum 103 is located above a position corresponding to the boundary between the inward and outward wind portions 91a, 91b of the molding 9. The second die 104 is operated to change the shape of the opening 101 according to the size of the water drain channel 98.

The third die 105 is guided by a pair of guides 106 so as to be rectilinearly movable. The third die 105 is connected to a motor 107 via an operating lever 109 and a converter 108. The rotary motion of the motor 107 is converted into the rectilinear motion by the converter 108. Therefore the third die 105 moves rectilinearly, advancing and retracting into and from the opening 101 at portions for forming the upper, corner and side molding parts as shown in FIGS. 19 to 21.

The third die 105 has a slanted edge corresponding to the water drain channel 98, which is movable into the opening 101 corresponding of the shape of the inward wing portion 91a and the sub-inward wing portion 91c. The third die 105 is movable into and from the opening 101 of the first die 102 in response to the reciprocative movement of the second die 104.

In operation, the molding 9 will be produced in the order of the side molding part 9C, corner molding part 9B, upper molding part 9A on one side, corner molding part 9B, and side molding part 9C on another side. All of the molding parts 9A to 9C are extruded by the molding machine in the shape of strip.

The first to third dies 102, 104, 105 are mutually positioned as shown in FIG. 21 to form a side molding part 9C. A strip of thin metallic foil is inserted into the opening 101 of the first die 102 at a position corresponding to the connecting portion 92 of the molding 9. Firstly, the plastic material is extruded through the opening 101 of the first die 102, thereby forming a leading end (shown in FIG. 15) of the side molding part 9C (having the cross-sectional shape as shown in FIG. 17). Under this condition, the distance between the inward wing portion 91 and the sub-inward portion 91c is largest, and the water drain channel 98 widest and deepest.

The side molding part 9C is extruded to a specified length. Then, the second die 104 is moved downwardly in the direction X as shown in FIG. 21, thereby decreasing the area of the opening 101 corresponding to the inward wing portion 91a and the sub-inward wing 91c. As the area of the opening 101 corresponding to the inward wing portion 91a and the sub-inward wing portion 91c decrease, the third die 105 is retracted in the direction W as shown in FIG. 21 in timed relation with the movement of the second die 104, thereby decreasing the depth and width of the opening of the water drain channel 98. Under these conditions, the inward wing portion 91a and the sub-inward wing portion 91c remain of a uniform thickness through the entire molding 9.

When the entire side molding part 9C becomes lengthy as predetermined, the third die 105 begins to move away from the opening 101 of the first die 102 and to form a corner molding part 9B as shown in FIG. 20. Under this condition, the water drain channel 98 begins to disappear on the inward wing portion 91a and the sub-inward wing portion 91c as shown in FIG. 16.

When the corner molding part 9B is extruded to the specified length, the third die 105 completely moves away from the opening 101 of the first die 102, and the second die 104 moves further downward in the direction X as shown in FIG. 19. The upper molding part 9A will be extruded to the specified length.

The foregoing operations of the first and second movable dues 104, 105 are repeated to extrude the corner and side molding parts 9B, 9C on another side in the order named in the integral form. If the slanted edge of the third die 105 is very sharp, a water drain channel can be made on the relatively thin corner molding parts 9C.

A molding 110 according to a fourth embodiment is shown in FIG. 22 to 24. The molding 110 comprises an exterior wing for covering the space between the windshield 11 and the window opening of the vehicle body panels 12, 13. The exterior wing includes an inward wing portion 115 and an outward wing portion 117. The molding 110 is attached to the roof panel 12 and pillar panel 13 via a fastener 112 by an adhesive tape 111. The fastener 112 is U-shaped, including a flexible lip 112a to extend along slanted walls 12a, 13b to cover the edges of the roof panel 12 and the pillar panel 13. A member 114 extending from the connecting portion 113 is received in the U-shaped fastener 112 to fasten the molding 110.

In this embodiment, the vehicle body panels 12, 13 are substantially flush with the upper surface of the windshield 11. Therefore, the molding 110 has a uniform cross-sectional shape at the upper and corner molding parts 110A, 110B. At the side molding part 110C, the inward wing portion 115 gradually bulges to form a sub-inward wing portion 116 thereunder. The configuration of the inward wing portion 115 and the sub-inward wing portion 1216 is similar to those shown in FIGS. 14 and 17, and will not be described here. The outward wing portion 117 is flexibly contacted to the vehicle body panels 12, 13 via the flexible lip 112a of the fastener 112.

The molding 110 of this embodiment is as effective as the moldings of the foregoing embodiments, and will be attached to the vehicle as described above.

The foregoing moldings are also applicable to attach a rear window of the vehicle.

FIGS. 25 to 29 show a molding 120 according to a fifth embodiment of this invention. The molding 120 comprises side, corner, upper, corner and side molding parts 120C, 120B, 120A, 120B, 120C, being extruded as one unit. Each molding part comprises an exterior wing 121 and a connecting portion 122 extending from the exterior wing 121. The exterior wing 121 includes an inward wing portion 121a and an outward wing portion 121b similar to the moldings described above.

Figure 27:
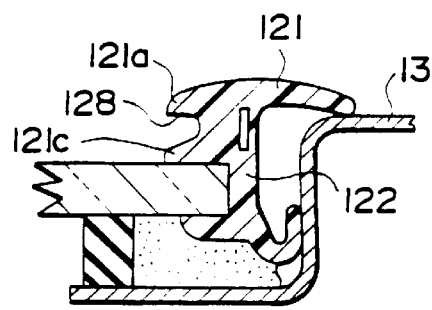
FIG. 27 is a cross-sectional view taken along line 27—27 of FIG. 25.
Figure 28:
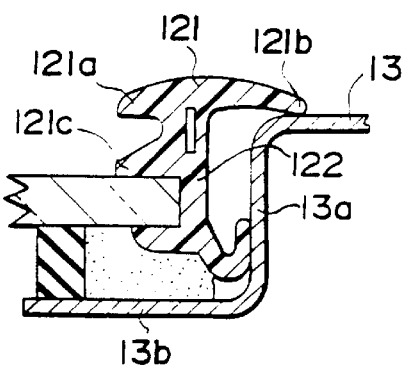
FIG. 28 is a cross-sectional view taken along line 28—28 of FIG. 25.
Figure 29:
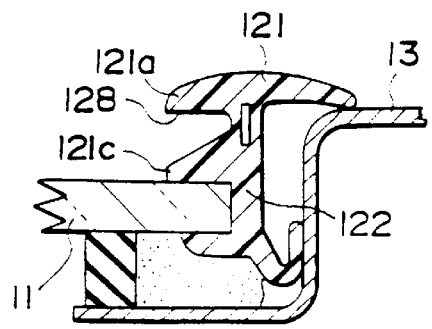
FIG. 29 is a cross-sectional view taken along line 29—29 of FIG. 25.

The height of the molding 120 gradually increases between the corner molding part 120B and the side molding part 120C as shown in FIGS. 27 and 28, having the largest height between the central side molding part and the end of the side molding part 120C. Specifically, the molding 120 further increases in height between the center portion of the side molding part 120C and the end portion of the side molding part 120C as shown in FIGS. 28 and 29.

A core metal is embedded at the joint between the exterior wing 121 and the connecting portion 122. The connecting portion 122 has a foot 124 and a flexible lip 125 extending from the end thereof. The foot 124 supports the peripheral edge of the windshield 11. The flexible lip 125 is in flexible contact with the all 112a of the vehicle body panel 12 (or 13).

The inward wing portion 121a and outward wing portion 121b are in the shape of a lip to cover the peripheral edge of the windshield 11 and the edge of the vehicle body panels 12, 13, respectively. At the upper and corner molding parts 120A, 120C, the foot 124 of the connecting portion 122 and the inward wing portion 121a form a U-shaped space to receive the peripheral edge of the windshield 11.

At the majority of the side molding part 120C, the height of the molding 120 gradually varies according to the difference of height between the vehicle body panel 13 and the upper surface of the windshield 11. A sub-inward wing portion 121c is formed between the inward wing portion 121a and the foot 124 of the connecting portion. The U-shaped space for receiving the windshield 11 remains the same between the foot 124 and the sub-inward wing portion 121c at the side molding part 120C.

The outward wing portion 121b has a uniform shape and thickness throughout the molding parts 120A to 120C.

Between the center and the end of the side molding part 120C, the distance between the inward wing portion 121a and the sub-inward wing portion 121c is the largest according to the difference of height between the upper surface of the windshield 11 and the vehicle body panel. A water drain channel 128 is formed between the inward wing portion 121a and sub-inward wing portion 121c, being widest and deepest at this region. The depth and width of the water drain channel 128 depends upon the varying distance between the inward wing portion 121a and the sub-inward wing portion 121C as shown in FIGS. 27 to 29.

Figure 26:
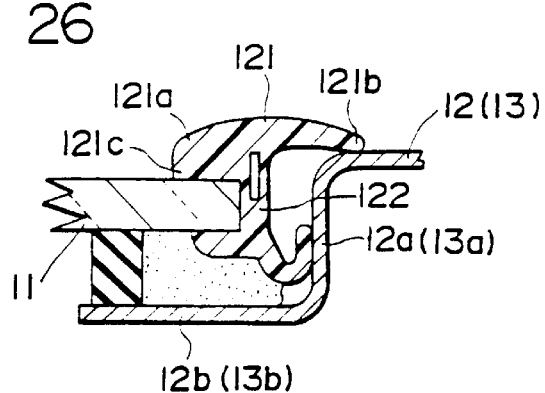
FIG. 26 is a cross-sectional view taken along line 26—26 of FIG. 25.

Near the corner molding part 120B, the inward wing portion 121a and the sub-inward wing portion 121c merge to be slightly thicker than at the upper molding part 120A, so that the water drain channel 128 disappears as shown in FIG. 26. No water drain channel exists at the upper molding part 120A. The inward wing portion 121a is in contact with the upper surface of the windshield 11.

Figure 30:
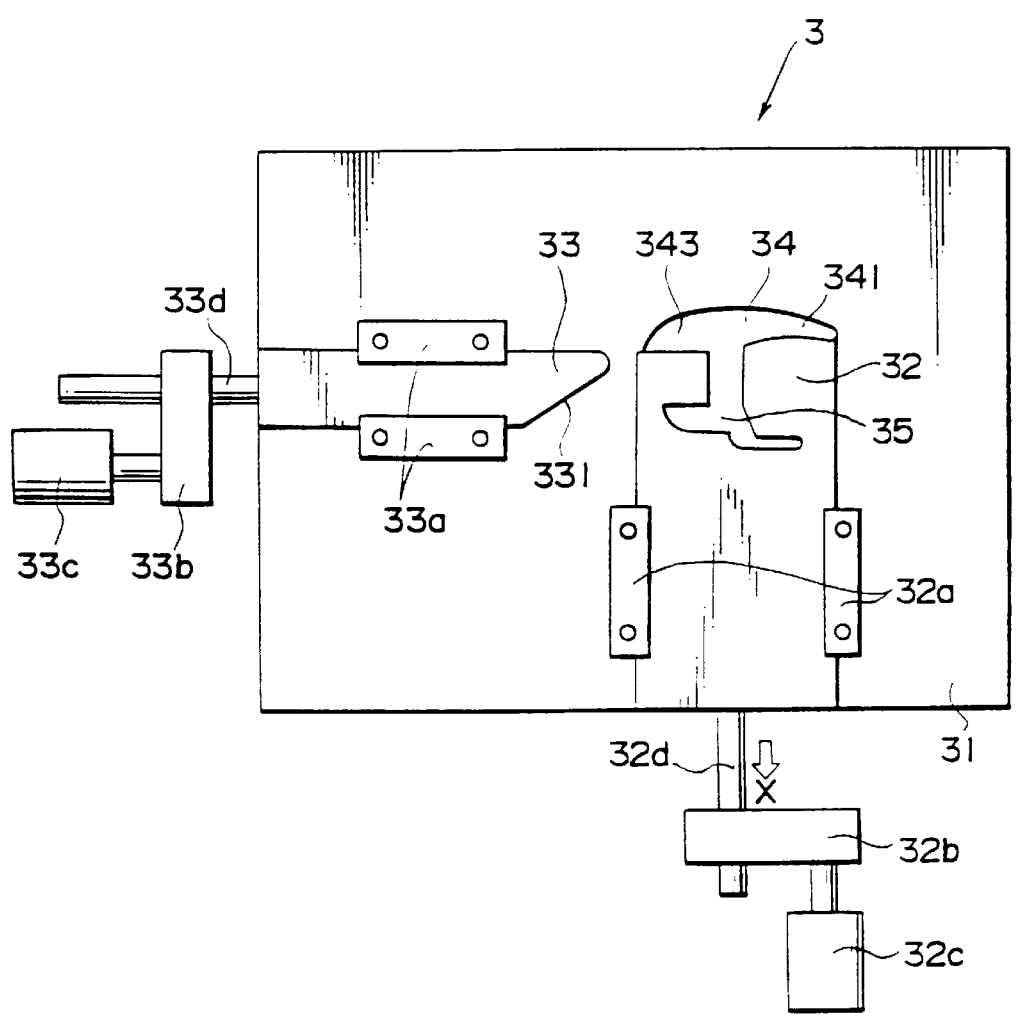
FIG. 30 is a front elevational view of an injection molding machine for making the molding of FIGS. 25 to 29.
Figure 31:
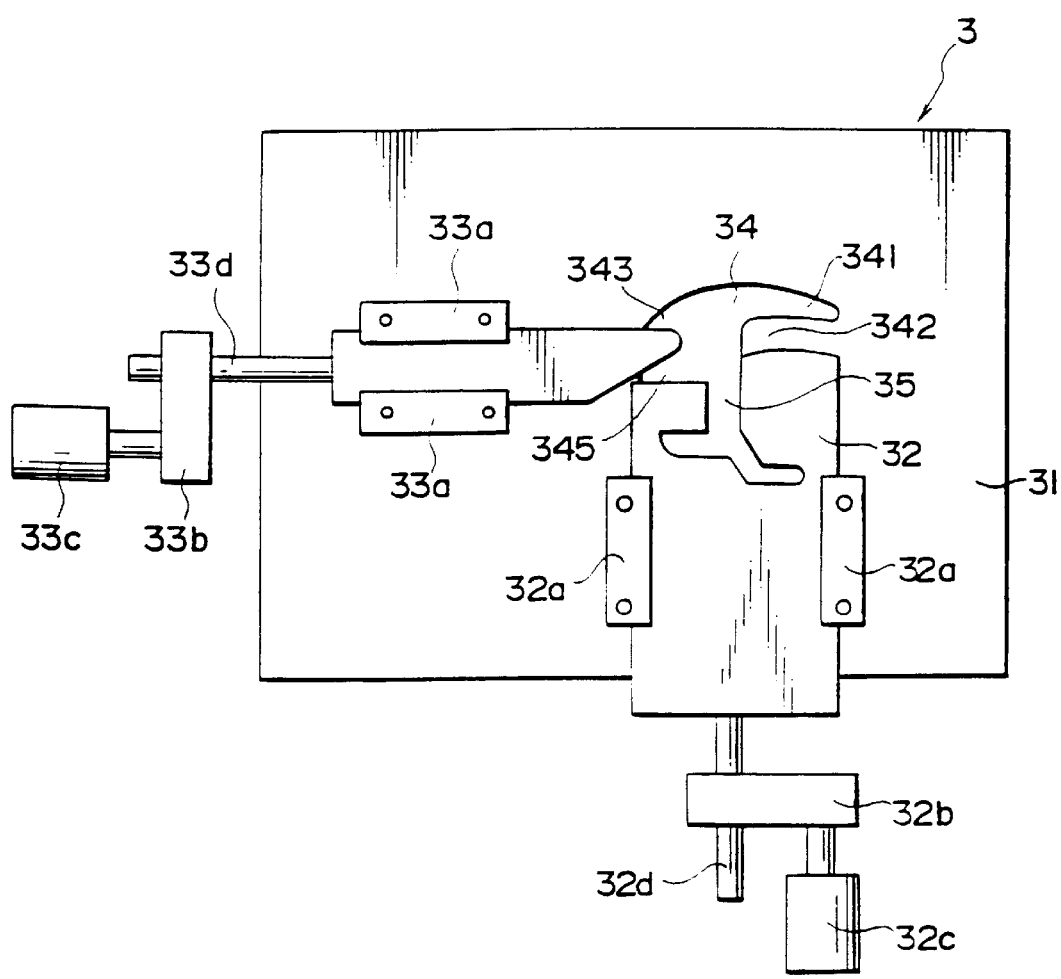
FIG. 31 is a front elevational view showing the operation of the molding machine of FIG. 30.
Figure 32:
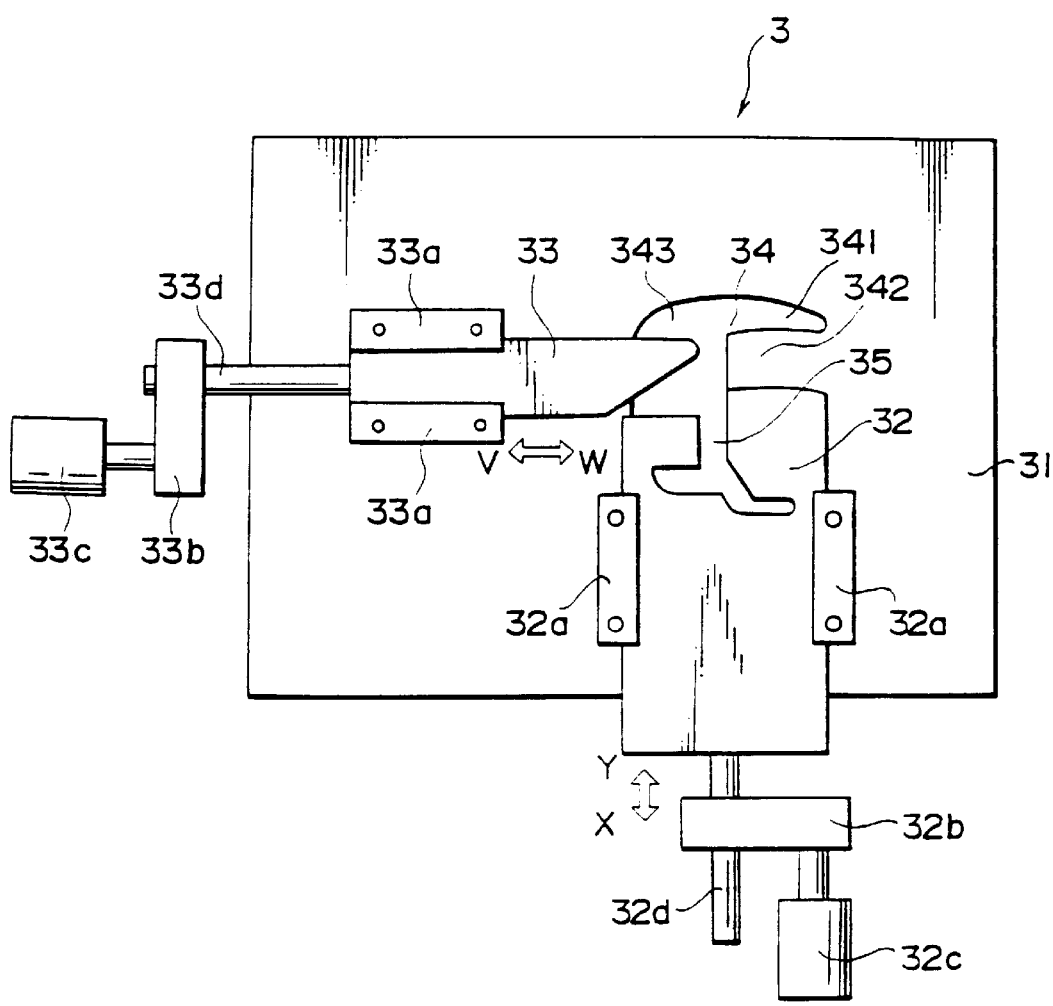
FIG. 32 is a view similar to FIG. 31 showing the operation of the molding machine of FIG. 30.

The molding 120 is produced by a molding machine 3 shown in FIGS. 30 to 32. The molding machine is similar to that shown in FIGS. 7 and 8.

Production of the side molding 120C will be described by referring to FIG. 32. Firstly, the second and third dies 32, 33 are placed on the first die 31 so that the openings 34 and 35 of the first and second dies are in the cross-sectional shape of the side molding part 120C. The plastic material is extruded through the openings 34 and 35 together with a metal foil strip 123 inserted at a portion corresponding to the connecting portion 12 of the opening 34. In this case, the distance between the openings 343 and 345 are longest. The plastic material is extruded to form an end of the side molding part 120C (shown in FIG. 25). In other words, the distance between the inward wing portion 121a and the sub-inward wing portion 121c is largest to form a water drain channel 128 so that the side molding part 120C has the cross-sectional shape as shown in FIG. 29.

The plastic material is extruded to a preset extent under this condition. Then the second die 32 is being raised in the direction Y. The opening 34 of the first die 31 gradually decrease the area. The other portions of the side molding part 120c remain the same.

The third die 33 is retracted in the direction V as the inward wing portion 121a and the sub-inward wing portion 121c become closer so as to decrease the size of the water drain channel 128. Thus the third die 33 moves in timed relation with the second die 32. The thickness of the sub-inward wing portion 121c and the inward wing portion 121a respectively remain uniform through the entire molding 120. The other portions of the side molding part 120C are shaped without any change.

When the first, second and third dies are related as shown in FIG. 31, the third die 33 is stopped temporarily to extrude the central region of the side molding part 120C when the side molding part 120C is extruded to the specified length and a corner molding part 120B is to be formed, the second die 32 is raised again in the direction Y and the third die 33 is retracted to the direction V. Then, the distance between the portions 343 and 345 are reduced in size, thus the distance between the inward wing portion 121a and the sub-inward wing portion 121c are reduced and the size of the water drain channel 128 is reduced. Under this condition, the other portion of the side molding part 120c remains unchanged. Since the third die 33 moves in synchronization with the second die 32, the inward wing portion 121a and the sub-inward wing portion 121c remain uniform in thickness through the entire molding 120. When the third die 33 moves away completely from the openings 343, 345 of the first die 31 after the second die 32 is further raised in the direction Y, the inward wing portion 121a merges with the sub-inward wing portion 121c, so that the water drain channel 128 disappears completely.

Then, the corner molding part 120B is extruded to the specified length. The second and third dies 32, 33 reach the positions as shown in FIG. 30.

The top of the shield 342 of the first die 31 and the upper edge of the second die 32 are flush with each other, i.e. the shape of the openings 34 and 35 matched together corresponding to the cross-sectional shape of the upper molding part 120A. Under this condition, the plastic material is extruded through the openings 34 and 35 for a predetermined period of time to produce the upper molding part 120A.

When the upper molding part 120A becomes long as specified, production of the corner molding part 120B and the side molding part 120C on another side in the order named is started. Thus the molding 120 is produced in the shape of a strip.

Figure 33:
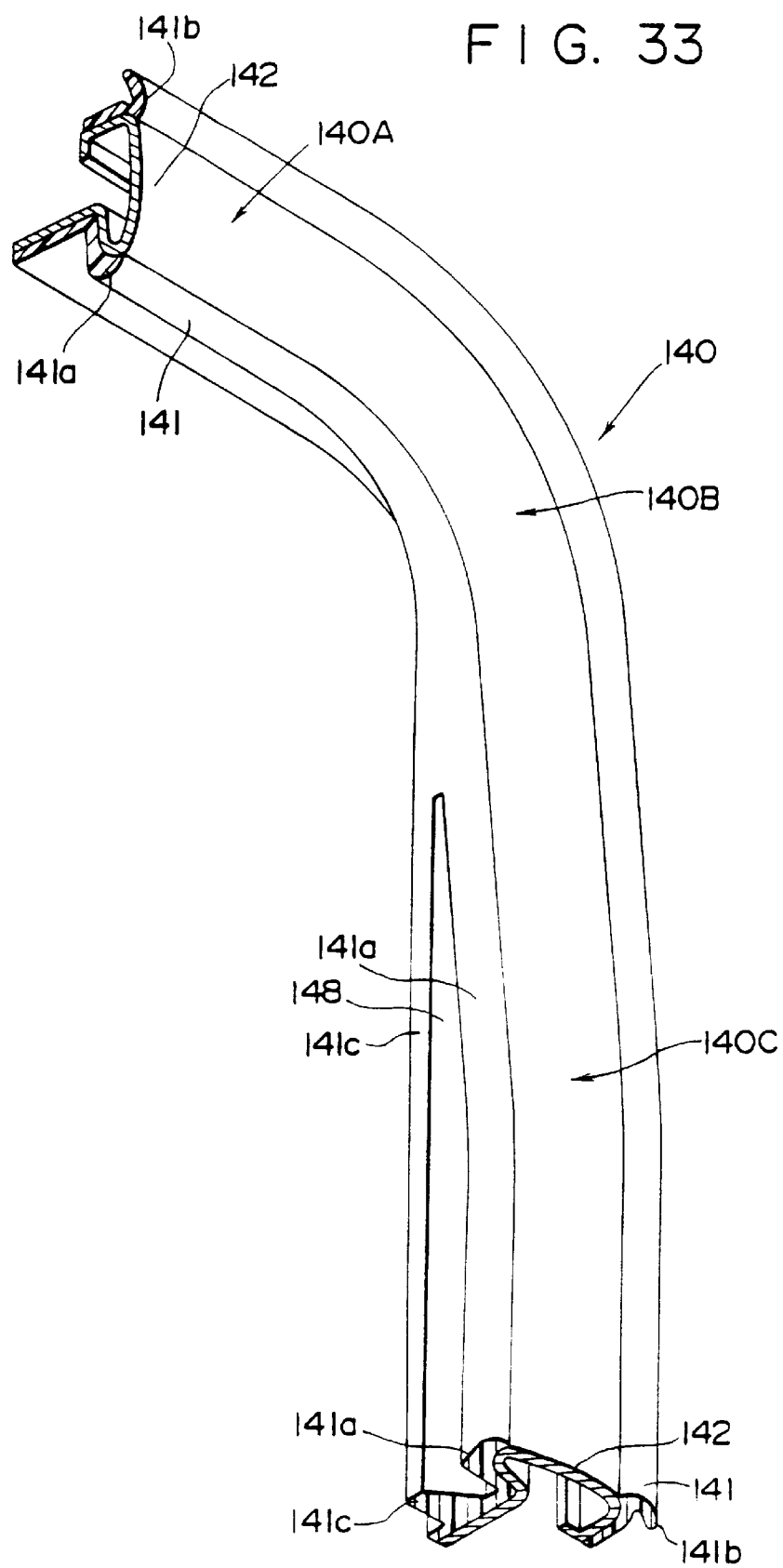
FIG. 33 is a perspective view of a molding according to a sixth embodiment.
Figure 34:
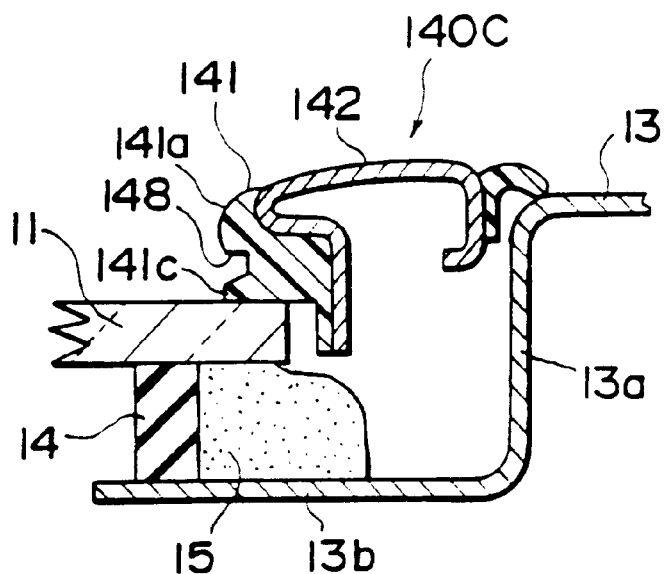
FIG. 34 is a cross-sectional view showing an upper portion of a side molding part of FIG. 33.
Figure 35:
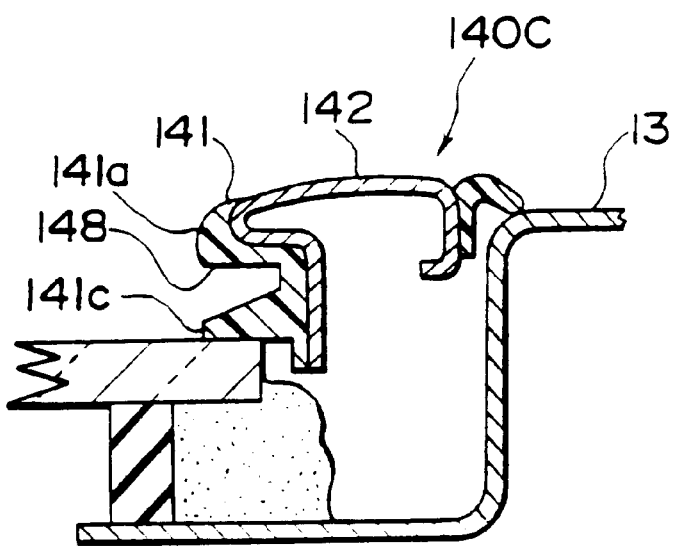
FIG. 35 is a cross-sectional view showing a central portion of the side molding part of FIG. 33.
Figure 36:
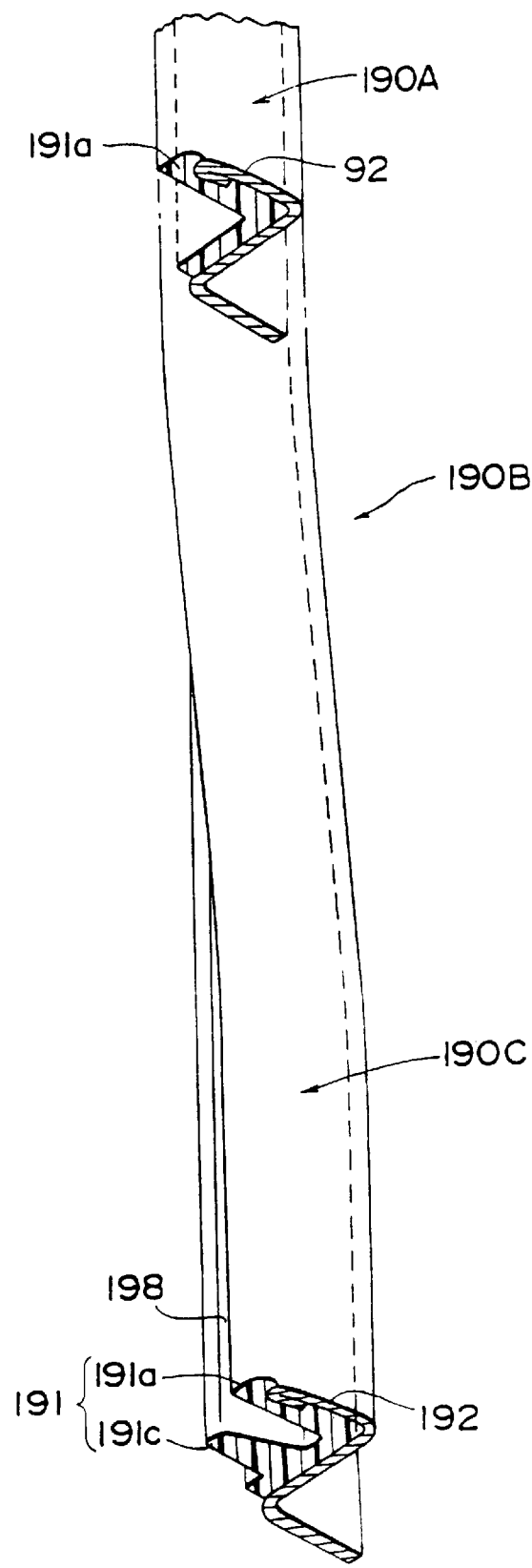
FIG. 36 is a perspective view showing a molding according to a seventh embodiment.
Figure 37:
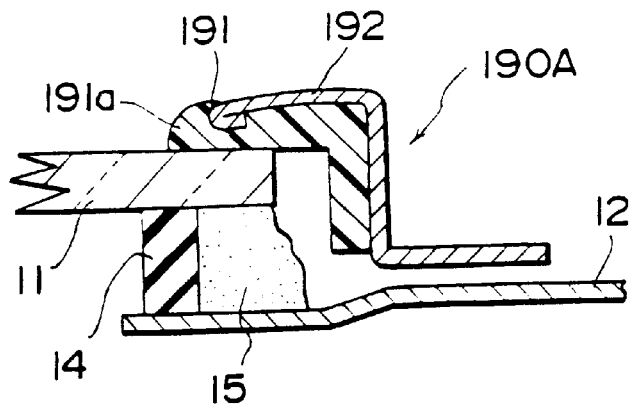
FIG. 37 is a cross-sectional view showing an upper molding part of FIG. 36.

FIG. 33 to FIG. 35 show still another molding according to a sixth embodiment of the invention. A molding 140 comprises a metal frame 142 and a plastic molding member 141 extruded along the metal frame 142. The metal frame 142 is bent according to a space between the window opening of the vehicle and the windshield 11, being attached to the body panels 12, 13 along the window opening by fasteners such as clips and bolts. The metal frame 142 has a uniform cross-sectional shape in its longitudinal direction. The metal frame 142 confronts with the side edge of the windshield with some space therebetween at the side molding part according to the difference of height between the vehicle body panel and the upper surface of the windshield 11.

The plastic molding member 141 covers the peripheral edge of the windshield 11, including a portion 141a and a portion 141b. The portion 141a extends over the edge of the windshield 11, and the portion 141b covers the edge of the body panels 12, 13. At the upper molding part 140A, the portion 141a is in close contact with the surface of the windshield 11. At the side molding part 140C, the portion 141a and the metal frame 142 are away from the windshield 11.

A water drain channel 148 is formed in the space between the portion 141a and sub-portion 141c as the distance between these portions 141a, 141c as the distance between these portions 141a, 141c becomes larger. The sub-portion 141c is in contact with the windshield 11 at the side molding part 140C. The molding member 141 is thickest at the center of the side molding part 140C, being reduced in thickness toward the corner molding part 140B. The water drain channel 148 varies its width and depth depending upon the molding member 141, disappearing at the corner molding part 140B where the portion 141a and sub-portion 141c merge. The portion 141a and the sub-portion 141c have a uniform thickness along the water drain channel 148.

The molding 140 of this embodiment is as effective as those of the foregoing embodiments.

FIGS. 36 to 39 show a molding 190 according to a seventh embodiment. The molding 190 comprises a pair of extruded side molding parts 190C, corner molding part 190B and an extruded upper-roof molding part 190A. At the corner molding part 190B, the inward wing portion 191a and the sub-inward wing portion 191c close and merge toward each other such that water drain channel 198 is gradually reduced in size until the water drain channel 198 is removed. Each molding part includes a metal frame 192 and a molding member 191 extruded along the metal frame 192. The molding member 191 has a portion 191a for covering the edge of the windshield 11. At the upper molding part 190A, the portion 191a is in contact with the surface of the windshield 11.

The metal frame 192 has a uniform shape throughout the molding parts 190A to 190C. The frame 192 is arranged to be somewhat apart from the windshield 11 at the side molding part 190C according to the difference in height between the upper surface of the windshield 11 and the body panels 12, 13.

Figure 38:
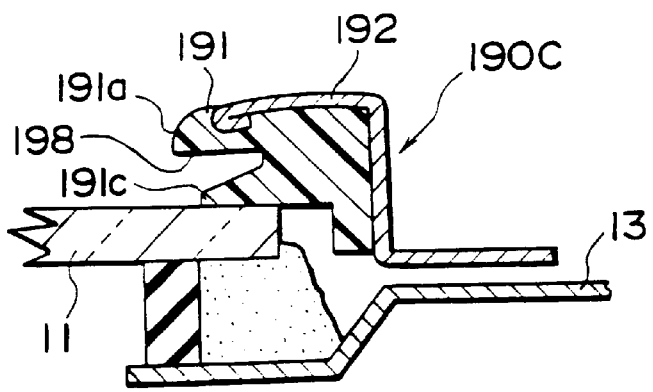
FIG. 38 is a cross-sectional view showing an upper portion of a side molding part of FIG. 36.
Figure 39:
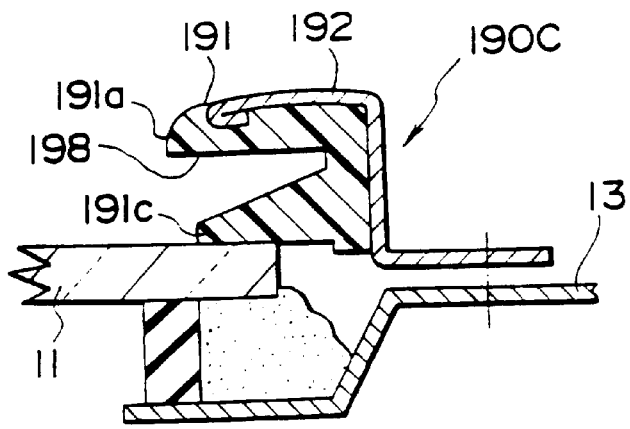
FIG. 39 is a cross-sectional view showing a lower portion of the side molding part of FIG. 36.

At the majority of the side molding part 190C, the distance between the portion 191a and the sub-portion 191c gradually becomes larger so that a water drain channel 198 is formed therein, as shown in FIGS. 38 and 39. Specifically, the water drain channel 198 is defined between the portion 191a and sub-portion 191c. The thickness of the portion 191a and the sub-portion 191c remain the same along the water drain channel 198. The size of the water drain channel 198 depends upon the varying distance of the portion 191a and the sub-portion 191c.

It is needless to say the moldings according to the invention are applicable to installation of a rear window.

A further embodiment of the present invention will now be described with respect to FIGS. 40–53.

Figure 40:
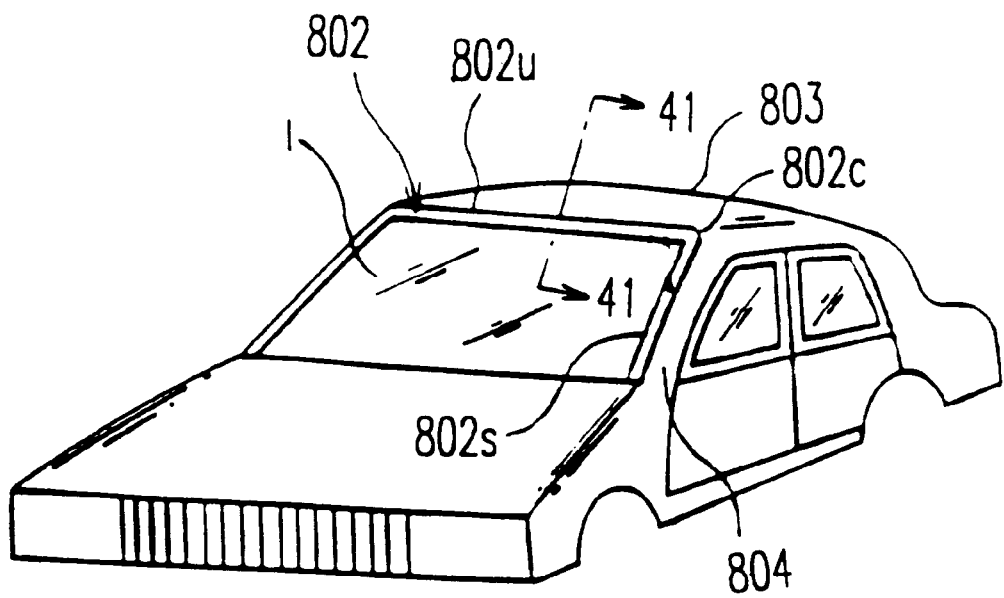
FIG. 40 is a front perspective view of a vehicle body having a windshield molding;.

As shown in FIG. 40, a windshield molding 802 composed of long belt-shaped extruded sealing members is installed along the periphery of the front windshield 1 of an automobile. This windshield molding 802 has an upper molding part 802u which is installed in a space between an upper edge of the above-mentioned windshield 1 and a roof panel 803, a pair of side molding parts 802s which are installed in the space between both side edges of the windshield 1 and the pillar panels 804, and a pair of curved corner molding parts 802c connecting the upper molding part 802u and the side molding parts 802s. These molding parts 802u, 802c and 802s are formed continuously as a single molding piece by extrusion as described later herein.

Figure 41:
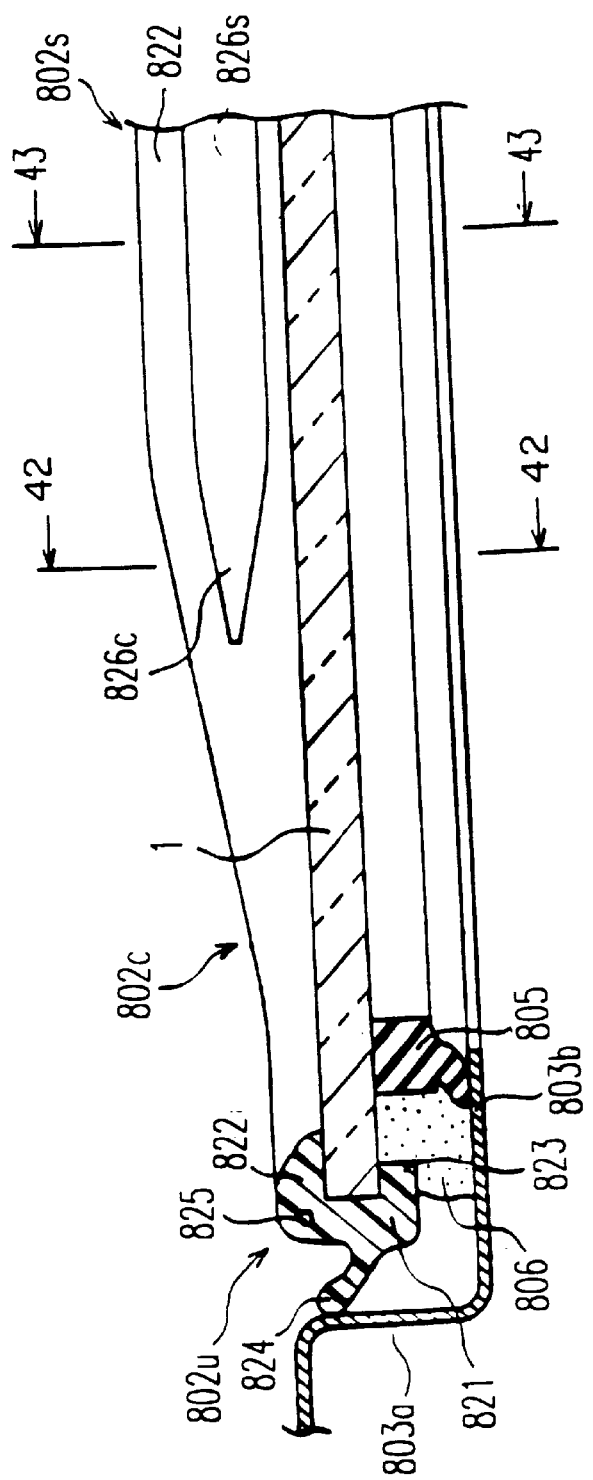
FIG. 41 is an elevational view of a molding according to an eighth embodiment of the present invention.

The windshield molding 802 in the embodiment shown in FIGS. 41 to 43 is made of elastic material such as rubber and synthetic resin, etc., into a long belt-shaped solid molding with the extrusion device described later herein, is provided with the connecting portion 821 which is inserted in the spaces between the periphery of the windshield 1 and both the roof panel 803 and the front pillars 804, and is provided with the exterior wing 822 which covers the spaces between the windshield 1 and both the outside surface of the roof panel 803 and the front pillars 804 from the exterior side (the upper end of FIG. 43).

At the side molding part 802s (shown in FIGS. 41 and 43) the thickness of the exterior wing 822 is maintained in the maximum size from the upper end to the lower end of the side section according to the maximum and uniform height difference from the upper end to the lower end of the side section.

At this time, a U-shaped groove between the exterior wing 822 and the foot 823 is fitted with the periphery section of the windshield 1 throughout the entire length, and the elastic lip 824 is bent in an L shape and fixed to the bent walls 803a and 804a of the vehicle body panels 803 and 804. The elastic rebound force caused by bending the elastic lip 824 works as the fixing force of the windshield molding 802.

As described above, since the thickness of the exterior wing 822 in the cross-sectional shape of the molding 802 is varied according to the vary of the height difference between the windshield 1 and the vehicle body panels 803, 804, it is suitably performed to install the molding 802 at every section.

In the case of the described structure for installing the molding 802 to the windshield 1 on the vehicle body, rainwater falling on the windshield 1 is led to the inner peripheral wall of the exterior wing 822 and the rainwater collected in the side molding part is led through the water drain channel 826 (between sections 822a and 822b) formed on the dam portion and drained at the specified portion.

The following explains the extrusion device for forming the above-mentioned windshield molding 802.

Figure 44:
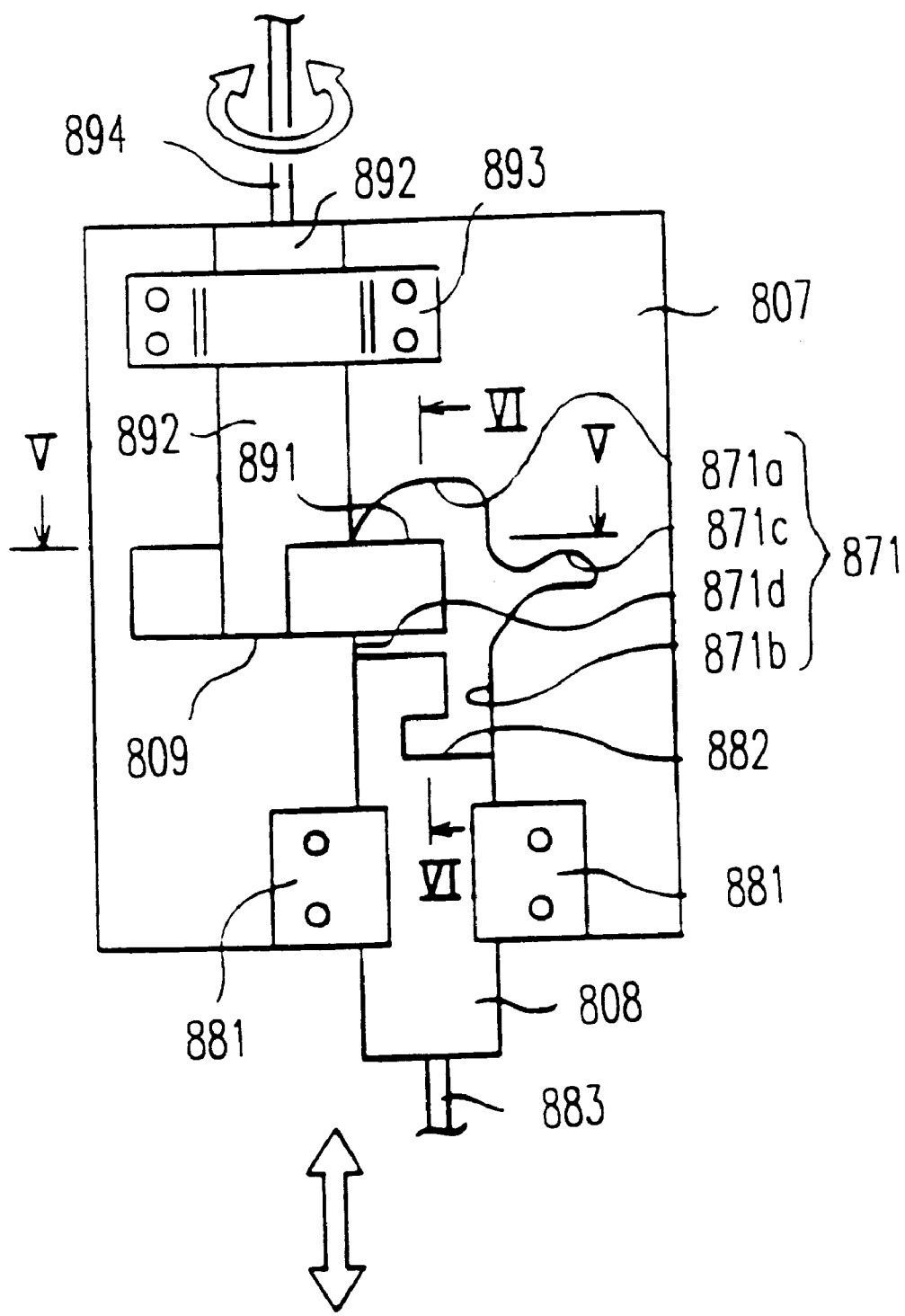
FIG. 44 is an elevational view of an injection molding machine for making the molding of FIGS. 41–43.
Figure 45:
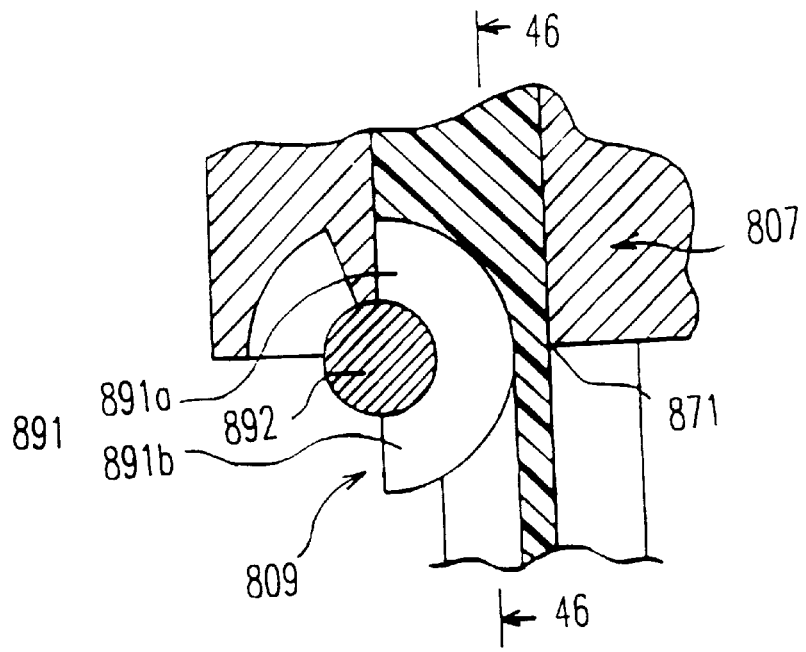
FIG. 45 illustrates a feature of the molding forming device of FIG. 44.
Figure 46:
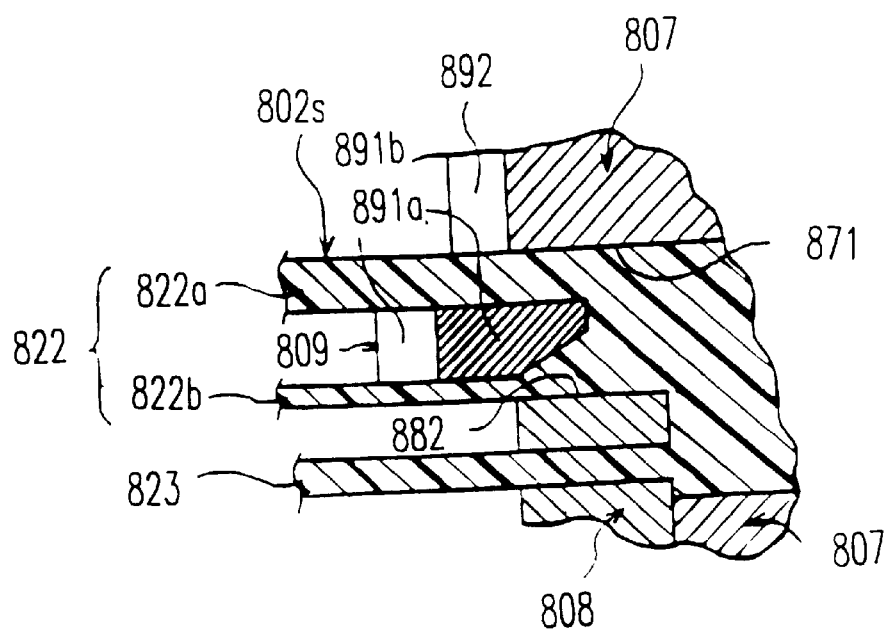
FIG. 46 illustrates a further view of the molding device of FIG. 44.

As FIGS. 44 to 46 show, the molding forming device unit is fitted with three dies having openings for extruding synthetic resin. These dies are a first die 807, second die 808 and third die 809 arranged in the molding extruding direction (vertical direction on the paper) so as to define an extrusion opening for extruding the molding 802. The first die 807 is fixed and has an extrusion opening having an extrusion edge 871 which comprises an extrusion edge 871a corresponding with the exterior surface of the exterior wing 822, an extrusion edge 871d corresponding with the inner surface of the exterior wing 822, an extrusion edge 871b corresponding with the outer surface of the connecting portion 821, and an extrusion edge 871c corresponding with the elastic lip 824. At this time, the section of the extrusion opening corresponding with the inner and lower end surface of the connecting portion 821 takes an enlarged opening shape including the whole shape of the lower portion in the cross-sectional shape of the molding 802.

The second die 808 is made of a plate-like member and is supported on the front surface of the first die 807 so as to be able to move linearly by guiding with a pair of guide members 881, 881. The second die 808 has an extrusion edge 882, at the upper edge thereof, notched in the shape corresponding with the lower end surface of the connecting portion 821. The extrusion edge 882 of the second die 808 is arranged to be successive to the extrusion edge 871 of the first die 807.

Figure 47:
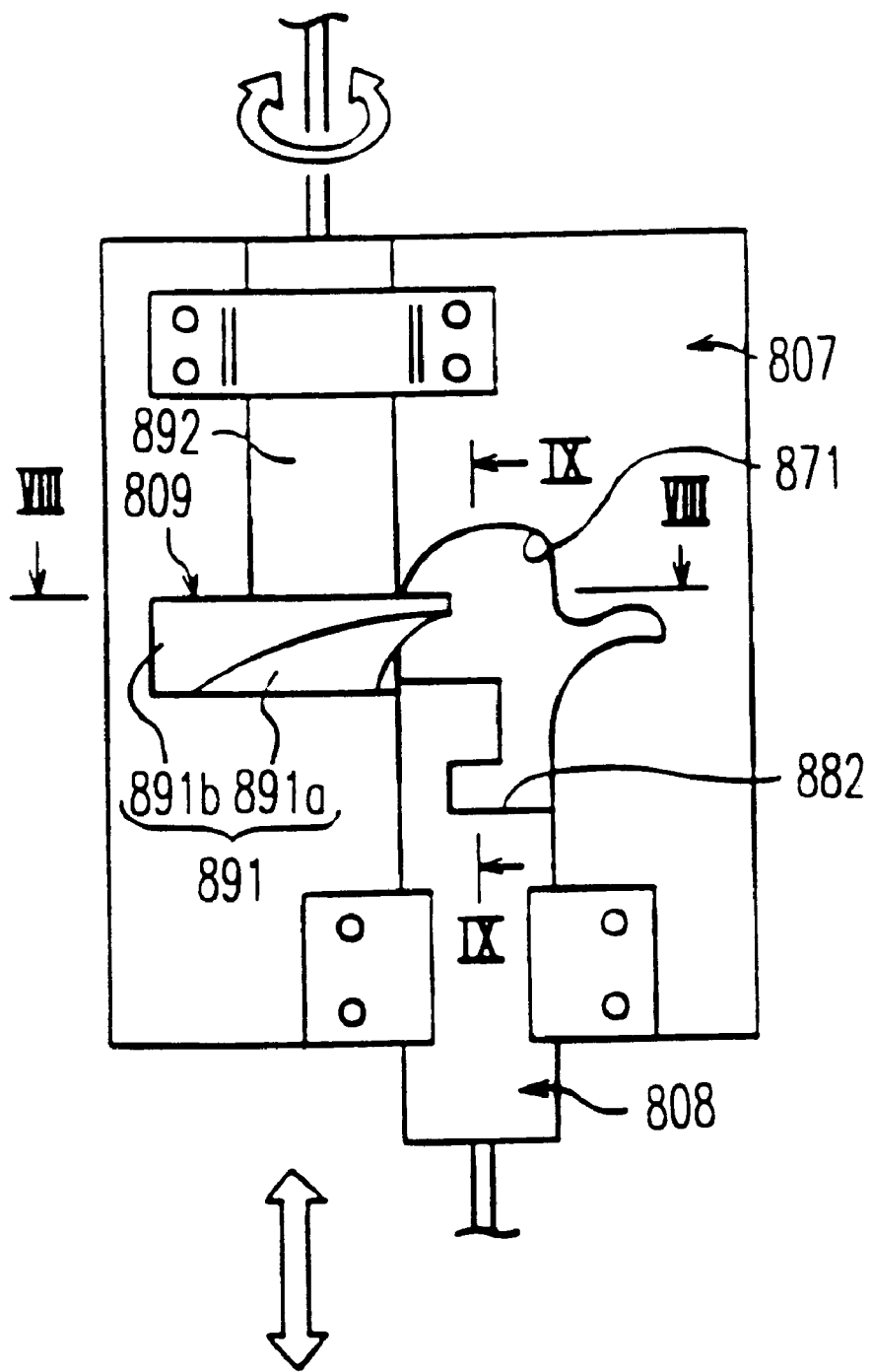
FIG. 47 is a further elevational view of the injection molding machine of the present invention.
Figure 48:
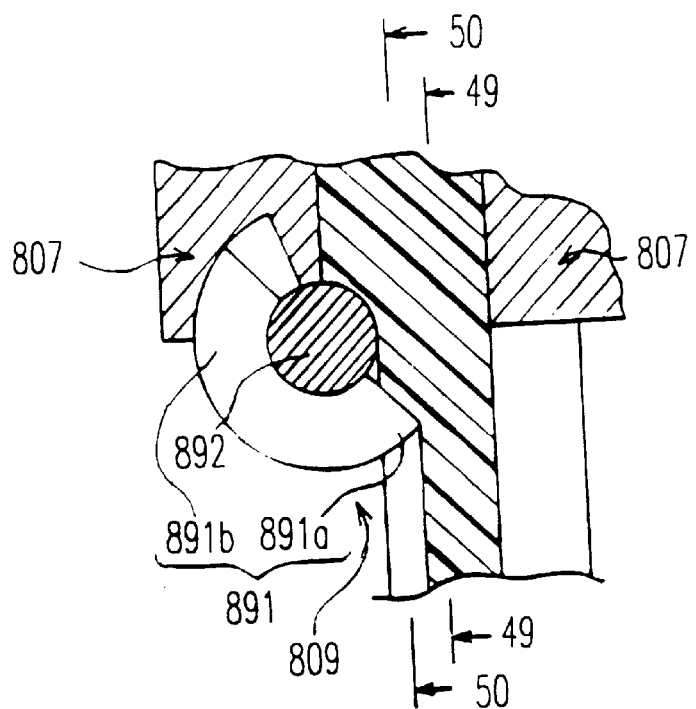
FIG. 48 is a further view of a feature of the molding machine of the present invention.
Figure 49:
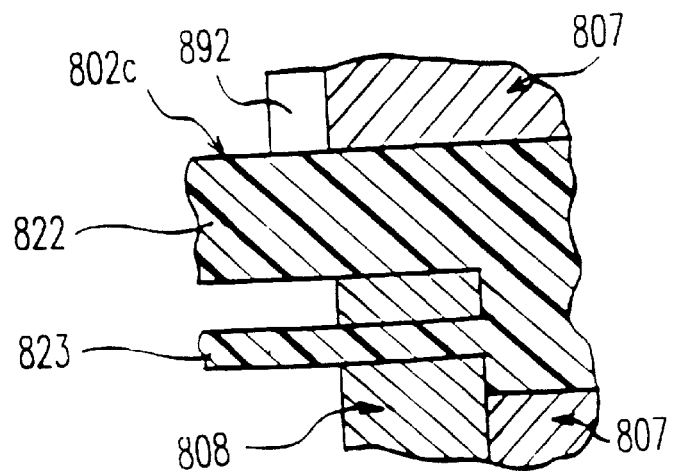
FIG. 49 is a further view of a feature of the molding machine of the present invention.
Figure 50:
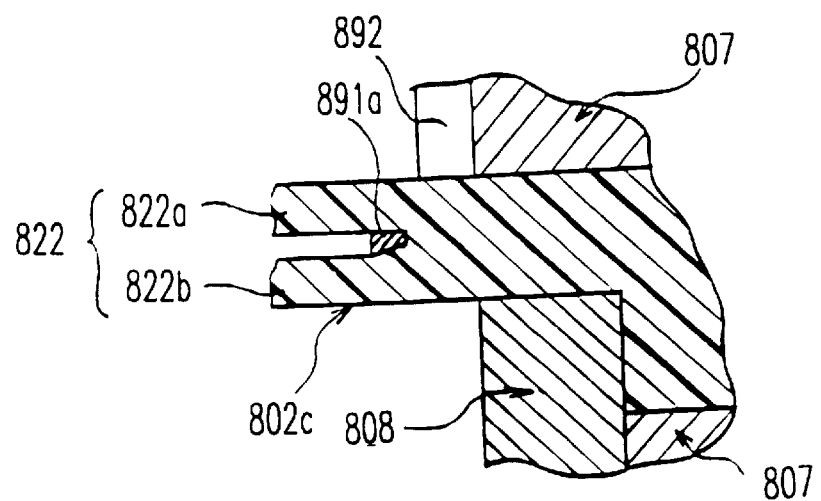
FIG. 50 is a view of a further feature of the molding machine of the present invention.
Figure 51:
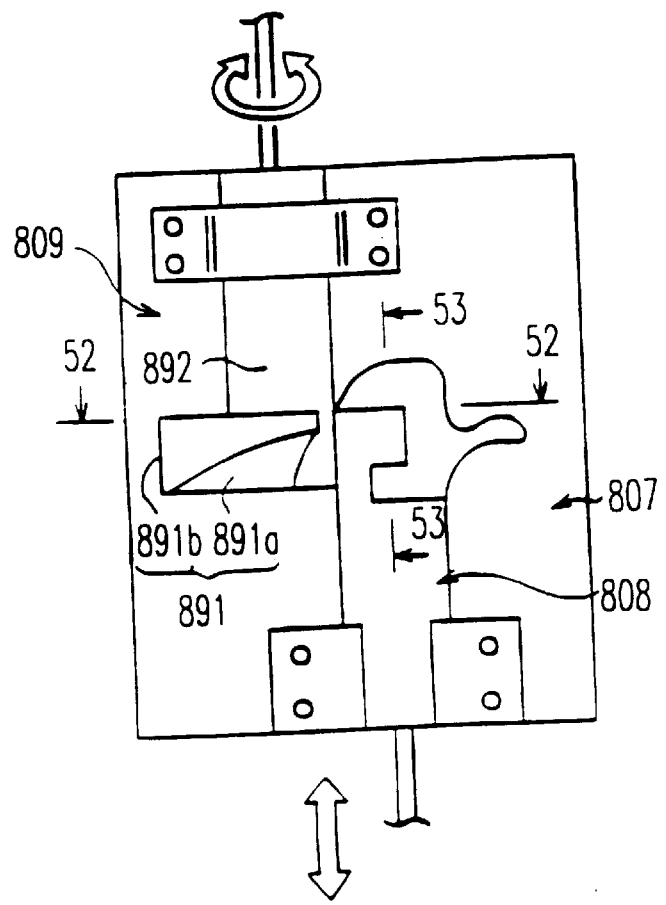
FIG. 51 is a further elevational view of the molding machine of the present invention.

The second die 808 has, at the lower portion, an operation lever 883 which is connected to a motor via a nonillustrated converter for converting rotary motion of the motor into rectilinear motion when driven by motor, the second die 808 reciprocates between a position for forming the side molding section shown in FIG. 44, the corner molding section shown in FIG. 47 and the upper molding section shown in FIG. 51, respectively.

Further, the third die comprises a short-axis cylindrical portion 891 having a half-round cylinder notched in a part thereof and a long-axis cylindrical portion 892 arranged to turn the short-axis cylindrical portion 891. The long-axis cylindrical portion 892 is supported on the front of the first die 807 so as to be able to rotate by guiding with a guide member 893. The axis of the short-axis cylindrical portion 891 is arranged in a vertical position to be connected to the lower end of the long-axis cylindrical portion 892 so as to turn with the short-axis cylindrical portion 891 in one body.

The notched part of the short-axis cylindrical portion 891 is formed as a shield part which is arranged to advance into and retract out of the extrusion opening defined by the first and second dies 807 and 808. That is, the shield part of the short-axis cylindrical portion 891 has a front changing portion 891a which has a cross-sectional shape corresponding with the shape of the water drain channel 826C at the corner molding part 802c and a back constant portion 891b which has a cross-sectional shape corresponding with the shape of the water drain channel 826s at the side molding part 802s.

In greater detail, the front-end of the front changing portion 891a has a minimum triangular shape corresponding with the minimum shape of the water drain channel 826c at the corner molding part 802c, and has a gradually enlarged triangular cross-sectional shape on its round way toward the back end thereof corresponding with the triangular cross-sectional shape of the water drain channel 826C gradually expanded toward the side section. The back constant portion 891b, more than an approximately 90 degree angle away in a direction from the front end of the front changing portion 891a, has a constant rectangular shape corresponding with the shape of the water drain channel 826S at the side molding part 802s.

The short-axis cylindrical portion 891 of the third die 809 turns a half-turn between positions for forming the rectangular shape at the side molding section shown in FIG. 44, the triangular shape at corner molding section shown in FIG. 47 and upper molding section shown in FIG. 51, respectively. The third die 809 has, at the upper portion thereof, an operation lever 893 which is connected to a motor so as to turn into or out of the extrusion opening in synchronization to the rectilinear motion of the second die 808.

The following explains the production method of the windshield molding 802 with the above-mentioned molding extrusion device.

To produce the windshield molding 802, the upper molding part 802u, the corner molding part 802c, and the side molding part 802s are extruded as a single molding in one piece, which is produced in the order of the molding part 802s, the corner molding part 802c, the upper molding part 802u, another corner molding part 802c, and another side molding part 802s.

When the side molding part 802s is extruded, the second die 808 and the third die 809 are positioned with respect to the first die 807, as shown in FIGS. 44 to 46, so that the extrusion opening of the first die 807 is maintained in the maximum opening area. Feeding the inserted wire 825 to the extrusion opening of the first die 807, extrusion starts from the lower end (the right end portion in FIG. 43) of the side molding part 802s. At this time, the exterior wing 822 is obtained with the cross-sectional shape of the maximum expanded thickness. The water drain channel 826s also has the maximum rectangular cross-sectional area to insure the maximum of the flowing capacity.

After the side molding part 802s is extruded to a certain length in a constant sectional form, at a point corresponding with the upper end of the side molding part 802s the short-axis cylindrical portion 891 of the third die 809 begins to turn back and the second die 808 starts to move upward as shown in drawings so as to start to extrude the corner molding part 802c.

At the forming position for the corner molding part 802c, as shown in FIGS. 47 to 50, extrusion is performed in such a manner that the short-axis cylindrical portion 891 of the third die 809 turns back and the second die 808 moves upward. With this motion, the shielding amount of the extrusion opening of the first die 807 corresponding with the exterior wing 822 gradually reduces so that the thickness of the expanded thickened portion of the exterior wing 822 gradually decreases. In synchronization with this extruding operation, the cross-sectional shape of the water drain channel 826, which is varied from the rectangular shape (826s) to the triangular shape (826c), gradually decreases.

At a midpoint in the corner molding part 802c, the short-axis cylindrical portion 891 of the third die 809 completely leaves from the extrusion opening such that the water drain channel 826C disappears. The second die 808 further moves upward as shown in the drawings and the extrusion of the upper molding part 802u is started when the thickness of the exterior wing 822 reaches the minimum size.

Figure 52:
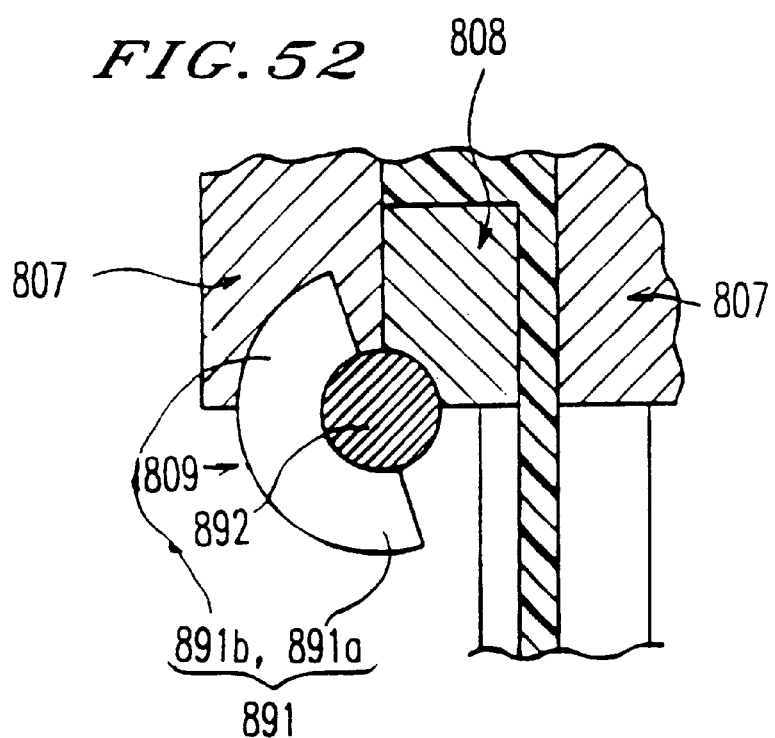
FIG. 52 is a view of a feature of the molding machine of the present invention.
Figure 53:
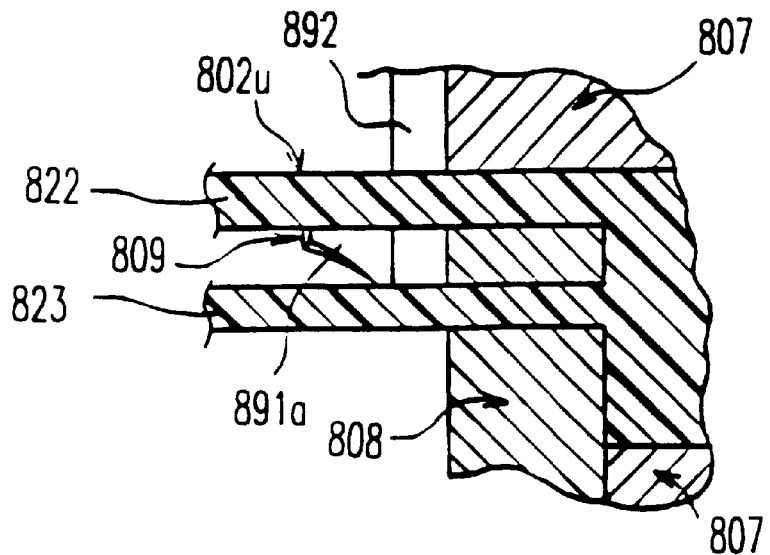
FIG. 53 is a further view of a feature of the molding machine of the present invention.

That is, when the extrusion of the corner molding section 802c is completed, the second die 808 and the third die 809 halt at the final decrease position, as shown in FIGS. 51 to 53. Then, the extrusion opening takes the shape for the cross-sectional shape of the upper molding part 802u. From this time on, the upper molding part 802*u* is extruded with a certain cross-sectional shape over a necessary length.

When the upper molding part 802*u* is extruded a certain length, the other corner molding part 802*c* and the other side molding part 802*s* are molded in the procedure opposite to the one described above. Thus, the windshield molding 802 is successively obtained in one piece.

It is possible to properly control the variation and start-end timing with respect to the water drain channel 826 so as to form various moldings by combination of the operation timing.

As mentioned above, in the windshield molding relating to this embodiment, the water drain channel varies in the cross-sectional shape according to the thickness of the exterior wing. That is, the cross-sectional shape of the water drain channel has the rectangular shape to obtain a maximum capacity of flowing space in the section having the maximum thickness and has the triangular shape to reduce the capacity of flowing space in the section reduced in the thickness, therefore, it is possible to form the water drain channel in the section reduced in the thickness so as to improve the function of the water drain channel.

Further, in the production method of the windshield molding relating to this embodiment, the entire length of the windshield molding is extruded in succession and the water drain channel is formed efficiently by maintaining a good supplying flow of the extruding material due to the gradual change in the cross-sectional shape of the water drain channel, and to avoid a rapid change of the supplying flow resistance. Therefore, it is possible to extrude a windshield molding having a good appearance efficiently.

Figure 54:
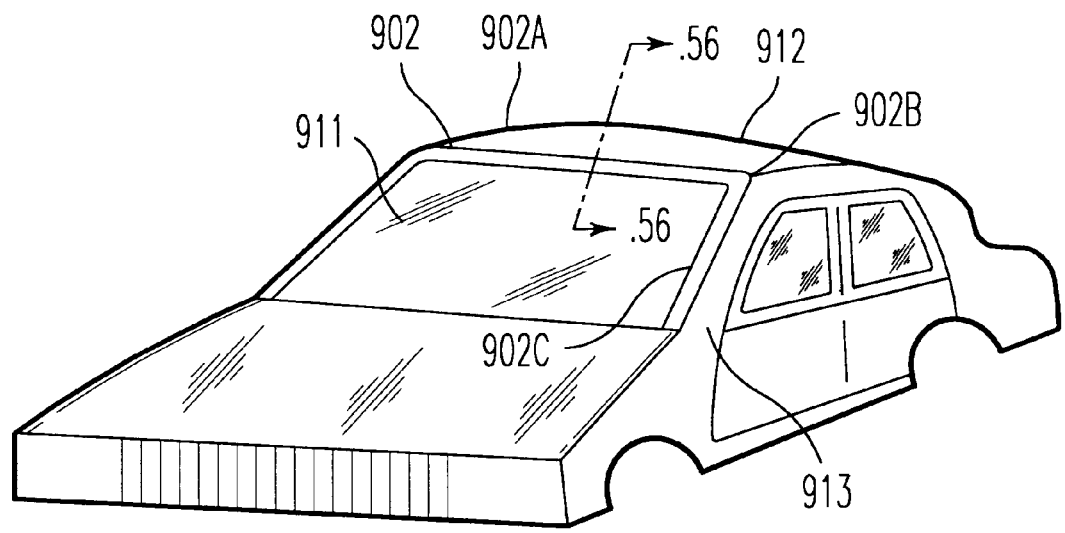
FIG. 54 is an explanatory perspective view showing an automobile front containing the windshield molding produced according to the present invention.
Figure 55:
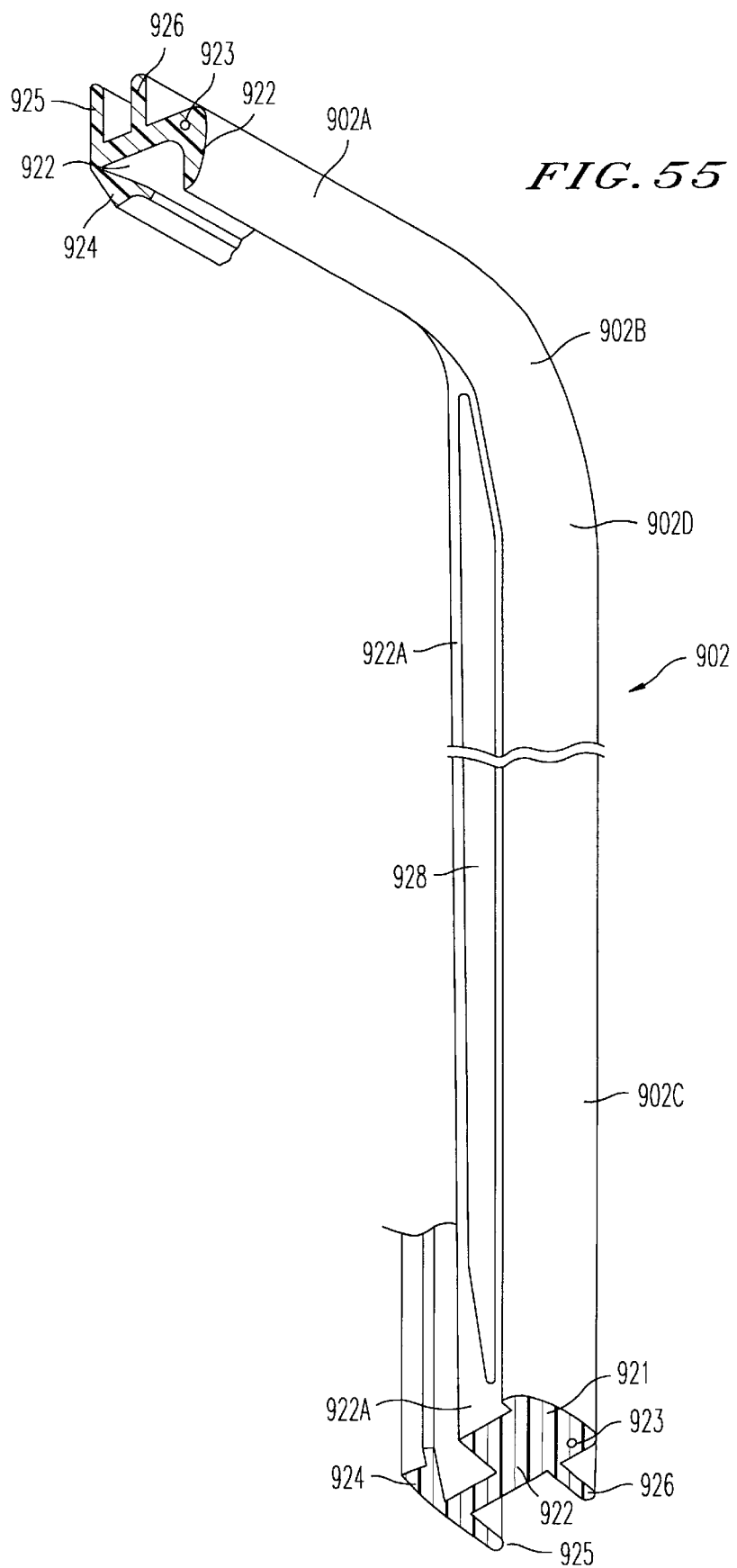
FIG. 55 is an explanatory perspective view showing the structure of the windshield molding in an additional embodiment of the present invention.

As FIG. 54 shows, a windshield molding 902 composed of long belt-shaped extruded sealing members is installed along the periphery of the windshield glass 911 of an automobile. This windshield molding 902 is composed of the upper molding part 902*a* which is installed in the space between the upper edge of the above-mentioned windshield glass 911 and the roof panel 912, the side molding parts 902*c* of which are installed in the space between both side edges of the windshield glass 911 and the pillar panel 913 and the curved corner molding sections 902B with which the upper molding part 902*a* and the side molding parts 902*c* are connected. However, these molding parts, 902*a*, 902*b* and 902*c*, are formed continuously as a single molding by extrusion as described later herein.

Figure 56:
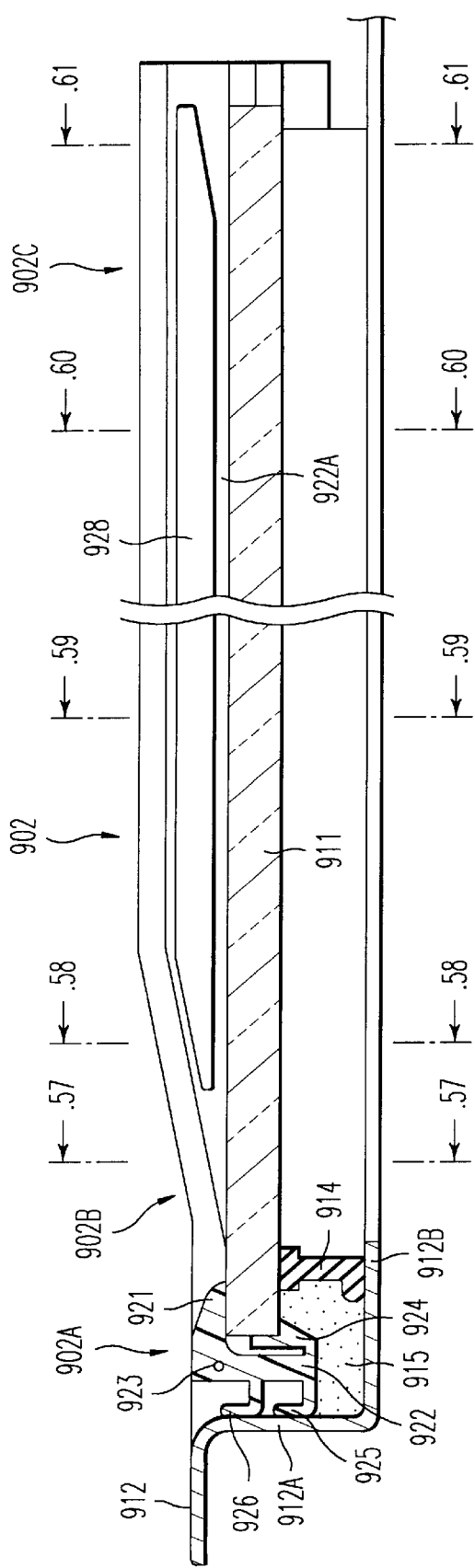
FIG. 56 is a cross-sectional view taken along line 56—56 shown in FIG. 54.

The windshield molding 902 in the embodiment shown in FIGS. 55 to 59 is made of elastic material such as rubber, synthetic resin, etc. into a long belt-shaped solid molding with the extruder described later herein, is provided with the connection portion 922 which is inserted in the spaces between the periphery of the windshield glass 911 and both the roof panel 912 and the front pillar 913 and is provided with the exterior wing 921 which covers the above-mentioned space from the outside (the upper side of FIG. 56). The cross-sectional shape perpendicular to the longitudinal direction, consisting of the exterior wing 921 and the connecting portion 922 is of an approximately L shape.

A wire 923 of the core is buried in the connection of the connecting portion 922 with the exterior wing 921. A lip-shaped portion 924 which holds the inside edge (the lower side) of the windshield glass 911 and an elastic lip 925 which extends to and is pressed to the walls of the body panels 912 and 913 are provided on the inside edge (the lower side of FIG. 56) of the connecting portion 922 throughout the entire length, and another elastic lip 926 is provided on the connecting portion 922 slightly outwards (i.e. on the upper side of FIG. 56) and almost parallel with the above-mentioned elastic lip 925.

The exterior wing 921 is the lip-shaped member extending from the outside edge (i.e. the upper side of FIG. 56) of the connecting portion 922 to the windshield glass 911 and covers the outer surface of the windshield glass 911 from the outside. The exterior wing 921 is formed to have a constant outer contour appearance at the outer surface throughout the entire length of the windshield molding.

The height of the exterior wing 921 including the connecting portion 922 from the inside edge to the outside edge (the vertical direction in FIG. 56) is short on the upper molding part 902*a* but is slightly longer on the side molding part 902*c*. This is because the height difference between the outer surface of the windshield glass 911 and that of the roof panel 912 is larger on the side sections than on the upper section as described later herein, namely, as the height difference changes, the height of the exterior wing 921 including the connecting portion 922 is changed. The height is gradually increased from the corner molding section (see FIGS. 57 and 58.) and reaches the maximum on the upper side of the side molding section (see FIG. 59.), but the maximum height is maintained to the lower area through the central area of the side molding section (see FIGS. 60 and 61.).

At the portions where the height of the side molding part 902C is increased on the side panels, the upper wall of the abovementioned exterior wing 921 is projected apart from the outer surface of the windshield glass 911 by an amount corresponding to the height of the relevant exterior wing 921 including the connecting portion 922. Also, the enlarged thickened portion 922*a* of the exterior wing 921 is inserted into the space between the upper wall of the exterior wing 921 projected from the outer surface of the windshield glass 911 the thickness in the direction from the outside to the inside (the vertical direction in the figure) of the said enlarged thickened portion 921*a* of the exterior wing 921 is changed by an amount corresponding to the height difference between the outer surface of the above-mentioned windshield glass 911 and the surface of the roof panel 912.

In other words, the above mentioned enlarged thickened portion 921*a* of the exterior wing 921 is not provided on the upper molding part 902A where the height difference is constant (see FIG. 56), the exterior wing 921 and the connecting portion 922 which are equal in thickness and cross-sectional shape are provided throughout the entire length of the upper molding part 902A. Then, the thickness in the direction from the outside to the inside of the enlarged thickened portion 921*a* of the exterior wing 921 is increased along the corner molding part 902B especially from the halfway position to the lower end 902D toward the side molding (see FIGS. 57 and 58) as the above-mentioned height difference increases. The enlarged thickened portion 921*a* in this section is integrated with the exterior wing 921. Also, the thickness of the enlarged thickened portion 921*a* is increased to the maximum in the longitudinal upper area and the approximate center area of the side molding part 902C (see FIGS. 59 and 60) corresponding to the largest height difference. The maximum thickness of the enlarged thickened portion 922*a* is kept constant on the side molding section from the center to the lower areas (see FIG. 61).

As mentioned above, the connecting portion 922 is provided at the inside to correspond with the edge of the windshield glass 911, and a rainwater groove 928 is provided along the inside wall of the enlarged thickened portion 921*a* and is open to the inside the rainwater groove 928 is provided from the midpoint of the corner molding part 902B to the lower portion of the side molding part, its bottom being of almost triangular cross-sectional shape, and both walls are formed so as to be almost parallel at the opening. The depth of the rainwater groove 928 changes suitably in the longitudinal direction of the molding.

Figure 57:
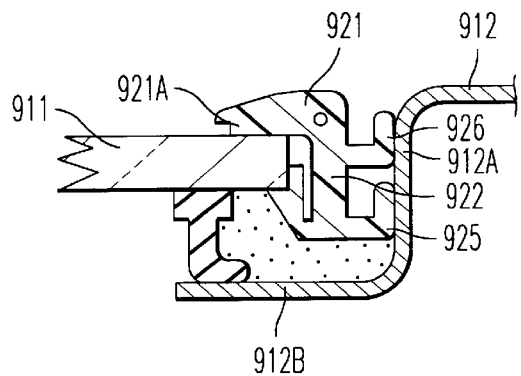
FIG. 57 is a cross-sectional view taken along line 57—57 shown in FIG. 56.
Figure 58:
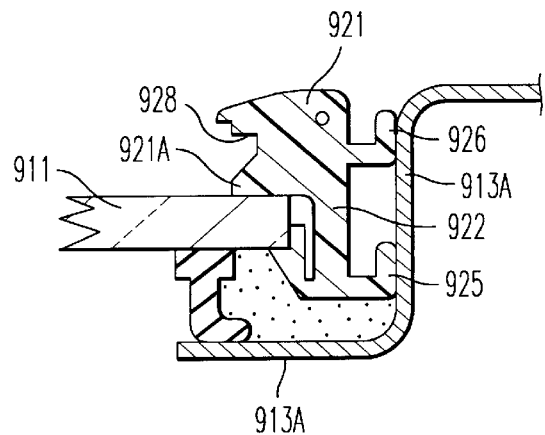
FIG. 58 is a cross-sectional view taken along line 58—58 shown in FIG. 56.
Figure 59:
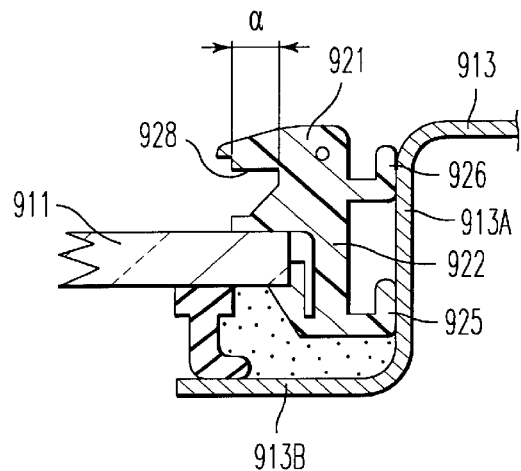
FIG. 59 is a cross-sectional view taken along line 59—59 shown in FIG. 56.
Figure 60:
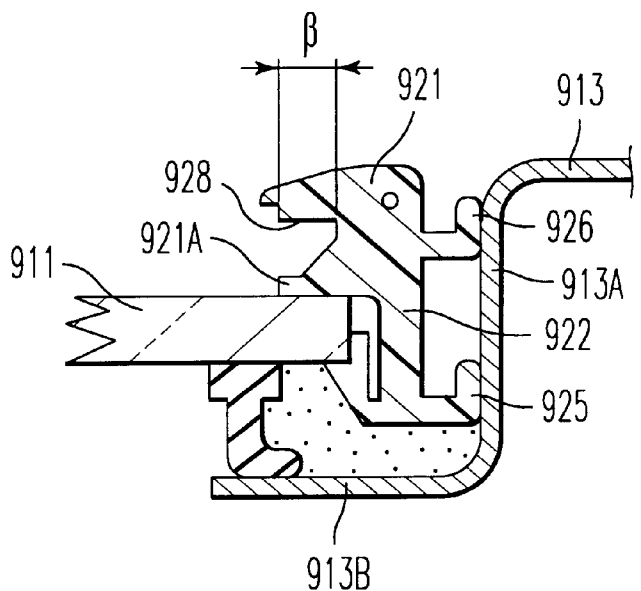
FIG. 60 is a cross-sectional view taken along line 60—60 shown in FIG. 56.

The rainwater groove provided on the corner molding part 902B shown in FIGS. 57 and 58 is only the tip of the triangle, and the depth and width of the rainwater groove 928 are gradually changed corresponding to the thickness of the above-mentioned enlarged thickened portion 921a. As FIGS. 59 and 60 show, the rainwater groove 928 is widest in the center area of the side molding part where the enlarged thickened portion 921a is thickest. The largest groove width on the side molding section maintained for a certain length downward is reduced, and the rainwater groove 928 is discontinued at the specified position.

The depth of the rainwater groove 928 is changed irrespective of the above-mentioned groove width. The depth of the rainwater groove 928 is set to the maximum of α as shown in FIG. 59, at the upper portion of the side molding part. The width is maintained constant but the depth is changed to β, as shown in FIG. 60, slightly shallower than the maximum depth of α at a slightly lower position than the abovementioned position.

Figure 61:
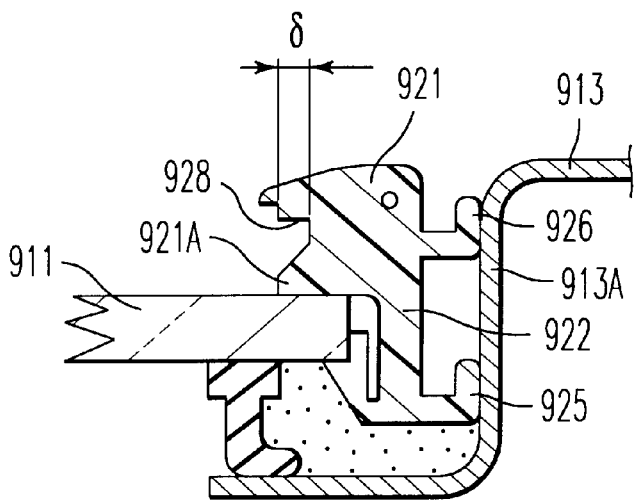
FIG. 61 is a cross-sectional view taken along line 61—61 shown in FIG. 56.
Figure 62:
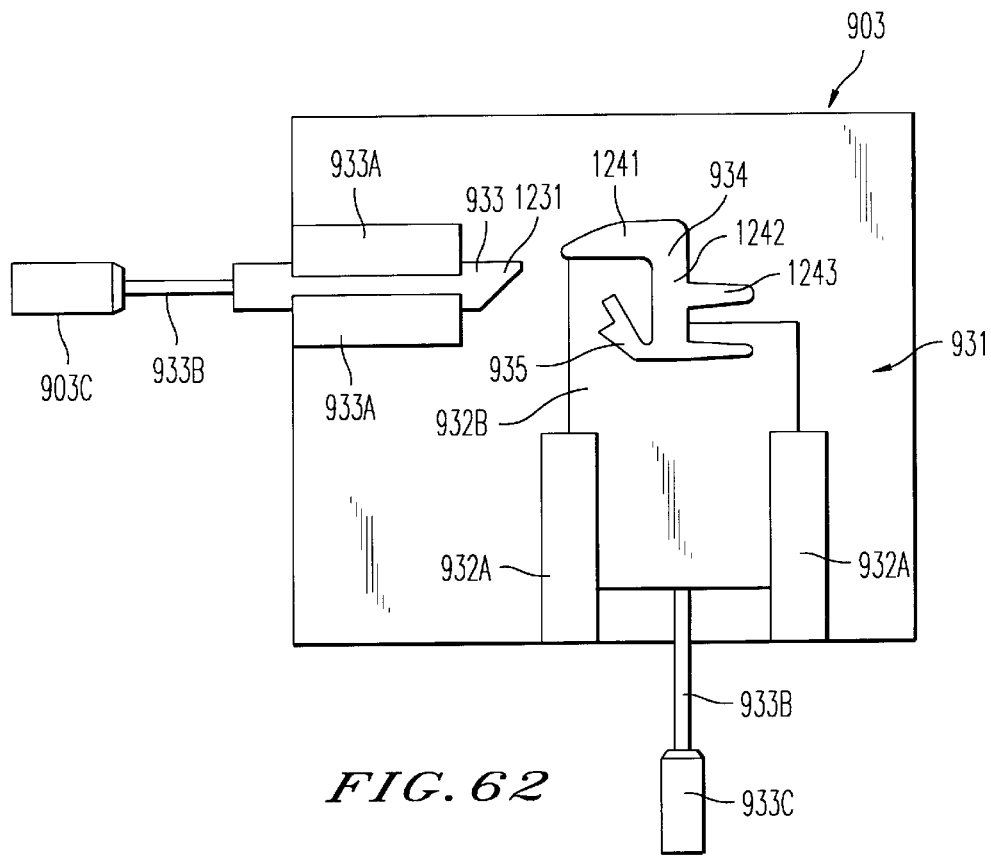
FIG. 62 is an explanatory front view showing an example of the extruder for the windshield moldings shown in FIG. 55 to FIG. 61.

The rainwater groove 928 provided at the lower portion of the side molding part is only the tip of the triangle, and the depth and width of the rainwater groove 928 is reduced as shown in FIG. 61 (Groove depth: γ).

The following discussion explains the structure on the body where the windshield glass is set with the windshield molding 902. The inside edge of the windshield glass opening is bent inwards in step form so as to accept the windshield glass 911, and flanges 912b and 913b are provided with bent walls 912a and 913a. The height of the bent wall 912a along the upper molding part is uniform, but that of the bent wall 913a along the side molding part is gradually increased from the middle of the corner molding part.

The windshield molding 902 is installed first on the periphery of the windshield glass. At this time, the windshield glass 911 is set between the lip-shaped portion 924 of the upper molding part 902A and the exterior wing 921 along the upper edge and the corner edge of the windshield glass 911 and is set between the lip-shaped portions 924 of the side molding parts 902c and the enlarged thickened portions 921a of the exterior wing 921 along the side edges of the windshield glass 911. The corner molding part 902b is curved to the specified bending rate as the windshield molding 902 is installed, but since the exterior wing 921 is thickened as described above, no wrinkles or other nonconformities will be caused due to the difference in length of the inner and the outer bending circumferences.

On the other hand, a belt-like rubber dam 914 is adhered to the flanges 912b and 913b on the above-mentioned body panels 912 and 913, and an adhesive is filled by extrusion around the outer periphery of the rubber dam 914. The inner side of the windshield glass 911 on which the windshield molding 902 is installed is pressed onto the above-mentioned rubber dam. As a result, the lip-shaped portion 924 of the windshield molding 902 is fixed with the adhesive 915, and the elastic lips 925 and 926 are bent and fixed to the bent walls 912a and 913a, respectively. The elastic rebound force caused by bending the elastic lips 925 and 926 works as the fixing force and the posture stabilizing force of the windshield molding 902.

The windshield glass 911 is thus fixed on the flanges 912b and 913b on the body panels 912 and 913 at approximately the same height all around. The thickness of the enlarged thickened portion 921a of the exterior wing 921 is set according to the height difference created between the outer surface of the windshield glass 11 and the surface of the roof panel 912 corresponding to the heights of the bent walls 912a and 913a. First, there is scarcely any height difference on the upper molding part (see FIG. 56.) throughout the overall length, the exterior wing 21 and the connecting portion 922 are maintained with a uniform cross-sectional shape, and no enlarged thickened portion is formed on the exterior wing 921. A slight height difference is provided on the corner molding part (see FIGS. 57 and 58), and an enlarged thickened portion 921a is provided on the exterior wing 921 corresponding to the height difference. The thickness of the enlarged thickened portion 921a is gradually increased toward the side molding part corresponding to the change in height difference. The height difference is gradually increased from the middle of the corner molding part to the side molding part, and the maximum height difference is set in the upper and middle areas (see FIGS. 59 and 60) in the longitudinal direction of the side molding section. The thickness of the enlarged thickened portion 921a is set to the maximum amount corresponding to the maximum height difference, and the thickness is maintained constant through to the lower area of the side molding section (see FIG. 61).

In the case of the structure for installing the windshield glass 911 on the vehicle body, rainwater falling on the windshield glass 911 runs over the inner peripheral wall of the exterior wing 921 of the upper and the corner molding parts 902a, 902b toward the roof panel and rainwater collected at the side molding section is led through the rainwater groove 928 provided in the enlarged thickened portion 921a of the inward wing portion 921. At this time, the depth of the rainwater groove 928 is changed so that the rainwater in the groove will flow smoothly and drain well.

The windshield molding 902 installed on the windshield molding 911 may be inserted into the window opening, or the windshield glass 911 inserted into the window frame in advance and the windshield molding may be inserted into the space between the periphery of the windshield glass 911 and the body panels 912 or 913.

The following discussion explains the device for forming the above-mentioned windshield molding 902.

As FIGS. 62 to 65 show, the molding forming unit 903 is fitted with three dies for forming an opening for extruding synthetic resin. These dies are first die 931, second die 932 and third die 933 arranged in the molding extruding direction (i.e. in a vertical direction on the paper). The first die is fixed and has an extrusion opening 934 to form the exterior wing 921, the inward wing portion 922 and the elastic lip 926 of the windshield molding 902. The lower section of the extrusion open 934, equivalent to the lip-shaped portion 924 and the elastic lip 925 of the windshield molding 902, is provided with a large rectangular opening including the above portions 924 and 925.

The above-mentioned extrusion opening 934 comprising an extrusion opening 1241 for the exterior wing 921, an extrusion opening 1242 for the connecting portion 922 and an extrusion opening 1243 for the elastic lip 926. The extrusion opening 1241 is covered with a bow-shaped upper portion similar to the upper edge of the exterior wing of the windshield molding 902. In addition, the extrusion opening 1241 is shaped like the enlarged thickened portion 921a of the exterior wing 921 without the rainwater groove 28 and is connected to the extrusion opening 1242.

The second die 932 and third die 933 are in the form of a plate and are supported with pairs of guides, 932a, 932a and 933a, 933a respectively so as to move parallel with the front of the first die 931. The extrusion opening 935 of the second die 932 is shaped so as to correspond to the lower portion of the connecting portion 922 of the windshield molding 902, the lip-shaped portion 924 and the elastic lip 925. In addition, dies 931 and 932 are aligned so that an open area provided at the upper side of the section corresponding to the connecting portion 922 is connected to the section corresponding to the enlarged thickened portion 921a in the extrusion opening 934 of the first die 931. A connection rod 932b is provided at the lower edge of second die 932 and is connected to the drive motor 932c through the converter which converts rotary motion to linear motion. The driving force of the drive motor 932c reciprocates the second die 932 between the molding position of the upper molding part shown in FIG. 62 and the molding position of the side molding part shown in FIGS. 63 to 65.

The third die 933 is installed so as to reciprocate in the direction perpendicular to the second die 932, and the connecting rod 933b provided at the left end of the third die 933 is connected to the drive motor 933c through the converter which converts rotary motion to linear motion. A triangular shielding lug 1231 is formed at the right tip of third die 933 so as to correspond to the rainwater groove 928 of the above-mentioned windshield molding 902. The shielding 1231 of the third die 933 is positioned so as to enter the extrusion opening 1241 of first die 931 and is designed to reciprocate in interlock with the reciprocating motion of second die 932 as shown in FIGS. 62 to 65.

The following discussion explains the production method of the windshield molding 902 with the above-mentioned molding extruder 903.

To produce the windshield molding 902, the upper molding part 902A, the corner molding part 902B and the side molding part 902C are extruded as a single molding, and it is produced in the order of side molding part 902C, corner molding part 902B, upper molding part 902A, another corner molding part 902B and another side molding part 902C.

Figure 63:
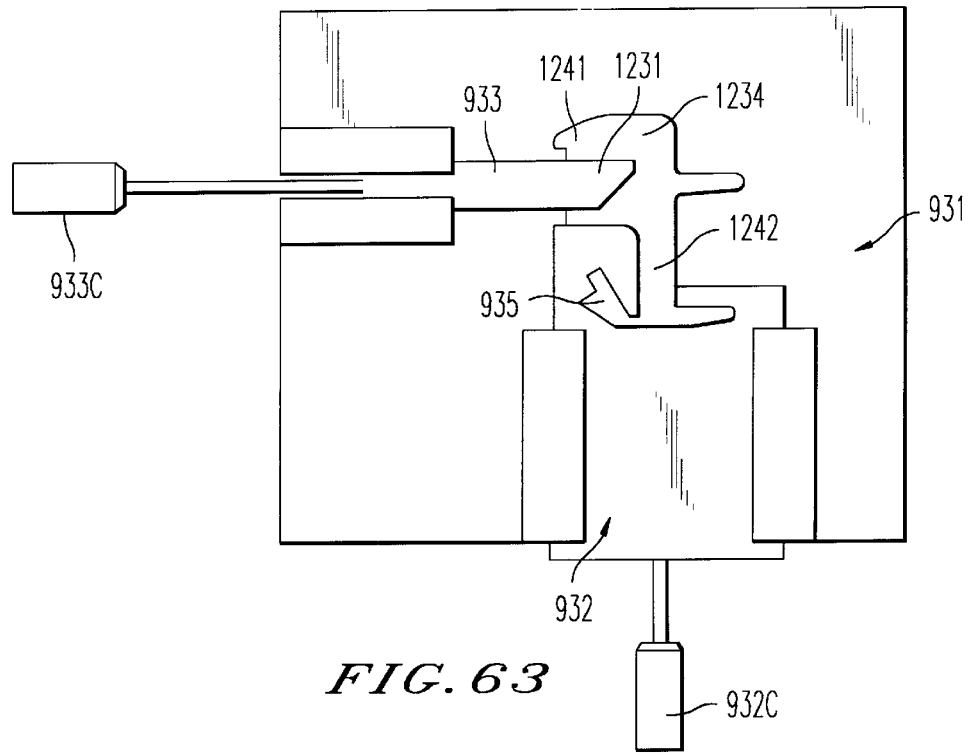
FIG. 63 is an explanatory front view showing the extruder of FIG. 62 in a moved state.
Figure 64:
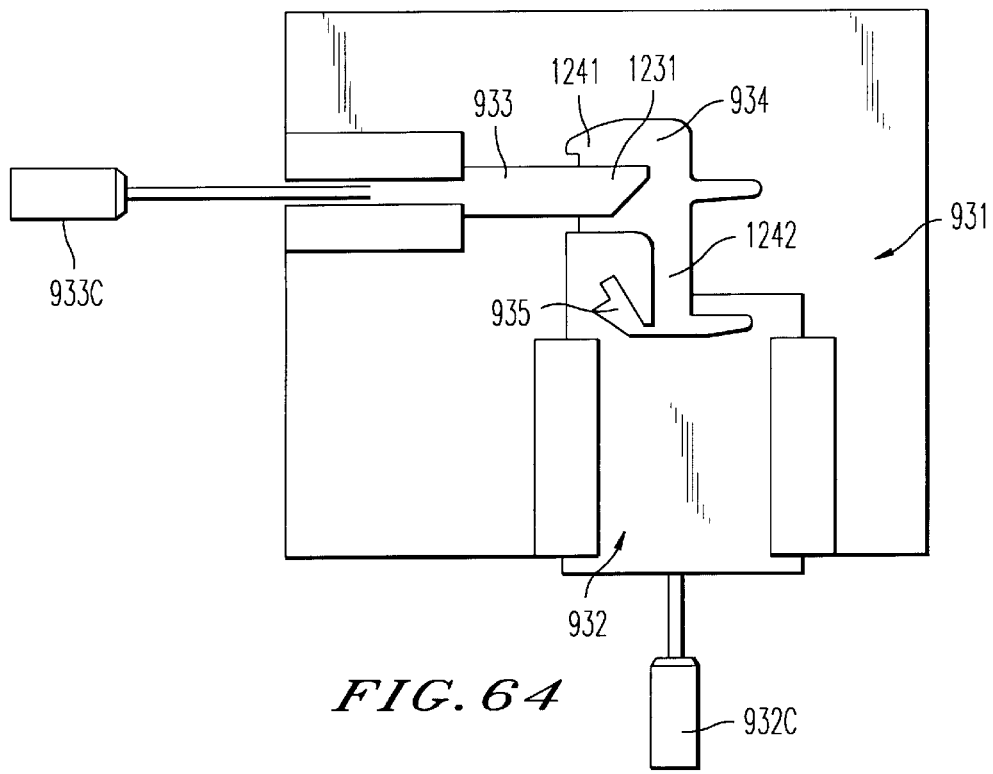
FIG. 64 is an explanatory front view showing the extruder of FIG. 62 in a further moved stated.
Figure 65:
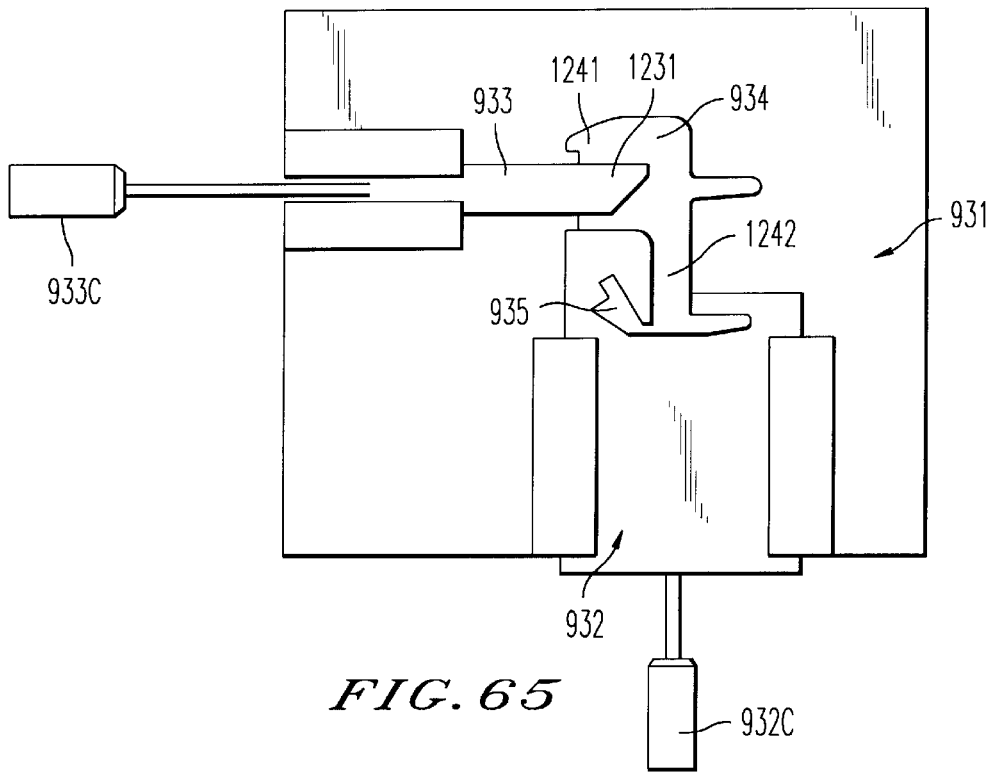
FIG. 65 is an explanatory front view showing the extruder of FIG. 62 in a further moved state.

When the side molding part 902C is extruded, first die 931 and second die 932 are held in a certain positional relation as shown in each of FIGS. 65, 64 and 63, and third die 933 is first brought to the withdrawal position (see FIG. 62.), and extrusion of the side molding part 902C starts from the lower end (the right end portion in FIG. 56). At the same time a metal wire 923 is fed to the extrusion opening 934 of No. 1 die 931.

When the lower side section is extruded to a certain length in a certain sectional form, third die 933 advances slightly, and the shielding lug of third die 933 enters the extrusion opening 1242 of first die 931 as shown in FIG. 65. The rainwater groove 928 starts to be formed by this in the enlarged thickened portion 921a, and the groove depth is gradually increased as shown in FIGS. 65, 64 and 63 as third die 933 advances. At this time, it is possible to cut the extrusion material corresponding to the rainwater groove 928 by a third die set apart from first die 931. When the extruder is in the state shown in FIG. 63, the rainwater groove 928 reaches the maximum depth. The side molding part with the maximum groove depth shown in FIG. 63 is extruded to a certain length.

When the forming position of the corner molding part 902B approaches, second die 931 is pushed upward, and third die 933 starts to withdraw causing the extrusion opening 1242 of first die 931 to be reduced and the thickness of the enlarged thickened portion 921a to be decreased. However, sections other than the enlarged thickened portion 921a maintain the same sectional form. At the same time, as third die 933 withdraws, the depth and width of the rainwater groove 928 both decrease in proportion to the thickness reduction of the enlarged thickened portion 921a. At this time, third die 933 moves interlockingly with second die 932. When the corner molding part 902B is completely extruded, second die 932 and third die 933 reach the position shown in FIG. 62.

In other words, when the third die retreats and leaves the extrusion opening 1242 of first die 931, the rainwater groove 928 is no longer formed in the enlarged thickened portion 921a of the exterior wing 921, and the whole extrusion opening is shaped so as to correspond with the sectional form of the upper molding part 902A. Then, the upper molding part 902A starts being extruded with a certain sectional form. When the upper molding part 902A is extruded to a certain length, a corner molding part 902B and a side molding part 902C are formed in the reverse order to that described above, and the complete windshield molding 902 is produced.

Figure 66:
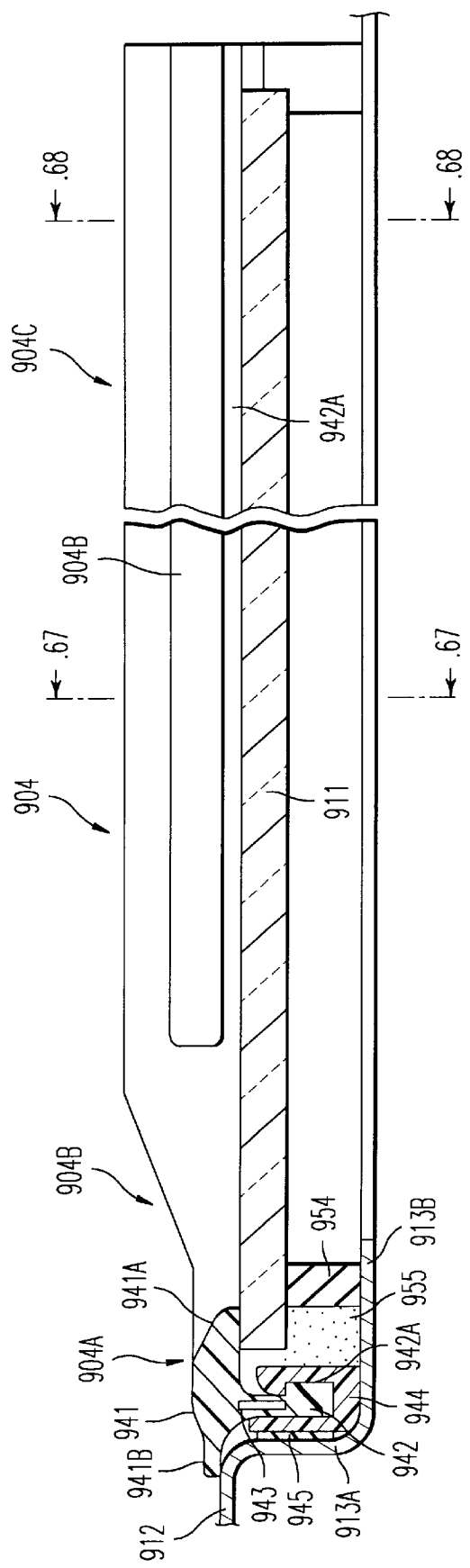
FIG. 66 shows the structure of the windshield molding in a further embodiment of the present invention and is a cross-sectional view similar to FIG. 56.
Figure 67:
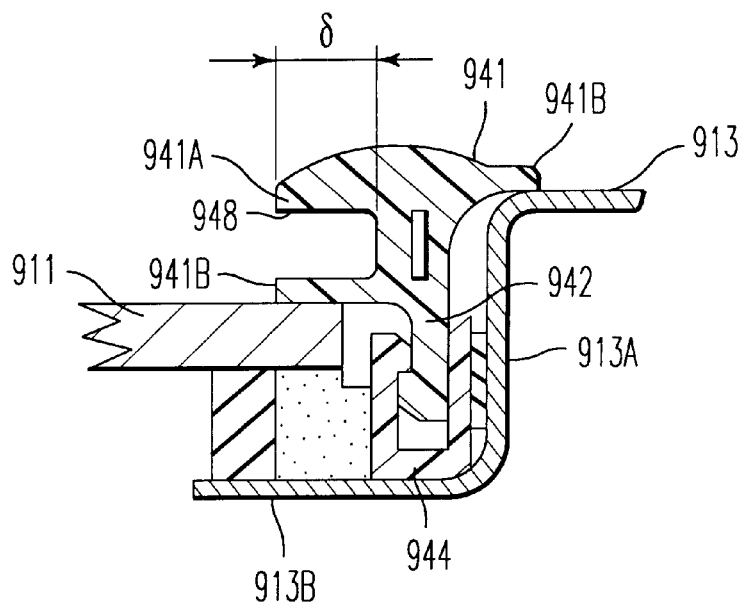
FIG. 67 is a cross-sectional view taken along line 67—67 shown in FIG. 66.
Figure 68:
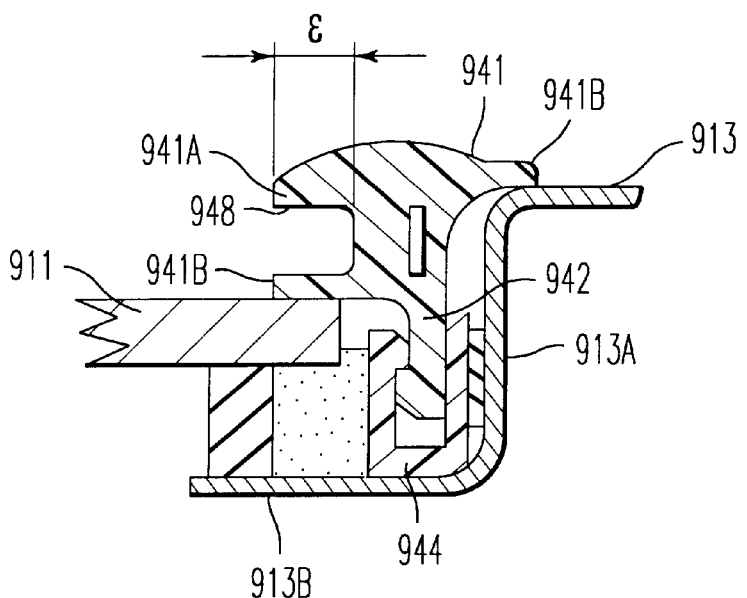
FIG. 68 is a cross-sectional view taken along line 68—68 shown in FIG. 66.
Figure 69:
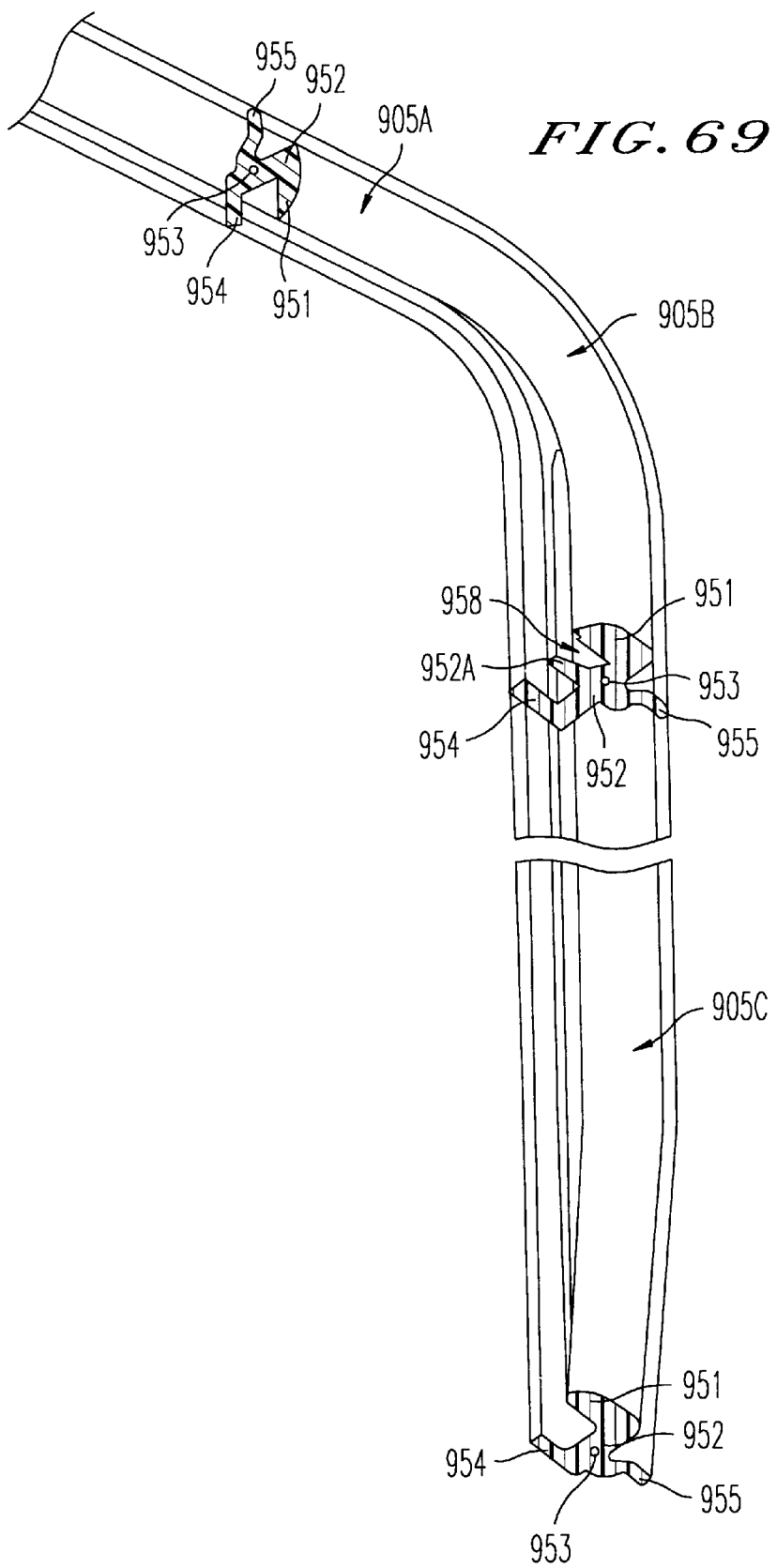
FIG. 69 shows another embodiment and includes an explanatory perspective view of a windshield molding.
Figure 70:
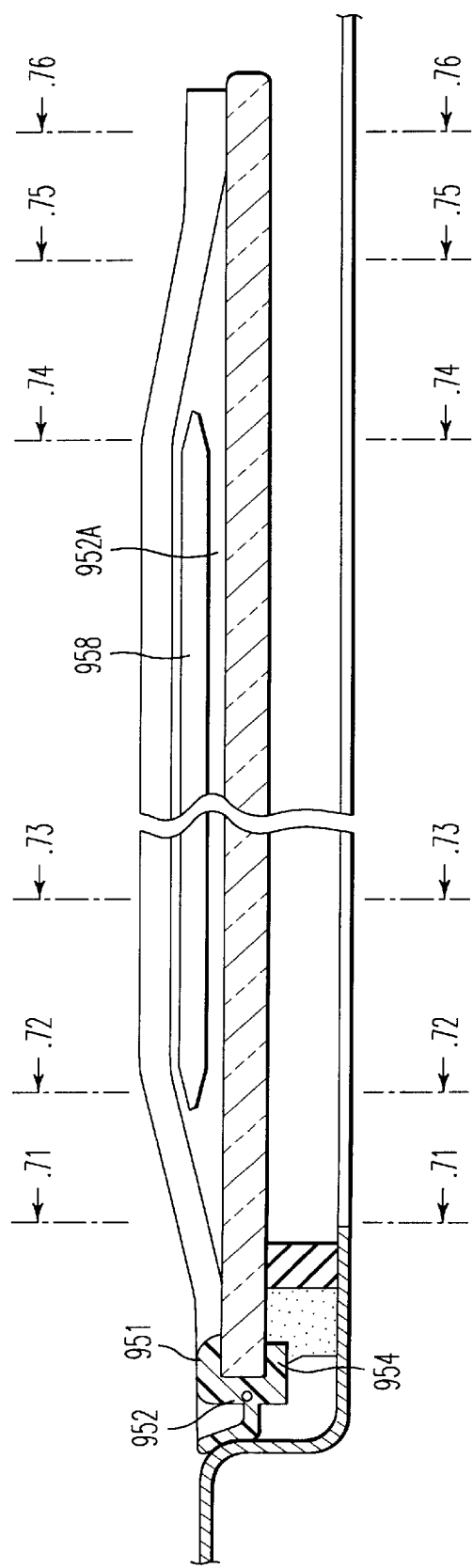
FIG. 70 is a cross-sectional view of the molding of FIG. 69.
Figure 71:
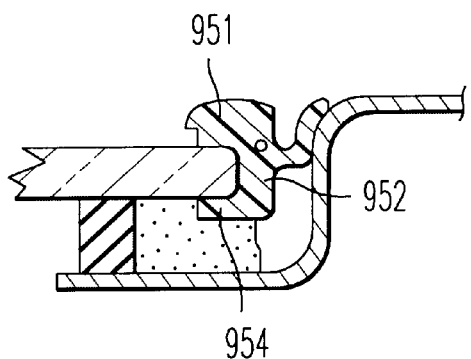
FIG. 71 is a cross-sectional view taken along line 71—71 shown in FIG. 70.
Figure 72:
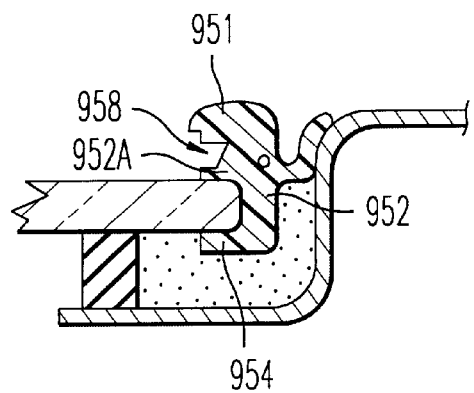
FIG. 72 is a cross-sectional view taken along line 72—72 in FIG. 70.
Figure 73:
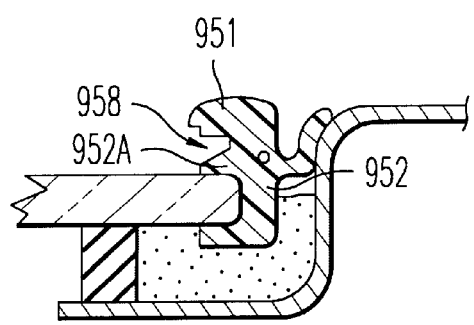
FIG. 73 is a cross-sectional view taken along line 73—73 in FIG. 70.

In other embodiments of the windshield molding of the present invention shown in FIGS. 66 to 68, the windshield molding is set with the fastener 944 fixed on the roof panel 912 and the pillar panel 913. A belt-shaped rubber dam 954 is fixed on the flanges 912b and 913b of the body panels 912 and 913. Adhesive 955 is filled by extrusion around the periphery of the rubber dam 954, and the inner side face of the windshield glass 911 is pressed onto said rubber dam. The windshield glass is fixed on the flanges 912b and 913b of the body panels 912 and 913 with an approximately equal height.

The above fastener 944 has a locking groove in a U-shaped cross-sectional form, and the external peripheral side wall composing said locking groove is fixed with the adhesive tape 945 along the bent walls 912a and 913a of the body panels 912 and 913. The connection portion 942b at the tip of the connecting portion 942 of the windshield molding 904 is inserted in the locking groove of the above fastener 944 to fix the windshield molding 904.

The exterior wing 941 which covers the space between the body panels 912 and 913 and the windshield glass 911 from the outside is formed on the outside edge of the above connecting portion 942 as a single molding. The exterior wing 941 and the connecting portion 942 shape the cross-sectional form perpendicular to the longitudinal direction. Also, a thin metal plate 943 is buried as core material near the connection with the exterior wing 941 in the connecting portion 942.

The exterior wing 941 consists of a glass side exterior wing 941a and a panel side connecting portion 941b which extend from the outside edge of the connecting portion 942 (the upper end in FIG. 66) to the windshield glass 911 and the body panels 912 and 913, respectively. The glass side exterior wing 941a is composed of a lip-shaped member which covers the outer surface of the windshield glass 911, and the panel side exterior wing 941b is composed of a lip-shaped member which contacts the outer surface of the body panel 912. The panel side exterior wing 941b have equal thicknesses and shapes respectively throughout the overall length of the windshield molding.

In this embodiment, as well as in the first embodiment, the height difference between the outer surface of the windshield glass 911 and the outer surface of the roof panel 912 is larger at the side molding part than at the upper molding part, and the thickness of the exterior wing 941 is gradually increased from the corner section based on the height difference. An enlarged thickened portion 941b is provided to enlarge the exterior wing 941 inward at the place where the thickness of the exterior wing 941 is increased on the side molding part 904c. The enlarged thickened portion 941b of the exterior wing 941 is provided between the upper wall of the above glass side exterior wing 941a and the outer surface of the windshield glass 911, and the thickness in the direction from the inside to the outside (the vertical direction in the figure) of the enlarged thickened portion 941b is changed corresponding to the height difference between the outer surface of the windshield glass 911 and the surface of the roof panel 912.

The enlarged thickened portion 941b is not provided on the upper molding part 904A for which the height difference is kept constant (see FIG. 66) and the exterior wing 941 and the connecting portion 942 of uniform thickness and cross section are provided throughout the overall length of the upper molding part 904A. The thickness from the inside to the outside (in the vertical direction in the figure) of the enlarged thickened portion 941b in the exterior wing 941 is increased along the corner molding part from the middle to the lower end toward the side molding part as the above-mentioned height difference increases. The enlarged thickened portion 941b in this area is integrated with the upper wall of the glass side exterior wing 941a. Also, the thickness of the enlarged thickened portion 941b is maximum corresponding to the maximum height difference along the side molding part 904c (see FIGS. 67 and 68), the maximum thickness being maintained to the lower end of the side molding part.

The enlarged thickened portion 941b is provided on the connecting portion opposite the windshield glass 911, and the rainwater groove 948 is provided facing the inner periphery along the thickest portion of the enlarged thickened portion 941b. The rainwater groove 948 is U shaped in cross section and is provided along the side molding parts from the lower end of the corner molding part 904b to the lower portion of the side molding part. The width of the rainwater groove is constant in the longitudinal direction, but the depth is suitably changed in the longitudinal direction of the windshield molding.

In the upper portion of the side molding part shown in FIG. 67, the depth of the rainwater groove is set to the maximum of δ, and in the portion slightly lower than the above-mentioned portion shown in FIG. 68, the groove width is kept constant, but the groove depth is set to E, slightly shallower than the maximum depth of δ.

In the case of such body side structure for fixing the windshield glass 911, rainwater falling on the windshield glass is led to the inner wall of the windshield molding 904 and is drained to the specified portion. Rainwater on the windshield glass runs over the inner peripheral wall of the exterior wing 941 of the upper and the corner molding parts 904A, 904b to the roof panel 912 and rainwater is collected at the side molding part 904C and is led along the rainwater groove 948 in the enlarged thickened portion 941b of the inward wing portion 941, the depth of the rainwater groove being suitably changed to allow rainwater to flow smoothly and drain properly through the groove.

As explained above, the present invention is as operative and effective even in the second embodiment as in each of the above embodiments. It is also possible even in this embodiment to insert the windshield molding 904 combined with the windshield glass 911 into the window frame or to first insert the windshield glass 911 into the window frame and to insert the connecting portion of the windshield molding in the space between the periphery of the windshield glass 911 and the body panels 912 and 913.

Also, the windshield moldings mentioned in each of the above embodiments are applicable not only to the windshield glass but also to rear window glass and other window glass in the same way.

In other embodiments of the windshield molding of the present invention shown in FIGS. 69 to 75, a windshield molding 905 is composed of the upper molding part 905A, the side molding parts 905C and the curved corner molding parts 905B which are formed continuously as a single molding by extrusion.

The windshield molding 905 in this embodiment is provided with the connecting portion 952 and the exterior wing 951. A wire 953 of the core is buried in the exterior wing 951 or the central portion of the connecting portion 952. A lip-shaped portion 954 which holds the inside edge (i.e. the lower side) of the windshield glass 911 and an elastic lip 955 which extends to and is pressed to the walls of the body panels are provided on the inside edge (i.e. the lower side of FIG. 70) of the connecting portion 952 or the exterior wing 951 throughout the entire length.

Figure 74:
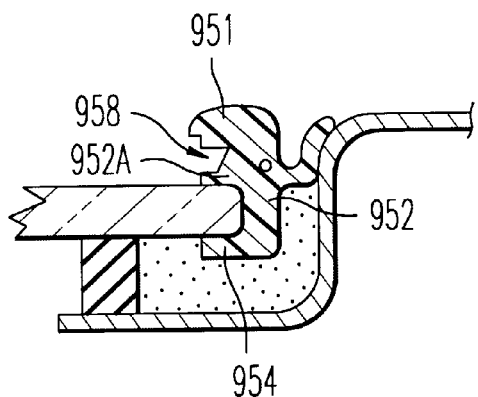
FIG. 74 is a cross-sectional view taken along line 74—74 in FIG. 70.
Figure 75:
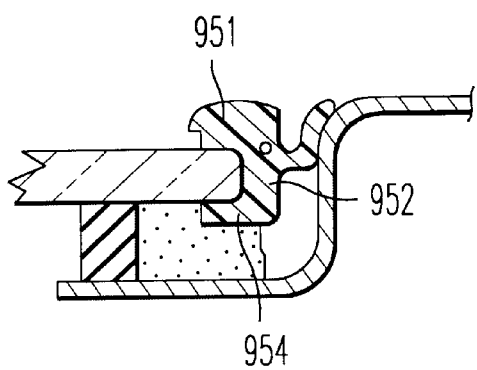
FIG. 75 is a cross-sectional view taken along line 75—75 in FIG. 70.
Figure 76:
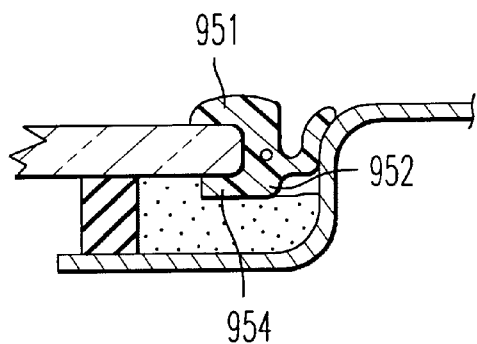
FIG. 76 is a cross-sectional view taken along line 76—76 in FIG. 70.

The thickness of the exterior wing 951 from the inside edge to the outside edge (i.e. the vertical direction in FIG. 70) is gradually increased from the corner molding part (see FIGS. 71 and 72.) to the side molding part and reaches a maximum on the upper side of the side molding section (see FIG. 73), but after the maximum thickness is maintained through the central area of the side molding section 905C, at the lower area of the side molding part 905C the thickness of the exterior wing 951 is gradually decreased (see FIG. 74, 75, 76).

In other words, the thickness in the direction from the outside to the inside of the enlarged thickened portion 951a on the exterior wing 951 is decreased from the lower area to the lower end as the above-mentioned height difference decreases.

The rainwater groove 958 provided on the side molding part 905C shown in FIGS. 70, 72, 73 and 74 is gradually changed in depth and width corresponding to the thickness of the enlarged thickened portion 951a and the rainwater groove 958 is discontinued at the specified position.

The rainwater groove 958 provided at the lower portion of the side molding part 905C, as shown in FIG. 74, is only the tip of the triangle.

The following discussion explains the device for forming the above-mentioned windshield molding 905.

Figure 77:
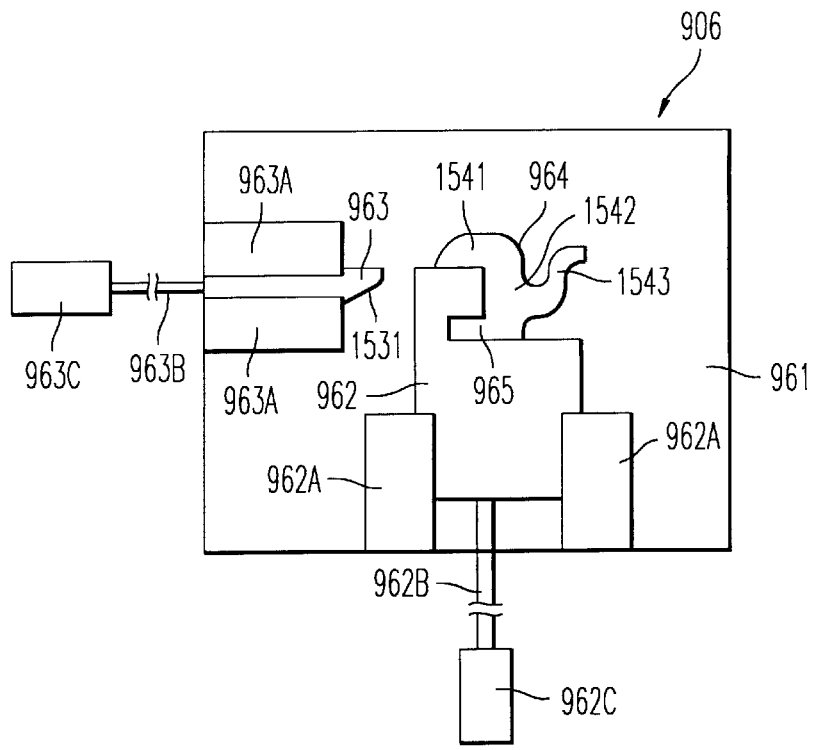
FIG. 77 is an explanatory front view showing an example of an extruder.
Figure 78:
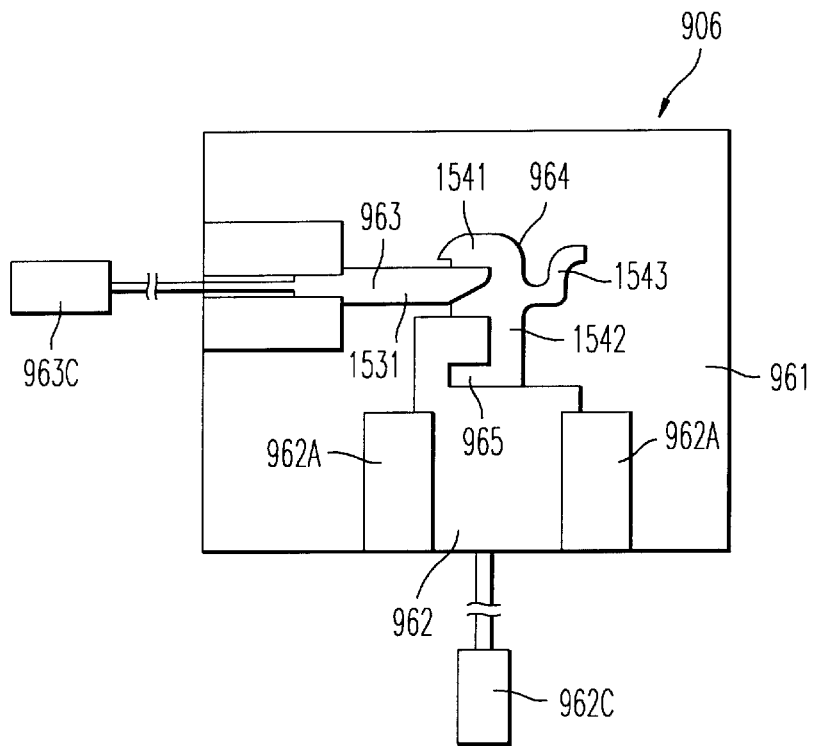
FIG. 78 is an explanatory front view showing the extruder of FIG. 77 in a moved state.

As FIGS. 77 and 78 show, the molding forming unit 906 is fitted with three dies for forming an opening for extruding synthetic resin. These dies include a first die 961, a second die 962 and a third die 963 arranged in the molding extruding direction (i.e. a vertical direction on the paper). First die 961 is fixed and has an extrusion opening 964 to form the exterior wing 951, the connecting portion 952 and the elastic lip 955 of the windshield molding 905. The lower section of the extrusion open 964, equivalent to the lip-shaped portion 954 of the windshield molding 905, is provided with a large rectangular opening including the above portion 954.

The above-mentioned extrusion opening 964 consists of an extrusion opening 1541 for the exterior wing 951, an extrusion opening 1542 for the connecting portion 952 and an extrusion opening 1543 for the elastic lip 955. The extrusion opening 1541 is covered with a bow-shaped upper portion corresponding to the upper edge of the decorative portion of the windshield molding 905. In addition, the extrusion opening 1542 is shaped like the enlarged thickened portion 952a of the connecting portion 952 without the rainwater groove 958 and is connected to the extrusion opening 1541.

Second die 962 and third die 963 are made of plate and are supported with pairs of guides, 962a, 962a and 963a, 963a respectively so as to move parallel with the front of first die 961. The extrusion opening 965 of second die 962 is shaped so as to correspond to the lower portion of the connecting portion 952 of the windshield molding 905, and the lip-shaped portion 954. In addition, dies 961 and 962 are aligned so that an open area of the second die 962 provided at the upper side of the section corresponding to the connecting portion 952 is connected to the section corresponding to the enlarged thickened portion 952a in the extrusion opening 964 of the first die 961.

A connection rod 962b is provided at the lower edge of second die 962 and is connected to the drive motor 962c through the converter which converts rotary motion to linear motion. The driving force of the drive motor 962c reciprocates second die 962 between the molding position of the upper molding section shown in FIG. 77 and the molding position of the side molding part shown in FIGS. 78.

Third die 963 is installed so as to reciprocate in the direction perpendicular to second die 962, and the connecting rod 963b provided at the left end of third die 963 is connected to the drive motor 963c through the converter which converts rotary motion to linear motion. A triangular shielding lug 1531 is formed at the right tip of third die 963 so as to correspond to the rainwater groove 958 of the above-mentioned windshield molding 905. The shielding lug 1531 of third die 963 is positioned so as to enter the extrusion opening 964 of first die 961 and is designed to reciprocate in interlocking relationship with the reciprocating motion of second die 962.

The following discussion explains the production method of the windshield molding 905 with the above-mentioned molding extruder 906:

When the extrusion is started from the lower end of the side molding part 905C, said first die 961 and second die 962 are held in a certain positional relationship as shown in FIG. 77 and third die 963 is brought to the withdrawal position. Upon extrusion of the lower area of the side molding part 905C, second die 961 is pushed downward causing the extrusion opening 1541 of first die 961 to enlarge and the thickness of the enlarged thickened portion 951a to increase, and third die 963 starts to move forward. However, sections other than the enlarged thickened portion 951a maintain the same sectional form. At the same time, as the third die 963 moves forward, the depth and width of the rainwater groove 958 both increase proportional to the additional thickness of the enlarged thickened portion 951a. At this time, third die 963 moves in an interlocking manner with second die 962.

When the side molding part 905C is extruded to a certain length and in a certain sectional form maintaining first die 961, second die 962 and third die 963 in a constant position with respect to each other and the forming position of the corner molding section 905B approaches, the second die 962 is pushed upward, and third die 963 starts to withdraw causing the extrusion opening 1541 of first die 961 to be reduced and the thickness of the enlarged thickened portion 951a to be decreased. At the same time, as the third die 963 withdraws, the depth and width of the rainwater groove 958 both decrease in proportion to the thickness reduction of the enlarged thickened portion 952a. At this time, third die 963 moves interlockingly with second die 962. When the corner molding part 905B is completely extruded, second die 962 and third die 963 reach the position shown in FIG. 77.

In other words, when the third die 963 retreats and leaves the extrusion opening 1541 of first die 961, the rainwater groove 958 is no longer formed in the enlarged thickened portion 951a of the connecting portion 952, and the whole extrusion opening is shaped so as to correspond with the sectional form of the upper molding part 905A. Then, the upper molding part 905A starts being extruded in a certain sectional form. When the upper molding part 905A is extruded to a certain length, a corner molding part 905B and a side molding part 905C are formed in the reverse order of the above, and the complete windshield molding 905 is produced.

Industrial Applicability

The present invention is applicable to all types of windshield moldings for automobiles with rainwater grooves and is suitable to produce the whole windshield molding as a single molding without requiring additional cutting or other processes.

What is claimed as new and desired to be secured by Letters Patent of the United States is:

1. An automobile windshield molding having a length, an upper portion corresponding to an upper edge of a windshield, corner portions corresponding to corner edges of a windshield, and side portions corresponding to side edges of a windshield, comprising:

an exterior wing extending along the entire length of the molding, further comprising, a lip-shaped outward wing portion having a uniform thickness along the entire length of the molding, an inward wing portion defined along the entire length of the molding, and sub-inward wing portions defined along each side portion of the molding, wherein water drain channels are defined between each corresponding inward wing portion and sub-inward wing portion along each side portion of the molding; and a connecting portion extending substantially perpendicularly from a junction of the inward wing portion and the outward wing portion of the exterior wing, the connecting portion having a foot and a flexible lip, wherein the inward wing portion and the foot have inside edges which define a windshield receiving portion along the upper portion and corner portions of the molding, and the sub-inward wing portions and the foot have inside edges which define the windshield receiving portion along the length of the water drain channels, wherein an installing section height defined between a top surface of the exterior wing and a base surface of the flexible lip varies along the length of the molding such that the installing section height is shortest in the upper portion of the molding and gradually increases from corner portions of the molding to central portions of the side portions of the molding, whereby the increase in the installing section height at said central portions of said side portions permits the outward wing portion to contact a window opening surface of an automobile when the molding is fitted in a parallel manner into an automobile windshield opening, and wherein the molding has end portions and the installing section height becomes shorter between the central portions of the side portions of the molding and the end portions of the molding.

2. An automobile windshield molding as in claim 1, comprising:

a metallic foil embedded lengthwise in the connecting portion.

3. An automobile comprising:

a windshield having an upper edge, corner edges and side edges;

a windshield opening defined by a roof panel and pillar panels having surfaces configured to receive the windshield, wherein a first distance in a direction normal to a surface of the windshield between the upper edge of the windshield and the roof panel is less than a second distance between the side edges of the windshield and the pillar panels; and a molding disposed between the windshield and the windshield opening, the molding having a length, an upper portion corresponding to the upper edge of the windshield, corner portions corresponding to the corner edges of the windshield and side edges corresponding to the side edges of the windshield, said molding further comprising, an exterior wing extending along the entire length of the molding, comprising, a lip-shaped outward wing portion having a uniform thickness along the entire length of the molding and covering a portion of the roof panel and the pillar panels, an inward wing portion defined along the entire length of the molding and covering a portion of the upper edge and corner edges of the windshield, and sub-inward wing portions defined along each side portion of the molding and covering a portion of the side edges of the windshield, wherein water drain channels are defined between each corresponding inward wing portion and sub-inward wing portion along each side portion of the molding, and a connecting portion extending substantially perpendicularly from a junction of the inward wing portion and the outward wing portion of the exterior wing, the connecting portion having a foot and a flexible lip, wherein the upper edge and corner edges of the windshield are received between inside edges of the inward wing portion and the foot and the side edges of the windshield are received between inside edges of the sub-inward wing portions and the foot along a length of the molding having the water drain channels, wherein an installing section height defined between a top surface of the exterior wing and a base surface of the flexible lip is shortest in the upper portion of the molding and gradually increases from corner portions of the molding to central portions of the side portions of the molding, whereby the increase in installing section height at central portions of the side portions permits the outward wing portion to contact the surfaces of the roof panel and the pillar panels in a parallel manner along the entire length of the molding, and wherein the molding has end portions and the installing section height becomes shorter between the central portions of the side portions of the molding and the end portions of the molding.

4. An automobile comprising:

a windshield having an upper edge, corner edges and side edges;

a windshield opening defined by a roof panel and pillar panels having surfaces configured to receive the windshield, and wherein a distance $H_1$ in a direction normal to a surface of the windshield between the surface of the upper edge of the windshield and the surface of the roof panel is less than a distance $H_2$ between the surfaces of center portions of the side edges of the windshield and the surfaces of center portions of the pillar panels, wherein the distance $H_1$ gradually increases to distance $H_2$ from the corner edges of the windshield to the center portions of the side edges of the windshield; and a molding disposed between the windshield and the windshield opening, the molding having a length, an upper portion corresponding to the upper edge of the windshield, corner portions corresponding to the corner edges of the windshield and side edges corresponding to the side edges of the windshield, said molding further comprising, an exterior wing extending along the entire length of the molding comprising, a lip-shaped outward wing portion having a uniform thickness along the entire length of the molding and covering a portion of the roof panel and the pillar panels, an inward wing portion defined along the entire length of the molding and covering a portion of the upper edge and corner edges of the windshield, and sub-inward wing portions defined along each side portion of the molding and covering a portion of the side edges of the windshield, wherein water drain channels are defined between each corresponding inward wing portion and sub inward wing portion along each side portion of the molding, and a connecting portion extending substantially perpendicularly from a junction of the inward wing portion and the outward wing portion of the exterior wing, the connecting portion having a foot and a flexible lip, wherein the upper edge and corner edges of the windshield are received between inside edges of the inward wing portion and the foot and the side edges of the windshield are received between inside edges of the sub-inward wing portions and the foot along a length of the molding having the water drain channels, wherein an installing section height defined between a top surface of the exterior wing and a base surface of the flexible lip is shortest in the upper portion of the molding and gradually increases from corner portions of the molding to central portions of the side portions of the molding, whereby the increase in the installing section height at the central portions of the side portions of the molding permits the outward wing portion to contact the surfaces of the roof panel and the pillar panels in a parallel manner along the entire length of the molding, and wherein the molding has end portions, and the distance $H_2$ gradually decreases to a distance $H_3$ between the surface of the windshield and end portions of the pillar panels, and the installing section length correspondingly becomes shorter between the central portions of the side portions of the molding and end portions of the molding.

5. An automobile windshield molding as in claim 4, wherein $H_1 < H_3 < H_2$.

6. An automobile windshield molding as in claim 4, comprising:

a metallic foil embedded lengthwise in the connecting portion.

* * * * *

UNITED STATES PATENT AND TRADEMARK OFFICE
CERTIFICATE OF CORRECTION

PATENT NO. : 6,196,615 B1
DATED : March 6, 2001
INVENTOR(S) : Yada

Page 1 of 1

It is certified that error appears in the above-identified patent and that said Letters Patent is hereby corrected as shown below:

Title page,
Item (30), the Foreign Application Priority Data is incorrect. Item (30) should read as follows:

(30) Foreign Application Priority Data

| Oct. 23, 1990 | (JP) | 2-283344 |
| Jul. 25, 1991 | (JP) | 3-208600 |
| Dec. 28, 1994 | (JP) | 6-338728 |

Signed and Sealed this

Twenty-first Day of August, 2001

Attest:

Attesting Officer

NICHOLAS P. GODICI
Acting Director of the United States Patent and Trademark Office